United States Patent
Schmidt et al.

(10) Patent No.: US 6,907,473 B2
(45) Date of Patent: Jun. 14, 2005

(54) AGILE NETWORK PROTOCOL FOR SECURE COMMUNICATIONS WITH ASSURED SYSTEM AVAILABILITY

(75) Inventors: Douglas Charles Schmidt, Severna Park, MD (US); Robert Dunham Short, III, Leesburg, VA (US)

(73) Assignee: Science Applications International Corp., San Diego, CA (US)

(*) Notice: Subject to any disclaimer, the term of this patent is extended or adjusted under 35 U.S.C. 154(b) by 0 days.

(21) Appl. No.: 10/401,888

(22) Filed: Mar. 31, 2003

(65) Prior Publication Data

US 2003/0167342 A1 Sep. 4, 2003

Related U.S. Application Data

(62) Division of application No. 10/082,164, filed on Feb. 26, 2002, now Pat. No. 6,618,761, which is a division of application No. 09/504,783, filed on Feb. 15, 2000, now Pat. No. 6,502,135, which is a continuation of application No. 09/429,643, filed on Oct. 29, 1999.
(60) Provisional application No. 60/137,704, filed on Jun. 7, 1999, and provisional application No. 60/106,261, filed on Oct. 30, 1998.

(51) Int. Cl.$^7$ .......................... G06F 15/16; G06F 11/00

(52) U.S. Cl. ...................................... 709/248; 714/707

(58) Field of Search .......................... 709/248; 713/600, 713/601, 400; 714/55, 707; 380/261

(56) References Cited

U.S. PATENT DOCUMENTS

| | | | |
|---|---|---|---|
| 4,933,846 A | | 6/1990 | Humphrey et al. |
| 4,988,990 A | * | 1/1991 | Warrior .................... 340/825.5 |
| 5,561,669 A | * | 10/1996 | Lenney et al. ............... 370/352 |
| 5,588,060 A | | 12/1996 | Aziz |

(Continued)

FOREIGN PATENT DOCUMENTS

| | | |
|---|---|---|
| DE | 199 24 575 | 12/1999 |
| EP | 0 814 589 | 12/1997 |
| EP | 0 838 930 | 4/1998 |

(Continued)

OTHER PUBLICATIONS

Reiter, Michael K. and Rubin, Aviel D. (AT&T Labs—Research), "Crowds: Anonymity for Web Transactions", pp. 1–23.

Dolev, Shlomi and Ostrovsky, Rafil, "Efficient Anonymous Multicast and Reception" (Extended Abstract), 16 pages.

Rubin, Aviel D., Geer, Daniel, and Ranum, Marcus J. (Wiley Computer Publishing), "Web Security Sourcebook", pp. 82–94.

(Continued)

*Primary Examiner*—Krisna Lim
(74) *Attorney, Agent, or Firm*—Banner & Witcoff, Ltd.

(57) ABSTRACT

A plurality of computer nodes communicate using seemingly random Internet Protocol source and destination addresses. Data packets matching criteria defined by a moving window of valid addresses are accepted for further processing, while those that do not meet the criteria are quickly rejected. Improvements to the basic design include (1) a load balancer that distributes packets across different transmission paths according to transmission path quality; (2) a DNS proxy server that transparently creates a virtual private network in response to a domain name inquiry; (3) a large-to-small link bandwidth management feature that prevents denial-of-service attacks at system chokepoints; (4) a traffic limiter that regulates incoming packets by limiting the rate at which a transmitter can be synchronized with a receiver; and (5) a signaling synchronizer, that allows a large number of nodes to communicate with a central node by partitioning the communication function between two separate entities.

20 Claims, 35 Drawing Sheets

U.S. PATENT DOCUMENTS

| | | | |
|---|---|---|---|
| 5,682,480 A | * 10/1997 | Nakagawa | 712/28 |
| 5,689,566 A | 11/1997 | Nguyen | |
| 5,796,942 A | 8/1998 | Esbensen | |
| 5,805,801 A | 9/1998 | Holloway et al. | |
| 5,842,040 A | 11/1998 | Hughes et al. | |
| 5,878,231 A | 3/1999 | Baehr et al. | |
| 5,892,903 A | 4/1999 | Klaus | |
| 5,898,830 A | 4/1999 | Wesinger, Jr. et al. | |
| 5,905,859 A | 5/1999 | Holloway et al. | |
| 6,006,259 A | 12/1999 | Adelman et al. | |
| 6,006,274 A | * 12/1999 | Hawkins et al. | 709/248 |
| 6,016,318 A | 1/2000 | Tomoike | |
| 6,041,342 A | * 3/2000 | Yamaguchi | 709/202 |
| 6,052,788 A | 4/2000 | Wesinger, Jr. et al. | |
| 6,079,020 A | 6/2000 | Liu | |
| 6,119,171 A | 9/2000 | Alkhatib | |
| 6,157,957 A | * 12/2000 | Berthaud | 709/248 |
| 6,178,505 B1 | 1/2001 | Schneider et al. | |
| 6,226,751 B1 | 5/2001 | Arrow et al. | |
| 6,243,749 B1 | 6/2001 | Sitaraman et al. | |
| 6,286,047 B1 | 9/2001 | Ramanathan et al. | |
| 6,330,562 B1 | 12/2001 | Boden et al. | |
| 6,332,158 B1 | 12/2001 | Risley et al. | |
| 6,353,614 B1 | 3/2002 | Borella et al. | |
| 6,671,702 B2 | * 12/2003 | Kruglikov et al. | 707/201 |

FOREIGN PATENT DOCUMENTS

| | | |
|---|---|---|
| EP | 0 858 189 | 8/1998 |
| GB | 2 317 792 | 4/1998 |
| WO | WO 98/27783 | 6/1998 |
| WO | WO 98/55930 | 12/1998 |
| WO | WO 98 59470 | 12/1998 |
| WO | WO 99 38081 | 7/1999 |
| WO | WO 99 48303 | 9/1999 |
| WO | WO 00/70458 | 11/2000 |
| WO | WO 01 50688 | 7/2001 |

OTHER PUBLICATIONS

Fasbender, Kesdogan, and Kubitz: "Variable and Scalable Security: Protection of Location Information in Mobil IP", IEEE publication, 1996, pp. 963–967.

Linux FreeS/WAN Index File, printed from http://liberty.freeswan.org/freeswan trees/freeswan–1.3/doc/ on Feb. 21, 2002, 3 pages.

J. Gilmore, "Swan: Securing the Internet against Wiretapping", printed from http://liberty.freeswan.org/freeswan trees/freeswan–1.3/doc/rationale.html on Feb. 21, 2002, 4 pages.

Glossary for the Linux FreeS/WAN project, printed from http://liberty.freswan.org/freeswan trees/freeswan–1.3/doc/glossary.html on Feb. 21, 2002, 25 pages.

Alan O. Fier et al., "The SSL Protocol Version 3.0", Nov. 18, 1996, printed from http://www.netscape.com/eng/ss13/draft302.txt on Feb. 4, 2002, 56 pages.

Search Report (dated Aug. 20, 2002), International Application No. PCT/US01/04340.

Search Report (dated Aug. 23, 2002), International Application No. PCT/US01/13260.

Shree Murthy et al., "Congestion–Oriented Shortest Multipath Routing", Proceedings of IEEE INFOCOM, 1996, pp. 1028–1036.

Jim Jones et al., "Distributed Denial of Service Attacks: Defenses", Global Integrity Corporation, 2000, pp. 1–14.

Donald E. Eastlake, $3^{rd}$, "Domain Name System Security Extensions", Internet Draft, Apr. 1998, pp. 1–51.

D. B. Chapman et al., "Building Internet Firewalls", Nov. 1995, pp. 278–375.

P. Srisuresh et al., "DNS extensions to Network address Translators (DNS_ALG)", Internet Draft, Jul. 1998, pp. 1–27.

James E. Bellaire, "New Statement of Rules—Naming Internet Domains", Internet Newsgroup, Jul. 30, 1995, 1 page.

D. Clark, "US Calls for Private Domain–Name System", Computer, IEEE Computer Society, Aug. 1, 1998, pp. 22–25.

August Bequai, "Balancing Legal Concerns Over Crime and Security in Cyberspace", Computer & Security, vol. 17, No. 4, 1998, pp. 293–298.

Rich Winkel, "CAQ: Networking With Spooks: The NET & The Control Of Information", Internet Newsgroup, Jun. 21, 1997, 4 pages.

Search Report (dated Oct. 7, 2002), International Application No. PCT/US01/13261.

F. Halsall, "Data Communications, Computer Networks And Open Systems", Chapter 4, Protocol Basics, 1996, pp. 198–203.

Donald E. Eastlake, "Domain Name System Security Extensions", DNS Security Working Group, Apr. 1998, 51 pages.

Laurie Wells, "Security Icon", Oct. 19, 1998, 1 page.

W. Stallings, "Cryptography And Network Security", $2^{nd}$, Edition, Chapter 13, IP Security, Jun. 8, 1998, pp. 399–440.

W. Stallings, "New Cryptography and Network Security Book", Jun. 8, 1998, 3 pages.

* cited by examiner

| MODE OR EMBODIMENT | HARDWARE ADDRESSES | IP ADDRESSES | DISCRIMINATOR FIELD VALUES |
|---|---|---|---|
| 1. PROMISCUOUS | SAME FOR ALL NODES OR COMPLETELY RANDOM | CAN BE VARIED IN SYNC | CAN BE VARIED IN SYNC |
| 2. PROMISCUOUS PER VPN | FIXED FOR EACH VPN | CAN BE VARIED IN SYNC | CAN BE VARIED IN SYNC |
| 3. HARDWARE HOPPING | CAN BE VARIED IN SYNC | CAN BE VARIED IN SYNC | CAN BE VARIED IN SYNC |

FIG. 12B

AGILE NETWORK PROTOCOL FOR SECURE COMMUNICATIONS WITH ASSURED SYSTEM AVAILABILITY

CROSS-REFERENCE TO RELATED APPLICATION

This application is a divisional application of application Ser. No. 10/082,164, filed Feb. 26, 2002, now U.S. Pat. No. 6,618,761 which is a divisional application of U.S. Pat. No. 6,502,135, issued Dec. 31, 2002, which is a continuation-in-part patent application of U.S. application Ser. No. 09/429,643, filed on Oct. 29, 1999, herein incorporated by reference in its entirety, and which claims priority from provisional U.S. application Ser. Nos. 60/106,261, filed Oct. 30, 1998 and 60/137,704, filed Jun. 7, 1999.

BACKGROUND OF THE INVENTION

A tremendous variety of methods have been proposed and implemented to provide security and anonymity for communications over the Internet. The variety stems, in part, from the different needs of different Internet users. A basic heuristic framework to aid in discussing these different security techniques is illustrated in FIG. 1. Two terminals, an originating terminal 100 and a destination terminal 110 are in communication over the Internet. It is desired for the communications to be secure, that is, immune to eavesdropping. For example, terminal 100 may transmit secret information to terminal 110 over the Internet 107. Also, it may be desired to prevent an eavesdropper from discovering that terminal 100 is in communication with terminal 110. For example, if terminal 100 is a user and terminal 110 hosts a web site, terminal 100's user may not want anyone in the intervening networks to know what web sites he is "visiting." Anonymity would thus be an issue, for example, for companies that want to keep their market research interests private and thus would prefer to prevent outsiders from knowing which web-sites or other Internet resources they are "visiting." These two security issues may be called data security and anonymity, respectively.

Data security is usually tackled using some form of data encryption. An encryption key 48 is known at both the originating and terminating terminals 100 and 110. The keys may be private and public at the originating and destination terminals 100 and 110, respectively or they may be symmetrical keys (the same key is used by both parties to encrypt and decrypt). Many encryption methods are known and usable in this context.

To hide traffic from a local administrator or ISP, a user can employ a local proxy server in communicating over an encrypted channel with an outside proxy such that the local administrator or ISP only sees the encrypted traffic. Proxy servers prevent destination servers from determining the identities of the originating clients. This system employs an intermediate server interposed between client and destination server. The destination server sees only the Internet Protocol (IP) address of the proxy server and not the originating client. The target server only sees the address of the outside proxy. This scheme relies on a trusted outside proxy server. Also, proxy schemes are vulnerable to traffic analysis methods of determining identities of transmitters and receivers. Another important limitation of proxy servers is that the server knows the identities of both calling and called parties. In many instances, an originating terminal, such as terminal A, would prefer to keep its identity concealed from the proxy, for example, if the proxy server is provided by an Internet service provider (ISP).

To defeat traffic analysis, a scheme called Chaum's mixes employs a proxy server that transmits and receives fixed length messages, including dummy messages. Multiple originating terminals are connected through a mix (a server) to multiple target servers. It is difficult to tell which of the originating terminals are communicating to which of the connected target servers, and the dummy messages confuse eavesdroppers' efforts to detect communicating pairs by analyzing traffic. A drawback is that there is a risk that the mix server could be compromised. One way to deal with this risk is to spread the trust among multiple mixes. If one mix is compromised, the identities of the originating and target terminals may remain concealed. This strategy requires a number of alternative mixes so that the intermediate servers interposed between the originating and target terminals are not determinable except by compromising more than one mix. The strategy wraps the message with multiple layers of encrypted addresses. The first mix in a sequence can decrypt only the outer layer of the message to reveal the next destination mix in sequence. The second mix can decrypt the message to reveal the next mix and so on. The target server receives the message and, optionally, a multi-layer encrypted payload containing return information to send data back in the same fashion. The only way to defeat such a mix scheme is to collude among mixes. If the packets are all fixed-length and intermixed with dummy packets, there is no way to do any kind of traffic analysis.

Still another anonymity technique, called 'crowds,' protects the identity of the originating terminal from the intermediate proxies by providing that originating terminals belong to groups of proxies called crowds. The crowd proxies are interposed between originating and target terminals. Each proxy through which the message is sent is randomly chosen by an upstream proxy. Each intermediate proxy can send the message either to another randomly chosen proxy in the "crowd" or to the destination. Thus, even crowd members cannot determine if a preceding proxy is the originator of the message or if it was simply passed from another proxy.

ZKS (Zero-Knowledge Systems) Anonymous IP Protocol allows users to select up to any of five different pseudonyms, while desktop software encrypts outgoing traffic and wraps it in User Datagram Protocol (UDP) packets. The first server in a 2+-hop system gets the UDP packets, strips off one layer of encryption to add another, then sends the traffic to the next server, which strips off yet another layer of encryption and adds a new one. The user is permitted to control the number of hops. At the final server, traffic is decrypted with an untraceable IP address. The technique is called onion-routing. This method can be defeated using traffic analysis. For a simple example, bursts of packets from a user during low-duty periods can reveal the identities of sender and receiver.

Firewalls attempt to protect LANs from unauthorized access and hostile exploitation or damage to computers connected to the LAN. Firewalls provide a server through which all access to the LAN must pass. Firewalls are centralized systems that require administrative overhead to maintain. They can be compromised by virtual-machine applications ("applets"). They instill a false sense of security that leads to security breaches for example by users sending sensitive information to servers outside the firewall or encouraging use of modems to sidestep the firewall security. Firewalls are not useful for distributed systems such as business travelers, extranets, small teams, etc.

SUMMARY OF THE INVENTION

A secure mechanism for communicating over the internet, including a protocol referred to as the Tunneled Agile Routing Protocol (TARP), uses a unique two-layer encryption format and special TARP routers. TARP routers are similar in function to regular IP routers. Each TARP router has one or more IP addresses and uses normal IP protocol to send IP packet messages ("packets" or "datagrams"). The IP packets exchanged between TARP terminals via TARP routers are actually encrypted packets whose true destination address is concealed except to TARP routers and servers. The normal or "clear" or "outside" IP header attached to TARP IP packets contains only the address of a next hop router or destination server. That is, instead of indicating a final destination in the destination field of the IP header, the TARP packet's IP header always points to a next-hop in a series of TARP router hops, or to the final destination. This means there is no overt indication from an intercepted TARP packet of the true destination of the TARP packet since the destination could always be next-hop TARP router as well as the final destination.

Each TARP packet's true destination is concealed behind a layer of encryption generated using a link key. The link key is the encryption key used for encrypted communication between the hops intervening between an originating TARP terminal and a destination TARP terminal. Each TARP router can remove the outer layer of encryption to reveal the destination router for each TARP packet. To identify the link key needed to decrypt the outer layer of encryption of a TARP packet, a receiving TARP or routing terminal may identify the transmitting terminal by the sender/receiver IP numbers in the cleartext IP header.

Once the outer layer of encryption is removed, the TARP router determines the final destination. Each TARP packet 140 undergoes a minimum number of hops to help foil traffic analysis. The hops may be chosen at random or by a fixed value. As a result, each TARP packet may make random trips among a number of geographically disparate routers before reaching its destination. Each trip is highly likely to be different for each packet composing a given message because each trip is independently randomly determined. This feature is called agile routing. The fact that different packets take different routes provides distinct advantages by making it difficult for an interloper to obtain all the packets forming an entire multi-packet message. The associated advantages have to do with the inner layer of encryption discussed below. Agile routing is combined with another feature that furthers this purpose; a feature that ensures that any message is broken into multiple packets.

The IP address of a TARP router can be changed, a feature called IP agility. Each TARP router, independently or under direction from another TARP terminal or router, can change its IP address. A separate, unchangeable identifier or address is also defined. This address, called the TARP address, is known only to TARP routers and terminals and may be correlated at any time by a TARP router or a TARP terminal using a Lookup Table (LUT). When a TARP router or terminal changes its IP address, it updates the other TARP routers and terminals which in turn update their respective LUTs.

The message payload is hidden behind an inner layer of encryption in the TARP packet that can only be unlocked using a session key. The session key is not available to any of the intervening TARP routers. The session key is used to decrypt the payloads of the TARP packets permitting the data stream to be reconstructed.

Communication may be made private using link and session keys, which in turn may be shared and used according to any desired method. For example, public/private keys or symmetric keys may be used.

To transmit a data stream, a TARP originating terminal constructs a series of TARP packets from a series of IP packets generated by a network (IP) layer process. (Note that the terms "network layer," "data link layer," "application layer," etc. used in this specification correspond to the Open Systems Interconnection (OSI) network terminology.) The payloads of these packets are assembled into a block and chain-block encrypted using the session key. This assumes, of course, that all the IP packets are destined for the same TARP terminal. The block is then interleaved and the interleaved encrypted block is broken into a series of payloads, one for each TARP packet to be generated. Special TARP headers $IP_T$ are then added to each payload using the IP headers from the data stream packets. The TARP headers can be identical to normal IP headers or customized in some way. They should contain a formula or data for deinterleaving the data at the destination TARP terminal, a time-to-live (TTL) parameter to indicate the number of hops still to be executed, a data type identifier which indicates whether the payload contains, for example, TCP or UDP data, the sender's TARP address, the destination TARP address, and an indicator as to whether the packet contains real or decoy data or a formula for filtering out decoy data if decoy data is spread in some way through the TARP payload data.

Note that although chain-block encryption is discussed here with reference to the session key, any encryption method may be used. Preferably, as in chain block encryption, a method should be used that makes unauthorized decryption difficult without an entire result of the encryption process. Thus, by separating the encrypted block among multiple packets and making it difficult for an interloper to obtain access to all of such packets, the contents of the communications are provided an extra layer of security.

Decoy or dummy data can be added to a stream to help foil traffic analysis by reducing the peak-to-average network load. It may be desirable to provide the TARP process with an ability to respond to the time of day or other criteria to generate more decoy data during low traffic periods so that communication bursts at one point in the Internet cannot be tied to communication bursts at another point to reveal the communicating endpoints.

Dummy data also helps to break the data into a larger number of inconspicuously-sized packets permitting the interleave window size to be increased while maintaining a reasonable size for each packet. (The packet size can be a single standard size or selected from a fixed range of sizes.) One primary reason for desiring for each message to be broken into multiple packets is apparent if a chain block encryption scheme is used to form the first encryption layer prior to interleaving. A single block encryption may be applied to portion, or entirety, of a message, and that portion or entirety then interleaved into a number of separate packets. Considering the agile IP routing of the packets, and the attendant difficulty of reconstructing an entire sequence of packets to form a single block-encrypted message element, decoy packets can significantly increase the difficulty of reconstructing an entire data stream.

The above scheme may be implemented entirely by processes operating between the data link layer and the network layer of each server or terminal participating in the TARP system. Because the encryption system described above is insertable between the data link and network layers, the processes involved in supporting the encrypted communication may be completely transparent to processes at the IP (network) layer and above. The TARP processes may also be completely transparent to the data link layer processes as well. Thus, no operations at or above the Network layer, or at or below the data link layer, are affected by the insertion of the TARP stack. This provides additional security to all processes at or above the network layer, since the difficulty of unauthorized penetration of the network layer (by, for example, a hacker) is increased substantially. Even newly developed servers running at the session layer leave all processes below the session layer vulnerable to attack. Note that in this architecture, security is distributed. That is, notebook computers used by executives on the road, for example, can communicate over the Internet without any compromise in security.

IP address changes made by TARP terminals and routers can be done at regular intervals, at random intervals, or upon detection of "attacks." The variation of IP addresses hinders traffic analysis that might reveal which computers are communicating, and also provides a degree of immunity from attack. The level of immunity from attack is roughly proportional to the rate at which the IP address of the host is changing.

As mentioned, IP addresses may be changed in response to attacks. An attack may be revealed, for example, by a regular series of messages indicating that a router is being probed in some way. Upon detection of an attack, the TARP layer process may respond to this event by changing its IP address. In addition, it may create a subprocess that maintains the original IP address and continues interacting with the attacker in some manner.

Decoy packets may be generated by each TARP terminal on some basis determined by an algorithm. For example, the algorithm may be a random one which calls for the generation of a packet on a random basis when the terminal is idle. Alternatively, the algorithm may be responsive to time of day or detection of low traffic to generate more decoy packets during low traffic times. Note that packets are preferably generated in groups, rather than one by one, the groups being sized to simulate real messages. In addition, so that decoy packets may be inserted in normal TARP message streams, the background loop may have a latch that makes it more likely to insert decoy packets when a message stream is being received. Alternatively, if a large number of decoy packets is received along with regular TARP packets, the algorithm may increase the rate of dropping of decoy packets rather than forwarding them. The result of dropping and generating decoy packets in this way is to make the apparent incoming message size different from the apparent outgoing message size to help foil traffic analysis.

In various other embodiments of the invention, a scalable version of the system may be constructed in which a plurality of IP addresses are preassigned to each pair of communicating nodes in the network. Each pair of nodes agrees upon an algorithm for "hopping" between IP addresses (both sending and receiving), such that an eavesdropper sees apparently continuously random IP address pairs (source and destination) for packets transmitted between the pair. Overlapping or "reusable" IP addresses may be allocated to different users on the same subnet, since each node merely verifies that a particular packet includes a valid source/destination pair from the agreed-upon algorithm. Source/destination pairs are preferably not reused between any two nodes during any given end-to-end session, though limited IP block sizes or lengthy sessions might require it.

Further improvements described in this continuation-in-part application include: (1) a load balancer that distributes packets across different transmission paths according to transmission path quality; (2) a DNS proxy server that transparently creates a virtual private network in response to a domain name inquiry; (3) a large-to-small link bandwidth management feature that prevents denial-of-service attacks at system chokepoints; (4) a traffic limiter that regulates incoming packets by limiting the rate at which a transmitter can be synchronized with a receiver; and (5) a signaling synchronizer that allows a large number of nodes to communicate with a central node by partitioning the communication function between two separate entities

BRIEF DESCRIPTION OF THE DRAWINGS

FIG. 12B shows several different approaches for hopping hardware addresses, IP addresses, and discriminator fields in combination.

DETAILED DESCRIPTION OF THE INVENTION

Figure 1:
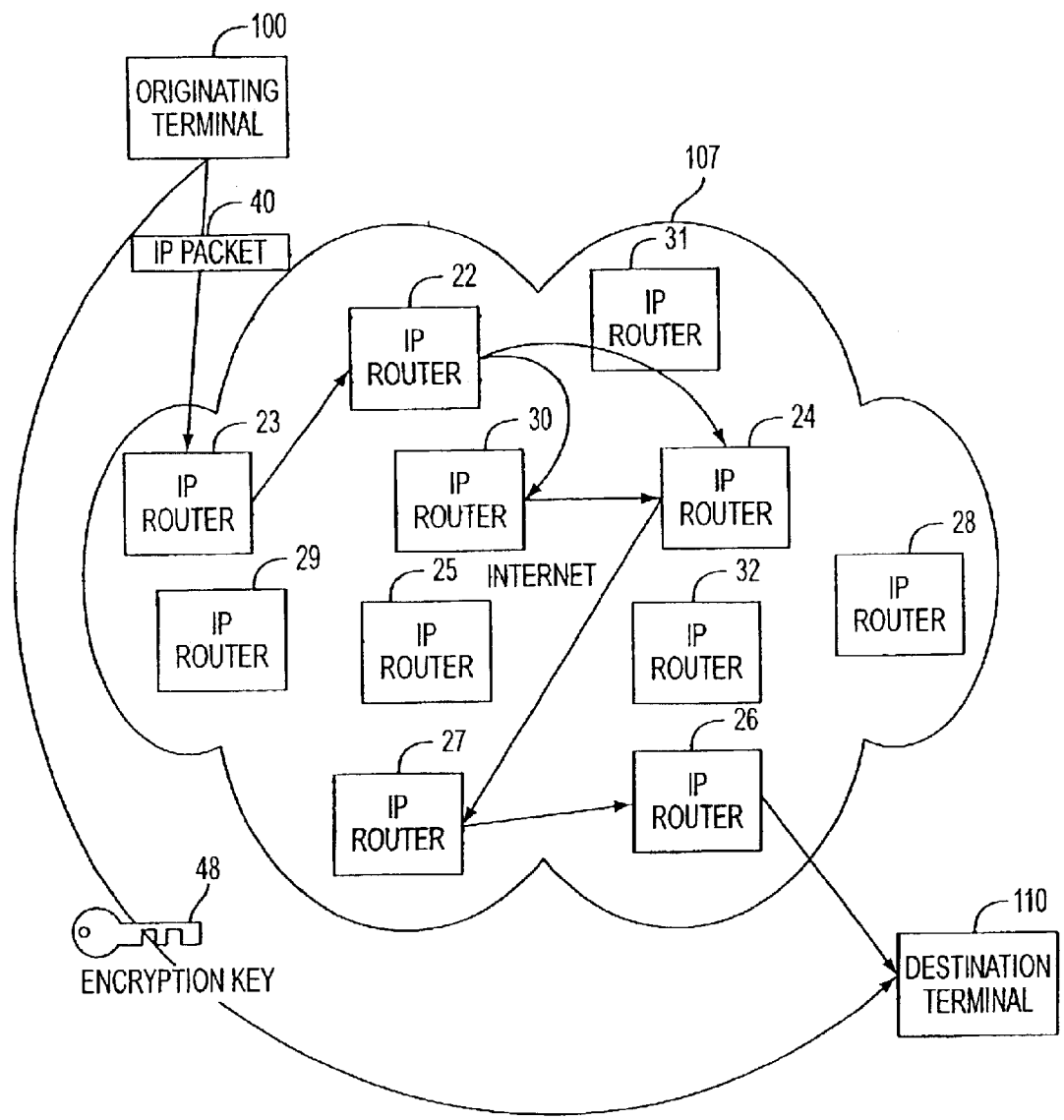
FIG. 1 is an illustration of secure communications over the Internet according to a prior art embodiment.
Figure 2:
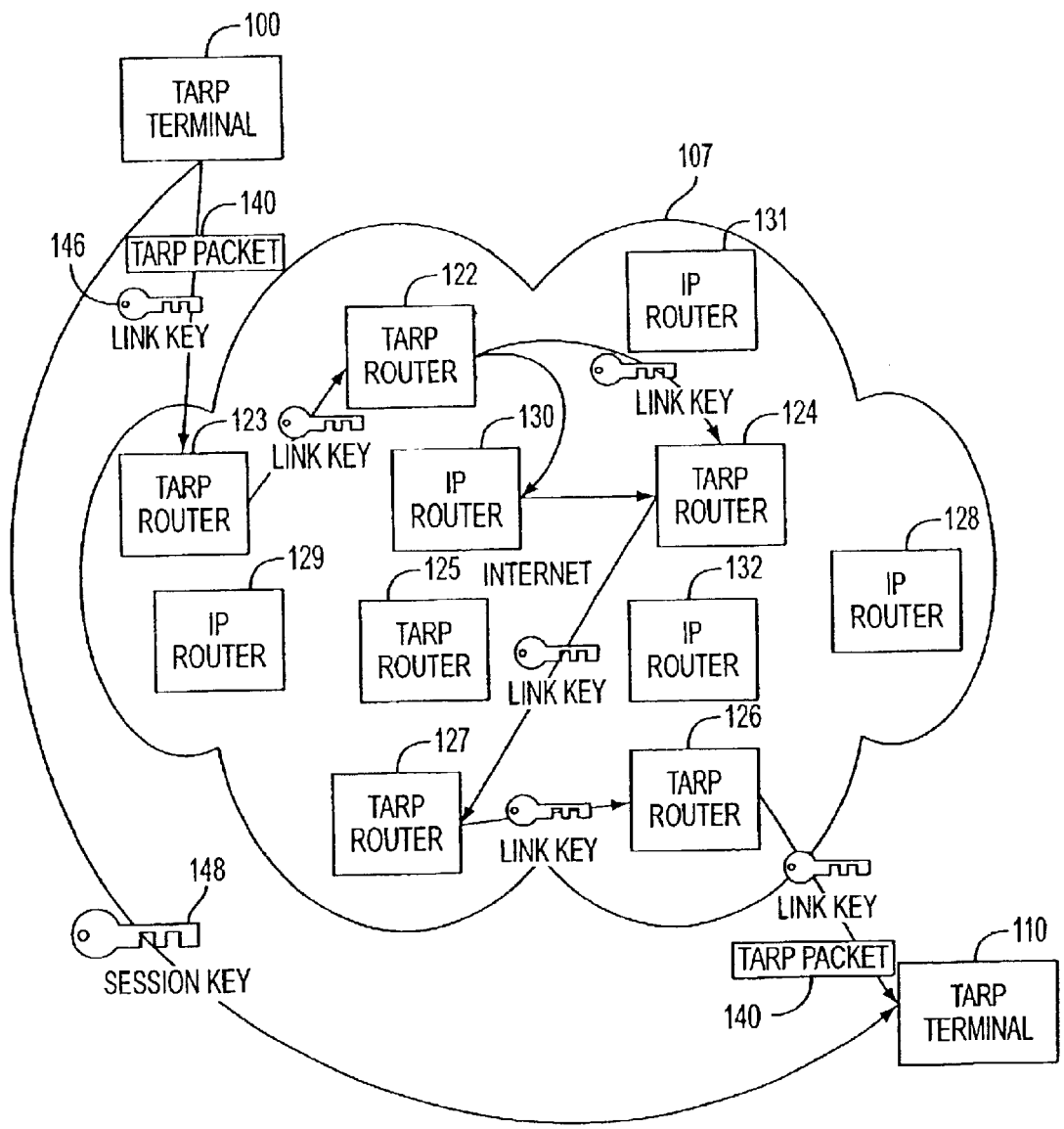
FIG. 2 is an illustration of secure communications over the Internet according to a an embodiment of the invention.

Referring to FIG. 2, a secure mechanism for communicating over the internet employs a number of special routers or servers, called TARP routers 122–127 that are similar to regular IP routers 128–132 in that each has one or more IP addresses and uses normal IP protocol to send normal-looking IP packet messages, called TARP packets 140. TARP packets 140 are identical to normal IP packet messages that are routed by regular IP routers 128–132 because each TARP packet 140 contains a destination address as in a normal IP packet. However, instead of indicating a final destination in the destination field of the IP header, the TARP packet's 140 IP header always points to a next-hop in a series of TARP router hops, or the final destination, TARP terminal 110. Because the header of the TARP packet contains only the next-hop destination, there is no overt indication from an intercepted TARP packet of the true destination of the TARP packet 140 since the destination could always be the next-hop TARP router as well as the final destination, TARP terminal 110.

Each TARP packet's true destination is concealed behind an outer layer of encryption generated using a link key 146. The link key 146 is the encryption key used for encrypted communication between the end points (TARP terminals or TARP routers) of a single link in the chain of hops connecting the originating TARP terminal 100 and the destination TARP terminal 110. Each TARP router 122–127, using the link key 146 it uses to communicate with the previous hop in a chain, can use the link key to reveal the true destination of a TARP packet. To identify the link key needed to decrypt the outer layer of encryption of a TARP packet, a receiving TARP or routing terminal may identify the transmitting terminal (which may indicate the link key used) by the sender field of the clear IP header. Alternatively, this identity may be hidden behind another layer of encryption in available bits in the clear IP header. Each TARP router, upon receiving a TARP message, determines if the message is a TARP message by using authentication data in the TARP packet. This could be recorded in available bytes in the TARP packet's IP header. Alternatively, TARP packets could be authenticated by attempting to decrypt using the link key 146 and determining if the results are as expected. The former may have computational advantages because it does not involve a decryption process.

Once the outer layer of decryption is completed by a TARP router 122–127, the TARP router determines the final destination. The system is preferably designed to cause each TARP packet 140 to undergo a minimum number of hops to help foil traffic analysis. The time to live counter in the IP header of the TARP message may be used to indicate a number of TARP router hops yet to be completed. Each TARP router then would decrement the counter and determine from that whether it should forward the TARP packet 140 to another TARP router 122–127 or to the destination TARP terminal 110. If the time to live counter is zero or below zero after decrementing, for an example of usage, the TARP router receiving the TARP packet 140 may forward the TARP packet 140 to the destination TARP terminal 110. If the time to live counter is above zero after decrementing, for an example of usage, the TARP router receiving the TARP packet 140 may forward the TARP packet 140 to a TARP router 122–127 that the current TARP terminal chooses at random. As a result, each TARP packet 140 is routed through some minimum number of hops of TARP routers 122–127 which are chosen at random.

Thus, each TARP packet, irrespective of the traditional factors determining traffic in the Internet, makes random trips among a number of geographically disparate routers before reaching its destination and each trip is highly likely to be different for each packet composing a given message because each trip is independently randomly determined as described above. This feature is called agile routing. For reasons that will become clear shortly, the fact that different packets take different routes provides distinct advantages by making it difficult for an interloper to obtain all the packets forming an entire multi-packet message. Agile routing is combined with another feature that furthers this purpose, a feature that ensures that any message is broken into multiple packets.

A TARP router receives a TARP packet when an IP address used by the TARP router coincides with the IP address in the TARP packet's IP header $IP_C$. The IP address of a TARP router, however, may not remain constant. To avoid and manage attacks, each TARP router, independently or under direction from another TARP terminal or router, may change its IP address. A separate, unchangeable identifier or address is also defined. This address, called the TARP address, is known only to TARP routers and terminals and may be correlated at any time by a TARP router or a TARP terminal using a Lookup Table (LUT). When a TARP router or terminal changes its IP address, it updates the other TARP routers and terminals which in turn update their respective LUTs. In reality, whenever a TARP router looks up the address of a destination in the encrypted header, it must convert a TARP address to a real IP address using its LUT.

While every TARP router receiving a TARP packet has the ability to determine the packet's final destination, the message payload is embedded behind an inner layer of encryption in the TARP packet that can only be unlocked using a session key. The session key is not available to any of the TARP routers 122–127 intervening between the originating 100 and destination 110 TARP terminals. The session key is used to decrypt the payloads of the TARP packets 140 permitting an entire message to be reconstructed.

In one embodiment, communication may be made private using link and session keys, which in turn may be shared and used according any desired method. For example, a public key or symmetric keys may be communicated between link or session endpoints using a public key method. Any of a variety of other mechanisms for securing data to ensure that only authorized computers can have access to the private information in the TARP packets 140 may be used as desired.

Figure 3A:
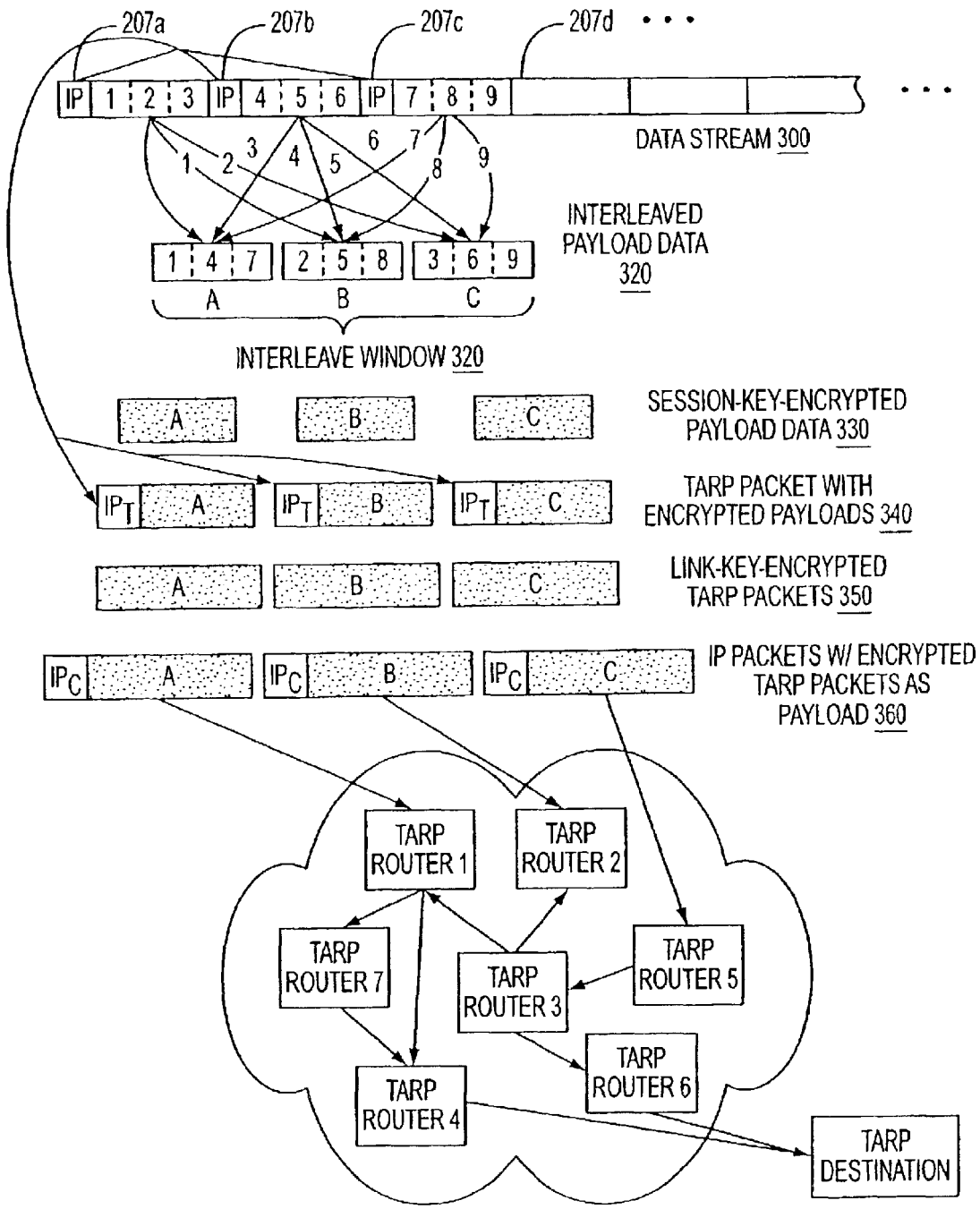
FIG. 3a is an illustration of a process of forming a tunneled IP packet according to an embodiment of the invention.

Referring to FIG. 3a, to construct a series of TARP packets, a data stream 300 of IP packets 207a, 207b, 207c, etc., such series of packets being formed by a network (IP) layer process, is broken into a series of small sized segments. In the present example, equal-sized segments 1–9 are defined and used to construct a set of interleaved data packets A, B, and C. Here it is assumed that the number of interleaved packets A, B, and C formed is three and that the number of IP packets 207a–207c used to form the three interleaved packets A, B, and C is exactly three. Of course, the number of IP packets spread over a group of interleaved packets may be any convenient number as may be the number of interleaved packets over which the incoming data stream is spread. The latter, the number of interleaved packets over which the data stream is spread, is called the interleave window.

To create a packet, the transmitting software interleaves the normal IP packets 207a et. seq. to form a new set of interleaved payload data 320. This payload data 320 is then encrypted using a session key to form a set of session-key-encrypted payload data 330, each of which, A, B, and C, will form the payload of a TARP packet. Using the IP header data, from the original packets 207a–207c, new TARP headers $IP_T$ are formed. The TARP headers $IP_T$ can be identical to normal IP headers or customized in some way. In a preferred embodiment, the TARP headers $IP_T$ are IP headers with added data providing the following information required for routing and reconstruction of messages, some of which data is ordinarily, or capable of being, contained in normal IP headers:

1. A window sequence number—an identifier that indicates where the packet belongs in the original message sequence.
2. An interleave sequence number—an identifier that indicates the interleaving sequence used to form the packet so that the packet can be deinterleaved along with other packets in the interleave window.
3. A time-to-live (TTL) datum—indicates the number of TARP-router-hops to be executed before the packet reaches its destination. Note that the TTL parameter may provide a datum to be used in a probabilistic formula for determining whether to route the packet to the destination or to another hop.
4. Data type identifier—indicates whether the payload contains, for example, TCP or UDP data.
5. Sender's address—indicates the sender's address in the TARP network.
6. Destination address—indicates the destination terminal's address in the TARP network.
7. Decoy/Real—an indicator of whether the packet contains real message data or dummy decoy data or a combination.

Obviously, the packets going into a single interleave window must include only packets with a common destination. Thus, it is assumed in the depicted example that the IP headers of IP packets 207a–207c all contain the same destination address or at least will be received by the same terminal so that they can be deinterleaved. Note that dummy or decoy data or packets can be added to form a larger interleave window than would otherwise be required by the size of a given message. Decoy or dummy data can be added to a stream to help foil traffic analysis by leveling the load on the network. Thus, it may be desirable to provide the TARP process with an ability to respond to the time of day or other criteria to generate more decoy data during low traffic periods so that communication bursts at one point in the Internet cannot be tied to communication bursts at another point to reveal the communicating endpoints.

Dummy data also helps to break the data into a larger number of inconspicuously-sized packets permitting the interleave window size to be increased while maintaining a reasonable size for each packet. (The packet size can be a single standard size or selected from a fixed range of sizes.) One primary reason for desiring for each message to be broken into multiple packets is apparent if a chain block encryption scheme is used to form the first encryption layer prior to interleaving. A single block encryption may be applied to a portion, or the entirety, of a message, and that portion or entirety then interleaved into a number of separate packets.

Figure 3B:
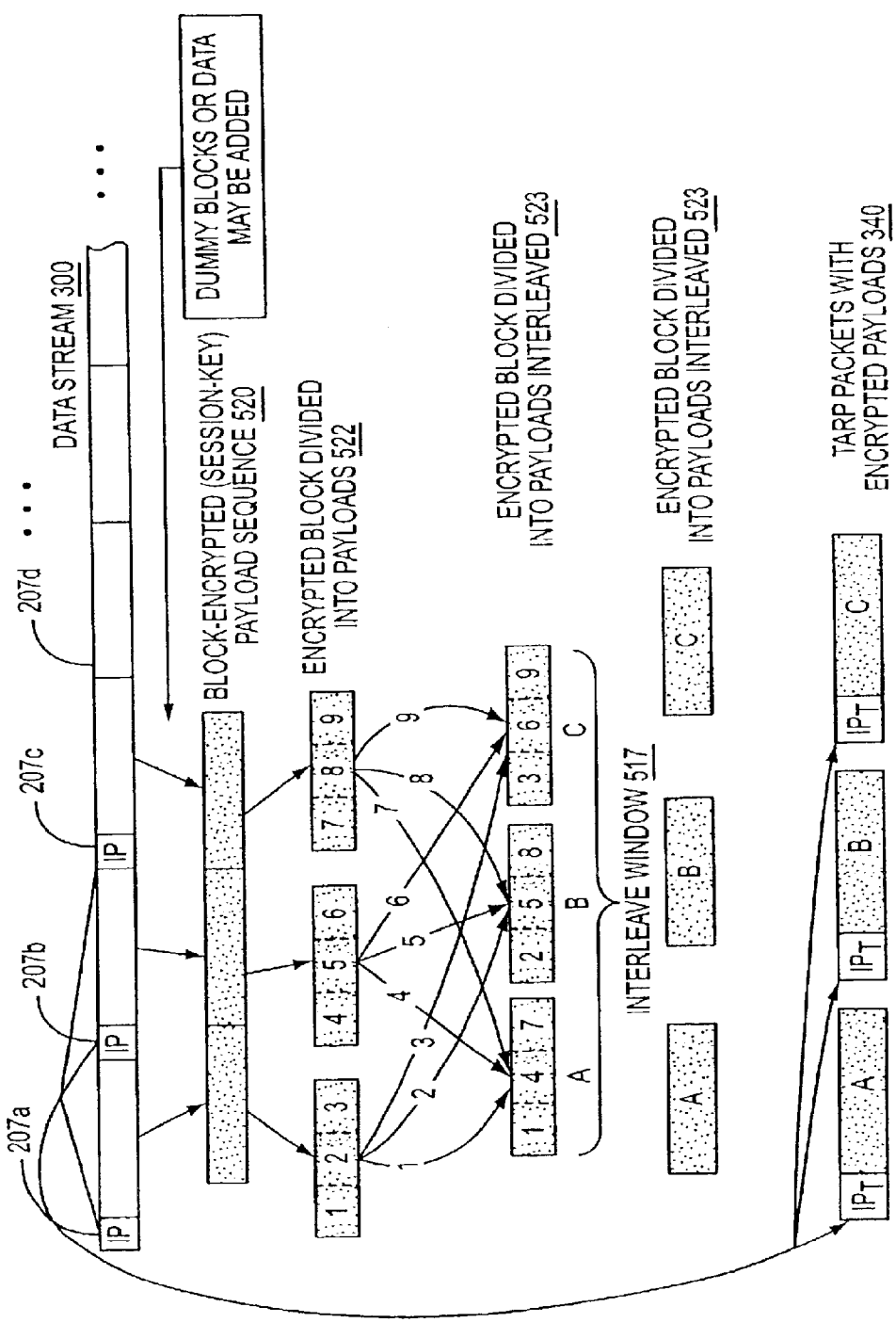
FIG. 3b is an illustration of a process of forming a tunneled IP packet according to another embodiment of the invention.

Referring to FIG. 3b, in an alternative mode of TARP packet construction, a series of IP packets are accumulated to make up a predefined interleave window. The payloads of the packets are used to construct a single block 520 for chain block encryption using the session key. The payloads used to form the block are presumed to be destined for the same terminal. The block size may coincide with the interleave window as depicted in the example embodiment of FIG. 3b. After encryption, the encrypted block is broken into separate payloads and segments which are interleaved as in the embodiment of FIG. 3a. The resulting interleaved packets A, B, and C, are then packaged as TARP packets with TARP headers as in the Example of FIG. 3a. The remaining process is as shown in, and discussed with reference to, FIG. 3a.

Once the TARP packets 340 are formed, each entire TARP packet 340, including the TARP header $IP_T$, is encrypted using the link key for communication with the first-hop-TARP router. The first hop TARP router is randomly chosen. A final unencrypted IP header $IP_C$ is added to each encrypted TARP packet 340 to form a normal IP packet 360 that can be transmitted to a TARP router. Note that the process of constructing the TARP packet 360 does not have to be done in stages as described. The above description is just a useful heuristic for describing the final product, namely, the TARP packet.

Note that, TARP header $IP_T$ could be a completely custom header configuration with no similarity to a normal IP header except that it contain the information identified above. This is so since this header is interpreted by only TARP routers.

Figure 4:
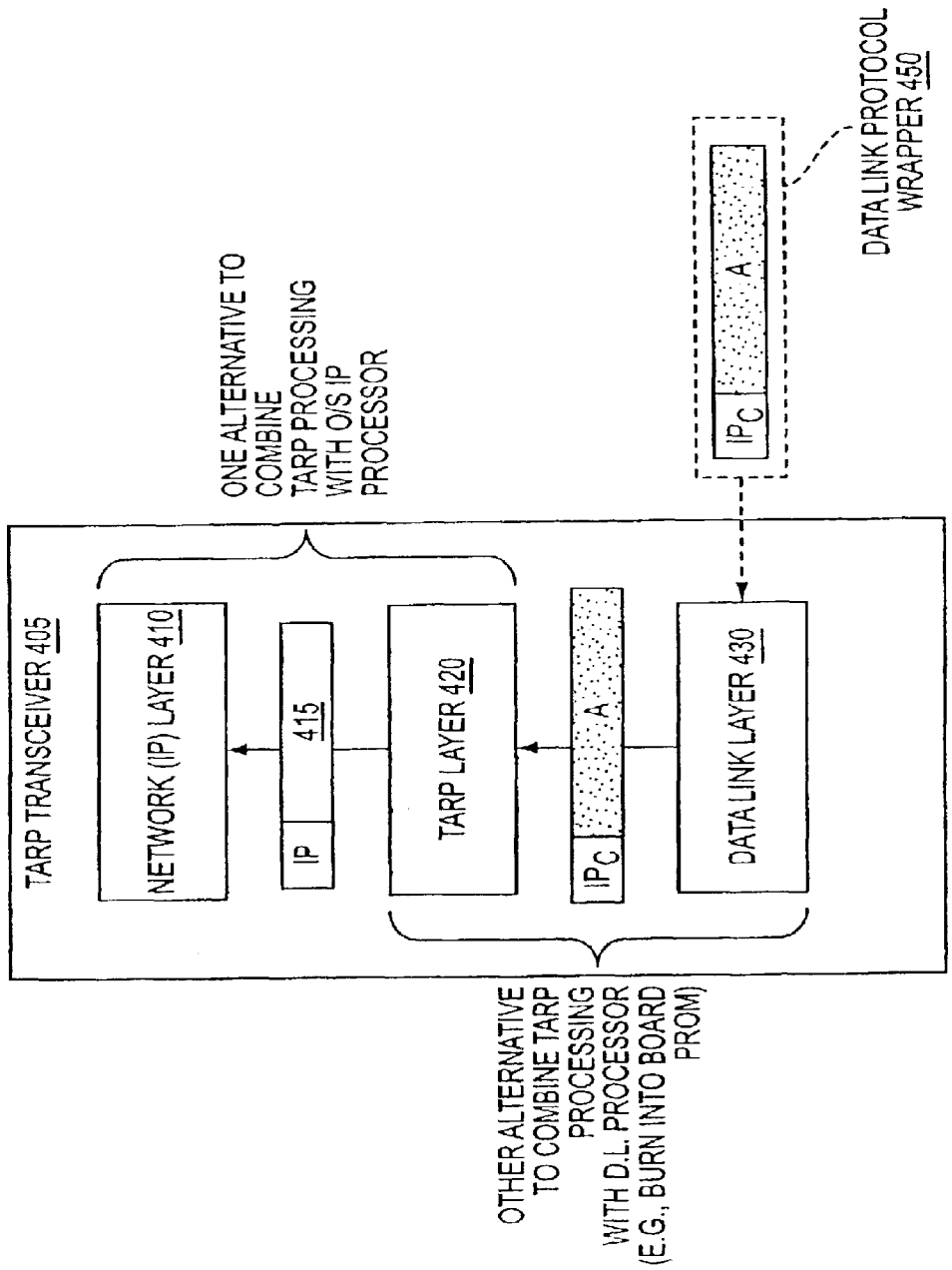
FIG. 4 is an illustration of an OSI layer location of processes that may be used to implement the invention.

The above scheme may be implemented entirely by processes operating between the data link layer and the network layer of each server or terminal participating in the TARP system. Referring to FIG. 4, a TARP transceiver 405 can be an originating terminal 100, a destination terminal 110, or a TARP router 122–127. In each TARP Transceiver 405, a transmitting process is generated to receive normal packets from the Network (IP) layer and generate TARP packets for communication over the network. A receiving process is generated to receive normal IP packets containing TARP packets and generate from these normal IP packets which are "passed up" to the Network (IP) layer. Note that where the TARP Transceiver 405 is a router, the received TARP packets 140 are not processed into a stream of IP packets 415 because they need only be authenticated as proper TARP packets and then passed to another TARP router or a TARP destination terminal 110. The intervening process, a "TARP Layer" 420, could be combined with either the data link layer 430 or the Network layer 410. In either case, it would intervene between the data link layer 430 so that the process would receive regular IP packets containing embedded TARP packets and "hand up" a series of reassembled IP packets to the Network layer 410. As an example of combining the TARP layer 420 with the data link layer 430, a program may augment the normal processes running a communications card, for example, an Ethernet card. Alternatively, the TARP layer processes may form part of a dynamically loadable module that is loaded and executed to support communications between the network and data link layers.

Because the encryption system described above can be inserted between the data link and network layers, the processes involved in supporting the encrypted communication may be completely transparent to processes at the IP (network) layer and above. The TARP processes may also be completely transparent to the data link layer processes as well. Thus, no operations at or above the network layer, or at or below the data link layer, are affected by the insertion of the TARP stack. This provides additional security to all processes at or above the network layer, since the difficulty of unauthorized penetration of the network layer (by, for example, a hacker) is increased substantially. Even newly developed servers running at the session layer leave all processes below the session layer vulnerable to attack. Note that in this architecture, security is distributed. That is, notebook computers used by executives on the road, for example, can communicate over the Internet without any compromise in security.

Note that IP address changes made by TARP terminals and routers can be done at regular intervals, at random intervals, or upon detection of "attacks." The variation of IP addresses hinders traffic analysis that might reveal which computers are communicating, and also provides a degree of immunity from attack. The level of immunity from attack is roughly proportional to the rate at which the IP address of the host is changing.

As mentioned, IP addresses may be changed in response to attacks. An attack may be revealed, for example, by a regular series of messages indicates that a router is being probed in some way. Upon detection of an attack, the TARP layer process may respond to this event by changing its IP address. To accomplish this, the TARP process will construct a TARP-formatted message, in the style of Internet Control Message Protocol (ICMP) datagrams as an example; this message will contain the machine's TARP address, its previous IP address, and its new IP address. The TARP layer will transmit this packet to at least one known TARP router; then upon receipt and validation of the message, the TARP router will update its LUT with the new IP address for the stated TARP address. The TARP router will then format a similar message, and broadcast it to the other TARP routers so that they may update their LUTs. Since the total number of TARP routers on any given subnet is expected to be relatively small, this process of updating the LUTs should be relatively fast. It may not, however, work as well when there is a relatively large number of TARP routers and/or a relatively large number of clients; this has motivated a refinement of this architecture to provide scalability; this refinement has led to a second embodiment, which is discussed below.

Upon detection of an attack, the TARP process may also create a subprocess that maintains the original IP address and continues interacting with the attacker. The latter may provide an opportunity to trace the attacker or study the attacker's methods (called "fishbowling" drawing upon the analogy of a small fish in a fish bowl that "thinks" it is in the ocean but is actually under captive observation). A history of the communication between the attacker and the abandoned (fishbowled) IP address can be recorded or transmitted for human analysis or further synthesized for purposes of responding in some way.

As mentioned above, decoy or dummy data or packets can be added to outgoing data streams by TARP terminals or routers. In addition to making it convenient to spread data over a larger number of separate packets, such decoy packets can also help to level the load on inactive portions of the Internet to help foil traffic analysis efforts.

Decoy packets may be generated by each TARP terminal 100, 110 or each router 122–127 on some basis determined by an algorithm. For example, the algorithm may be a random one which calls for the generation of a packet on a random basis when the terminal is idle. Alternatively, the algorithm may be responsive to time of day or detection of low traffic to generate more decoy packets during low traffic times. Note that packets are preferably generated in groups, rather than one by one, the groups being sized to simulate real messages. In addition, so that decoy packets may be inserted in normal TARP message streams, the background loop may have a latch that makes it more likely to insert decoy packets when a message stream is being received. That is, when a series of messages are received, the decoy packet generation rate may be increased. Alternatively, if a large number of decoy packets is received along with regular TARP packets, the algorithm may increase the rate of dropping of decoy packets rather than forwarding them. The result of dropping and generating decoy packets in this way is to make the apparent incoming message size different from the apparent outgoing message size to help foil traffic analysis. The rate of reception of packets, decoy or otherwise, may be indicated to the decoy packet dropping and generating processes through perishable decoy and regular packet counters. (A perishable counter is one that resets or decrements its value in response to time so that it contains a high value when it is incremented in rapid succession and a small value when incremented either slowly or a small number of times in rapid succession.) Note that destination TARP terminal 110 may generate decoy packets equal in number and size to those TARP packets received to make it appear it is merely routing packets and is therefore not the destination terminal.

Figure 5:
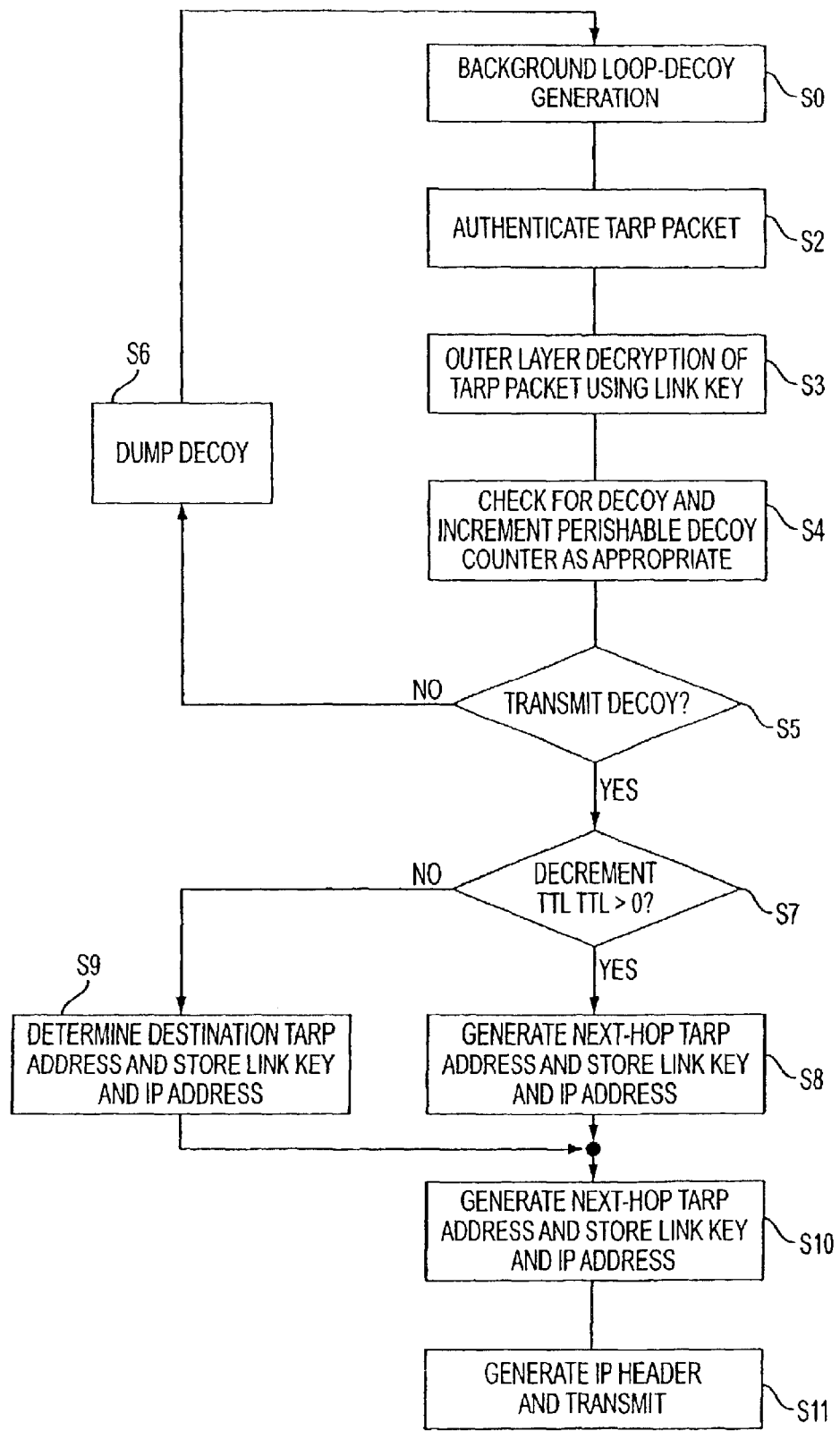
FIG. 5 is a flow chart illustrating a process for routing a tunneled packet according to an embodiment of the invention.

Referring to FIG. 5, the following particular steps may be employed in the above-described method for routing TARP packets.

S0. A background loop operation is performed which applies an algorithm which determines the generation of decoy IP packets. The loop is interrupted when an encrypted TARP packet is received.

S2. The TARP packet may be probed in some way to authenticate the packet before attempting to decrypt it using the link key. That is, the router may determine that the packet is an authentic TARP packet by performing a selected operation on some data included with the clear IP header attached to the encrypted TARP packet contained in the payload. This makes it possible to avoid performing decryption on packets that are not authentic TARP packets.

S3. The TARP packet is decrypted to expose the destination TARP address and an indication of whether the packet is a decoy packet or part of a real message.

S4. If the packet is a decoy packet, the perishable decoy counter is incremented.

S5. Based on the decoy generation/dropping algorithm and the perishable decoy counter value, if the packet is a decoy packet, the router may choose to throw it away. If the received packet is a decoy packet and it is determined that it should be thrown away (S6), control returns to step S0.

S7. The TTL parameter of the TARP header is decremented and it is determined if the TTL parameter is greater than zero.

S8. If the TTL parameter is greater than zero, a TARP address is randomly chosen from a list of TARP addresses maintained by the router and the link key and IP address corresponding to that TARP address memorized for use in creating a new IP packet containing the TARP packet.

S9. If the TTL parameter is zero or less, the link key and IP address corresponding to the TARP address of the destination are memorized for use in creating the new IP packet containing the TARP packet.

S10. The TARP packet is encrypted using the memorized link key.

S11. An IP header is added to the packet that contains the stored IP address, the encrypted TARP packet wrapped with an IP header, and the completed packet transmitted to the next hop or destination.

Figure 6:
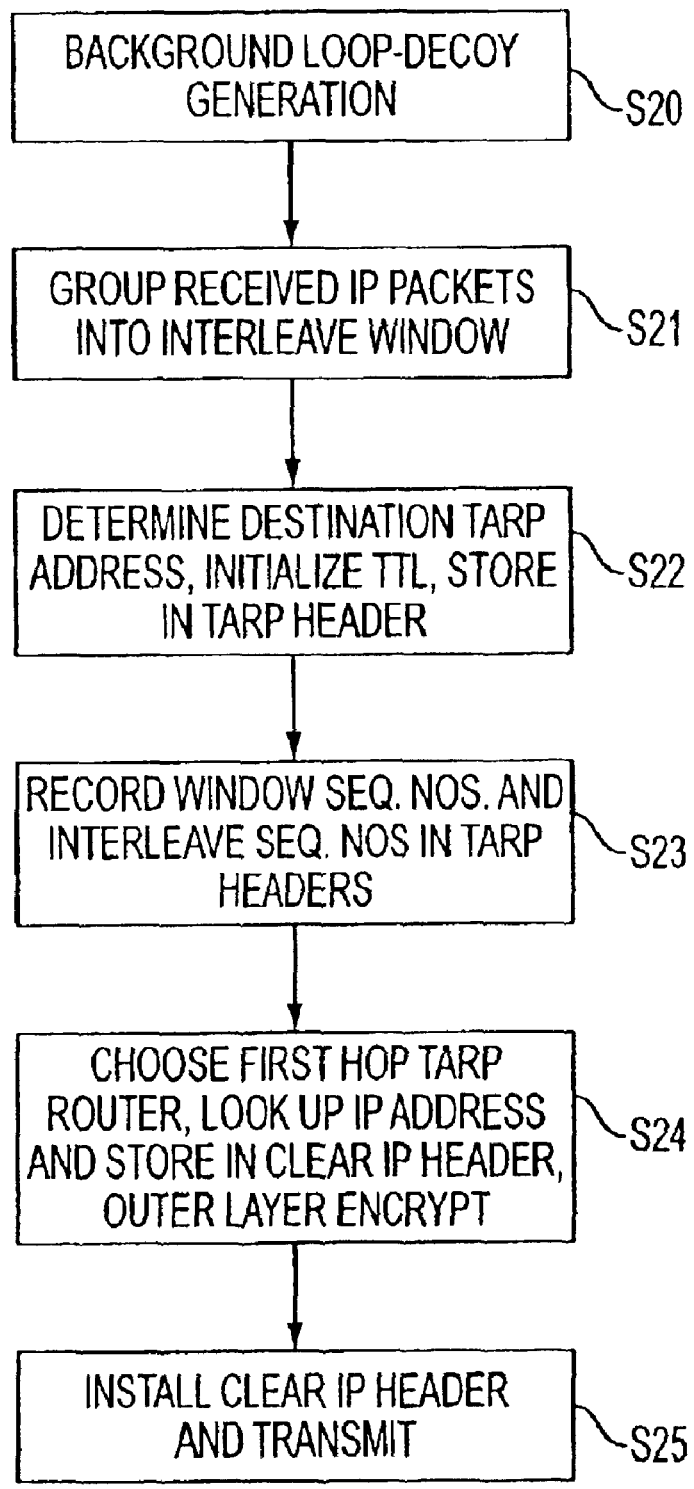
FIG. 6 is a flow chart illustrating a process for forming a tunneled packet according to an embodiment of the invention.

Referring to FIG. 6, the following particular steps may be employed in the above-described method for generating TARP packets.

S20. A background loop operation applies an algorithm that determines the generation of decoy IP packets. The loop is interrupted when a data stream containing IP packets is received for transmission.

S21. The received IP packets are grouped into a set consisting of messages with a constant IP destination address. The set is further broken down to coincide with a maximum size of an interleave window The set is encrypted, and interleaved into a set of payloads destined to become TARP packets.

S22. The TARP address corresponding to the IP address is determined from a lookup table and stored to generate the TARP header. An initial TTL count is generated and stored in the header. The TTL count may be random with minimum and maximum values or it may be fixed or determined by some other parameter.

S23. The window sequence numbers and interleave sequence numbers are recorded in the TARP headers of each packet.

S24. One TARP router address is randomly chosen for each TARP packet and the IP address corresponding to it stored for use in the clear IP header. The link key corresponding to this router is identified and used to encrypt TARP packets containing interleaved and encrypted data and TARP headers.

S25. A clear IP header with the first hop router's real IP address is generated and added to each of the encrypted TARP packets and the resulting packets.

Figure 7:
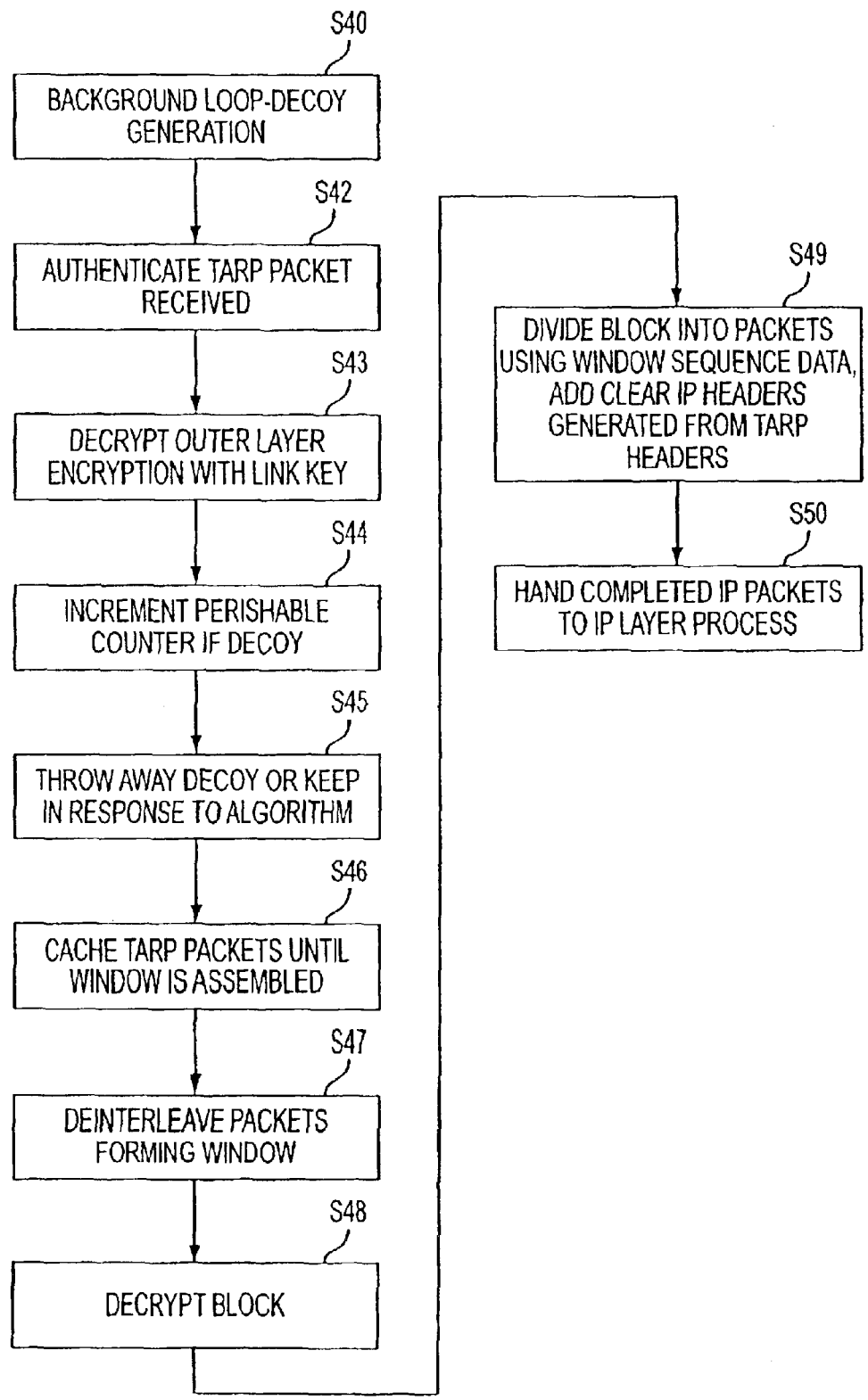
FIG. 7 is a flow chart illustrating a process for receiving a tunneled packet according to an embodiment of the invention.

Referring to FIG. 7, the following particular steps may be employed in the above-described method for receiving TARP packets.

S40. A background loop operation is performed which applies an algorithm which determines the generation of decoy IP packets. The loop is interrupted when an encrypted TARP packet is received.

S42. The TARP packet may be probed to authenticate the packet before attempting to decrypt it using the link key.

S43. The TARP packet is decrypted with the appropriate link key to expose the destination TARP address and an indication of whether the packet is a decoy packet or part of a real message.

S44. If the packet is a decoy packet, the perishable decoy counter is incremented.

S45. Based on the decoy generation/dropping algorithm and the perishable decoy counter value, if the packet is a decoy packet, the receiver may choose to throw it away.

S46. The TARP packets are cached until all packets forming an interleave window are received.

S47. Once all packets of an interleave window are received, the packets are deinterleaved.

S48. The packets block of combined packets defining the interleave window is then decrypted using the session key.

S49. The decrypted block is then divided using the window sequence data and the $IP_T$ headers are converted into normal $IP_C$ headers. The window sequence numbers are integrated in the $IP_C$ headers.

S50. The packets are then handed up to the IP layer processes.

1. Scalability Enhancements

The IP agility feature described above relies on the ability to transmit IP address changes to all TARP routers. The embodiments including this feature will be referred to as "boutique" embodiments due to potential limitations in scaling these features up for a large network, such as the Internet. (The "boutique" embodiments would, however, be robust for use in smaller networks, such as small virtual private networks, for example). One problem with the boutique embodiments is that if IP address changes are to occur frequently, the message traffic required to update all routers sufficiently quickly creates a serious burden on the Internet when the TARP router and/or client population gets large. The bandwidth burden added to the networks, for example in ICMP packets, that would be used to update all the TARP routers could overwhelm the Internet for a large scale implementation that approached the scale of the Internet. In other words, the boutique system's scalability is limited.

A system can be constructed which trades some of the features of the above embodiments to provide the benefits of IP agility without the additional messaging burden. This is accomplished by IP address-hopping according to shared algorithms that govern IP addresses used between links participating in communications sessions between nodes such as TARP nodes. (Note that the IP hopping technique is also applicable to the boutique embodiment.) The IP agility feature discussed with respect to the boutique system can be modified so that it becomes decentralized under this scalable regime and governed by the above-described shared algorithm. Other features of the boutique system may be combined with this new type of IP-agility.

The new embodiment has the advantage of providing IP agility governed by a local algorithm and set of IP addresses exchanged by each communicating pair of nodes. This local governance is session-independent in that it may govern communications between a pair of nodes, irrespective of the session or end points being transferred between the directly communicating pair of nodes.

In the scalable embodiments, blocks of IP addresses are allocated to each node in the network. (This scalability will increase in the future, when Internet Protocol addresses are increased to 128-bit fields, vastly increasing the number of distinctly addressable nodes). Each node can thus use any of the IP addresses assigned to that node to communicate with other nodes in the network. Indeed, each pair of communicating nodes can use a plurality of source IP addresses and destination IP addresses for communicating with each other.

Each communicating pair of nodes in a chain participating in any session stores two blocks of IP addresses, called netblocks, and an algorithm and randomization seed for selecting, from each netblock, the next pair of source/destination IP addresses that will be used to transmit the next message. In other words, the algorithm governs the sequential selection of IP-address pairs, one sender and one receiver IP address, from each netblock. The combination of algorithm, seed, and netblock (IP address block) will be called a "hopblock." A router issues separate transmit and receive hopblocks to its clients. The send address and the receive address of the IP header of each outgoing packet sent by the client are filled with the send and receive IP addresses generated by the algorithm. The algorithm is "clocked" (indexed) by a counter so that each time a pair is used, the algorithm turns out a new transmit pair for the next packet to be sent.

The router's receive hopblock is identical to the client's transmit hopblock. The router uses the receive hopblock to predict what the send and receive IP address pair for the next expected packet from that client will be. Since packets can be received out of order, it is not possible for the router to predict with certainty what IP address pair will be on the next sequential packet. To account for this problem, the router generates a range of predictions encompassing the number of possible transmitted packet send/receive addresses, of which the next packet received could leap ahead. Thus, if there is a vanishingly small probability that a given packet will arrive at the router ahead of 5 packets transmitted by the client before the given packet, then the router can generate a series of 6 send/receive IP address pairs (or "hop window") to compare with the next received packet. When a packet is received, it is marked in the hop window as such, so that a second packet with the same IP address pair will be discarded. If an out-of-sequence packet does not arrive within a predetermined timeout period, it can be requested for retransmission or simply discarded from the receive table, depending upon the protocol in use for that communications session, or possibly by convention.

When the router receives the client's packet, it compares the send and receive IP addresses of the packet with the next N predicted send and receive IP address pairs and rejects the packet if it is not a member of this set. Received packets that do not have the predicted source/destination IP addresses falling with the window are rejected, thus thwarting possible hackers. (With the number of possible combinations, even a fairly large window would be hard to fall into at random.) If it is a member of this set, the router accepts the packet and processes it further. This link-based IP-hopping strategy, referred to as "IHOP," is a network element that stands on its own and is not necessarily accompanied by elements of the boutique system described above. If the routing agility feature described in connection with the boutique embodiment is combined with this link-based IP-hopping strategy, the router's next step would be to decrypt the TARP header to determine the destination TARP router for the packet and determine what should be the next hop for the packet. The TARP router would then forward the packet to a random TARP router or the destination TARP router with which the source TARP router has a link-based IP hopping communication established.

Figure 8:
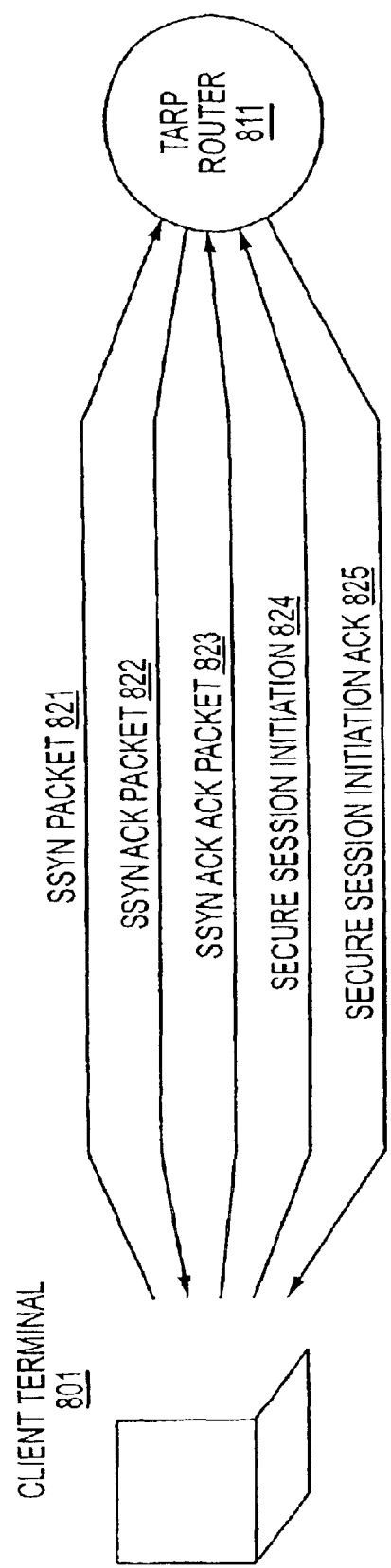
FIG. 8 shows how a secure session is established and synchronized between a client and a TARP router.
Figure 9:
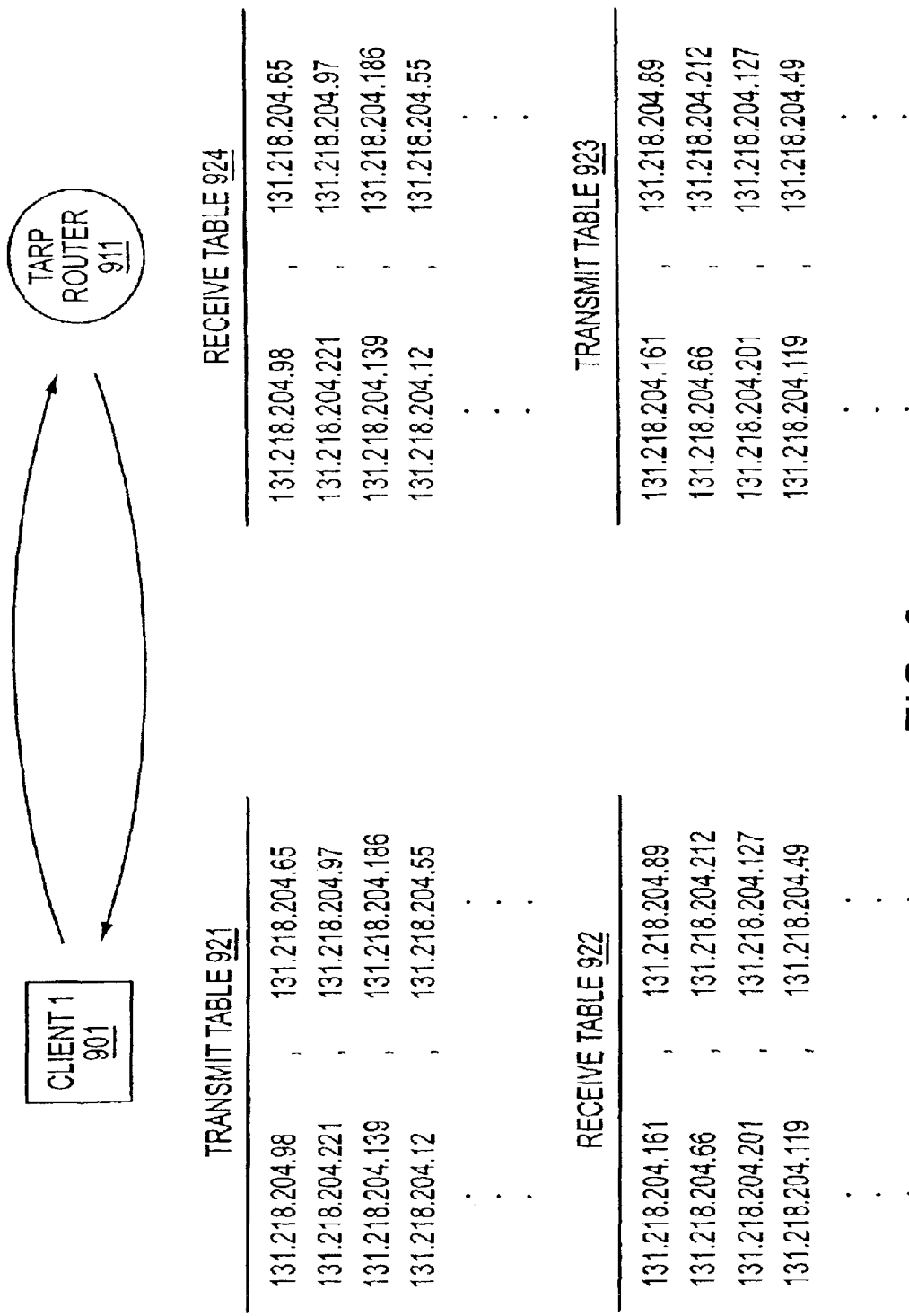
FIG. 9 shows an IP address hopping scheme between a client computer and TARP router using transmit and receive tables in each computer.

FIG. 8 shows how a client computer 801 and a TARP router 811 can establish a secure session. When client 801 seeks to establish an IHOP session with TARP router 811, the client 801 sends "secure synchronization" request ("SSYN") packet 821 to the TARP router 811. This SYN packet 821 contains the client's 801 authentication token, and may be sent to the router 811 in an encrypted format. The source and destination IP numbers on the packet 821 are the client's 801 current fixed IP address, and a "known" fixed IP address for the router 811. (For security purposes, it may be desirable to reject any packets from outside of the local network that are destined for the router's known fixed IP address.) Upon receipt and validation of the client's 801 SSYN packet 821, the router 811 responds by sending an encrypted "secure synchronization acknowledgment" ("SSYN ACK") 822 to the client 801. This SSYN ACK 822 will contain the transmit and receive hopblocks that the client 801 will use when communicating with the TARP router 811. The client 801 will acknowledge the TARP router's 811 response packet 822 by generating an encrypted SSYN ACK ACK packet 823 which will be sent from the client's 801 fixed IP address and to the TARP router's 811 known fixed IP address. The client 801 will simultaneously generate a SSYN ACK ACK packet; this SSYN ACK packet, referred to as the Secure Session Initiation (SSI) packet 824, will be sent with the first {sender, receiver} IP pair in the client's transmit table 921 (FIG. 9), as specified in the transmit hopblock provided by the TARP router 811 in the SSYN ACK packet 822. The TARP router 811 will respond to the SSI packet 824 with an SSI ACK packet 825, which will be sent with the first {sender, receiver} IP pair in the TARP router's transmit table 923. Once these packets have been successfully exchanged, the secure communications session is established, and all further secure communications between the client 801 and the TARP router 811 will be conducted via this secure session, as long as synchronization is maintained. If synchronization is lost, then the client 801 and TARP router 802 may re-establish the secure session by the procedure outlined in FIG. 8 and described above.

While the secure session is active, both the client 901 and TARP router 911 (FIG. 9) will maintain their respective transmit tables 921, 923 and receive tables 922, 924, as provided by the TARP router during session synchronization 822. It is important that the sequence of IP pairs in the client's transmit table 921 be identical to those in the TARP router's receive table 924; similarly, the sequence of IP pairs in the client's receive table 922 must be identical to those in the router's transmit table 923. This is required for the session synchronization to be maintained. The client 901 need maintain only one transmit table 921 and one receive table 922 during the course of the secure session. Each sequential packet sent by the client 901 will employ the next {send, receive} IP address pair in the transmit table, regardless of TCP or UDP session. The TARP router 911 will expect each packet arriving from the client 901 to bear the next IP address pair shown in its receive table.

Since packets can arrive out of order, however, the router 911 can maintain a "look ahead" buffer in its receive table, and will mark previously-received IP pairs as invalid for future packets; any future packet containing an IP pair that is in the look-ahead buffer but is marked as previously received will be discarded. Communications from the TARP router 911 to the client 901 are maintained in an identical manner; in particular, the router 911 will select the next IP address pair from its transmit table 923 when constructing a packet to send to the client 901, and the client 901 will maintain a look-ahead buffer of expected IP pairs on packets that it is receiving. Each TARP router will maintain separate pairs of transmit and receive tables for each client that is currently engaged in a secure session with or through that TARP router.

While clients receive their hopblocks from the first server linking them to the Internet, routers exchange hopblocks. When a router establishes a link-based IP-hopping communication regime with another router, each router of the pair exchanges its transmit hopblock. The transmit hopblock of each router becomes the receive hopblock of the other router. The communication between routers is governed as described by the example of a client sending a packet to the first router.

While the above strategy works fine in the IP milieu, many local networks that are connected to the Internet are Ethernet systems. In Ethernet, the IP addresses of the destination devices must be translated into hardware addresses, and vice versa, using known processes ("address resolution protocol," and "reverse address resolution protocol"). However, if the link-based IP-hopping strategy is employed, the correlation process would become explosive and burdensome. An alternative to the link-based IP hopping strategy may be employed within an Ethernet network. The solution is to provide that the node linking the Internet to the Ethernet (call it the border node) use the link-based IP-hopping communication regime to communicate with nodes outside the Ethernet LAN. Within the Ethernet LAN, each TARP node would have a single IP address which would be addressed in the conventional way. Instead of comparing the {sender, receiver} IP address pairs to authenticate a packet, the intra-LAN TARP node would use one of the IP header extension fields to do so. Thus, the border node uses an algorithm shared by the intra-LAN TARP node to generate a symbol that is stored in the free field in the IP header, and the intra-LAN TARP node generates a range of symbols based on its prediction of the next expected packet to be received from that particular source IP address. The packet is rejected if it does not fall into the set of predicted symbols (for example, numerical values) or is accepted if it does. Communications from the intra-LAN TARP node to the border node are accomplished in the same manner, though the algorithm will necessarily be different for security reasons. Thus, each of the communicating nodes will generate transmit and receive tables in a similar manner to that of FIG. 9; the intra-LAN TARP nodes transmit table will be identical to the border node's receive table, and the intra-LAN TARP node's receive table will be identical to the border node's transmit table.

The algorithm used for IP address-hopping can be any desired algorithm. For example, the algorithm can be a given pseudo-random number generator that generates numbers of the range covering the allowed IP addresses with a given seed. Alternatively, the session participants can assume a certain type of algorithm and specify simply a parameter for applying the algorithm. For example the assumed algorithm could be a particular pseudo-random number generator and the session participants could simply exchange seed values.

Note that there is no permanent physical distinction between the originating and destination terminal nodes. Either device at either end point can initiate a synchronization of the pair. Note also that the authentication/synchronization-request (and acknowledgment) and hopblock-exchange may all be served by a single message so that separate message exchanges may not be required.

Figure 10:
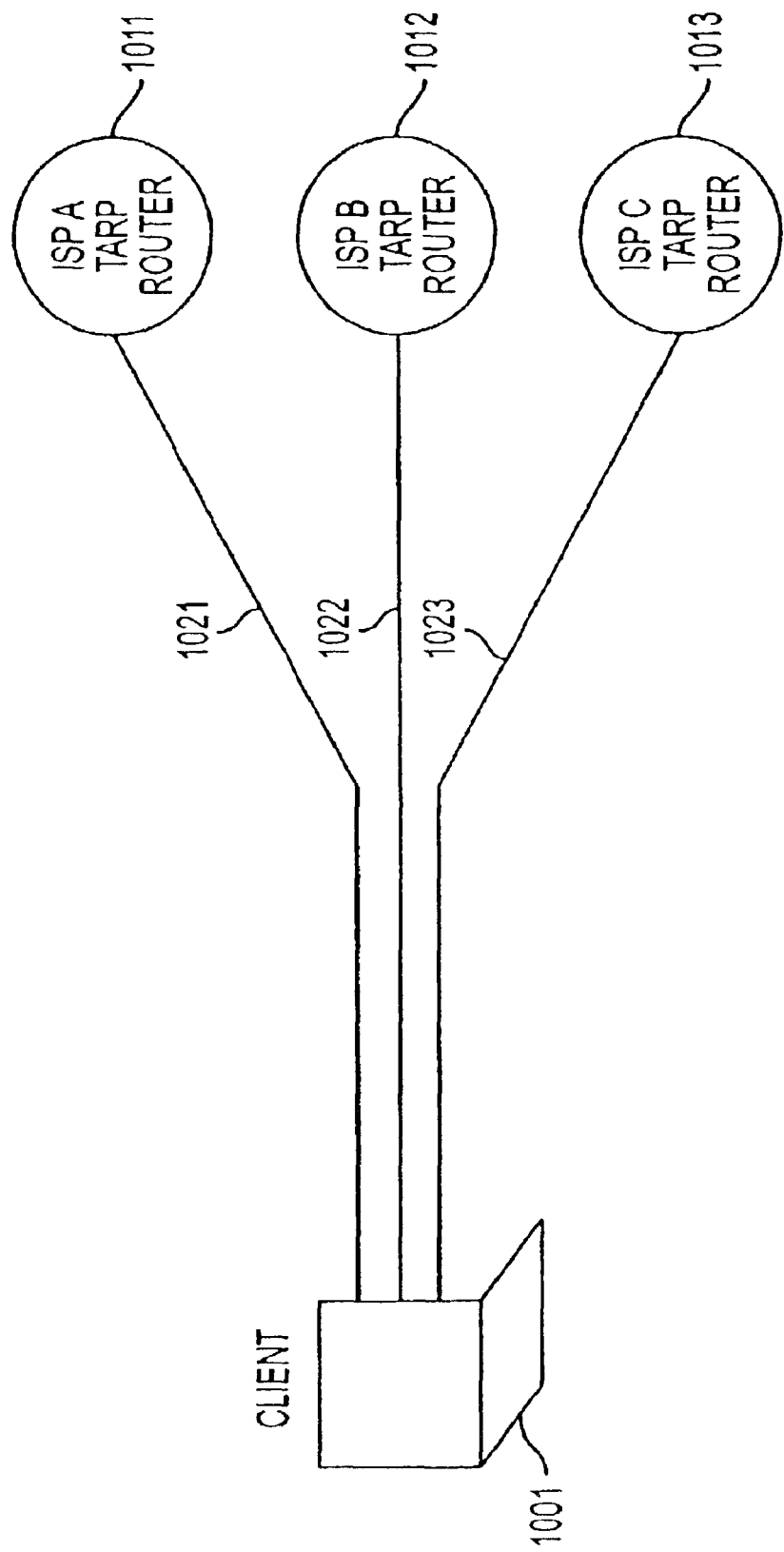
FIG. 10 shows physical link redundancy among three Internet Service Providers (ISPs) and a client computer.

As another extension to the stated architecture, multiple physical paths can be used by a client, in order to provide link redundancy and further thwart attempts at denial of service and traffic monitoring. As shown in FIG. 10, for example, client 1001 can establish three simultaneous sessions with each of three TARP routers provided by different ISPs 1011, 1012, 1013. As an example, the client 1001 can use three different telephone lines 1021, 1022, 1023 to connect to the ISPs, or two telephone lines and a cable modem, etc. In this scheme, transmitted packets will be sent in a random fashion among the different physical paths. This architecture provides a high degree of communications redundancy, with improved immunity from denial-of-service attacks and traffic monitoring.

2. Further Extensions

The following describes various extensions to the techniques, systems, and methods described above. As described above, the security of communications occurring between computers in a computer network (such as the Internet, an Ethernet, or others) can be enhanced by using seemingly random source and destination Internet Protocol (IP) addresses for data packets transmitted over the network. This feature prevents eavesdroppers from determining which computers in the network are communicating with each other while permitting the two communicating computers to easily recognize whether a given received data packet is legitimate or not. In one embodiment of the above-described systems, an IP header extension field is used to authenticate incoming packets on an Ethernet.

Various extensions to the previously described techniques described herein include: (1) use of hopped hardware or "MAC" addresses in broadcast type network; (2) a self-synchronization technique that permits a computer to automatically regain synchronization with a sender; (3) synchronization algorithms that allow transmitting and receiving computers to quickly re-establish synchronization in the event of lost packets or other events; and (4) a fast-packet rejection mechanism for rejecting invalid packets. Any or all of these extensions can be combined with the features described above in any of various ways.

A. Hardware Address Hopping

Figure 11:
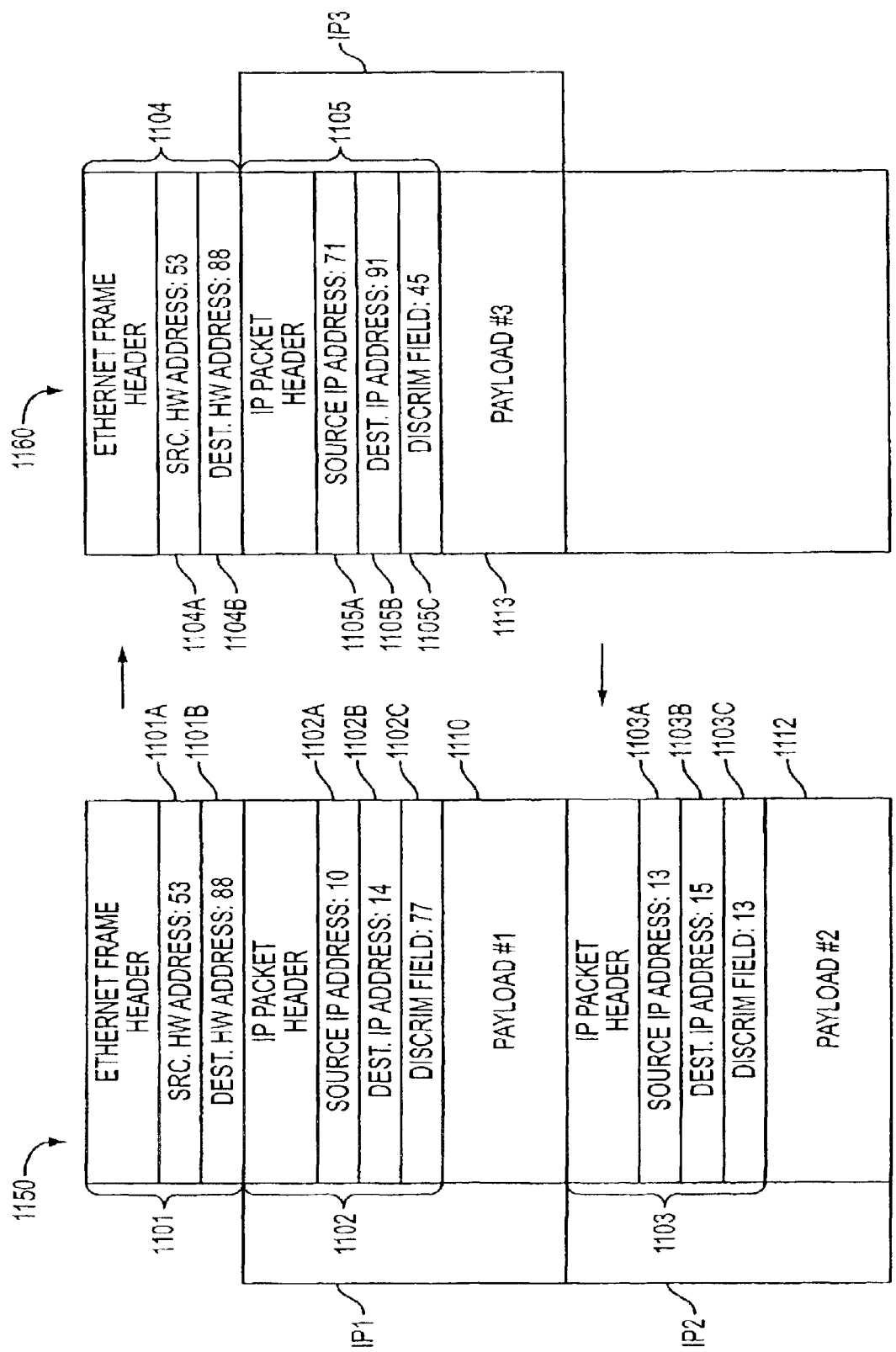
FIG. 11 shows how multiple IP packets can be embedded into a single "frame" such as an Ethernet frame, and further shows the use of a discriminator field to camouflage true packet recipients.

Internet protocol-based communications techniques on a LAN—or across any dedicated physical medium—typically embed the IP packets within lower-level packets, often referred to as "frames." As shown in FIG. 11, for example, a first Ethernet frame 1150 comprises a frame header 1101 and two embedded IP packets IP1 and IP2, while a second Ethernet frame 1160 comprises a different frame header 1104 and a single IP packet IP3. Each frame header generally includes a source hardware address 1101A and a destination hardware address 1101B; other well-known fields in frame headers are omitted from FIG. 11 for clarity. Two hardware nodes communicating over a physical communication channel insert appropriate source and destination hardware addresses to indicate which nodes on the channel or network should receive the frame.

It may be possible for a nefarious listener to acquire information about the contents of a frame and/or its communicants by examining frames on a local network rather than (or in addition to) the IP packets themselves. This is especially true in broadcast media, such as Ethernet, where it is necessary to insert into the frame header the hardware address of the machine that generated the frame and the hardware address of the machine to which frame is being sent. All nodes on the network can potentially "see" all packets transmitted across the network. This can be a problem for secure communications, especially in cases where the communicants do not want for any third party to be able to identify who is engaging in the information exchange. One way to address this problem is to push the address-hopping scheme down to the hardware layer. In accordance with various embodiments of the invention, hardware addresses are "hopped" in a manner similar to that used to change IP addresses, such that a listener cannot determine which hardware node generated a particular message nor which node is the intended recipient.

Figure 12A:
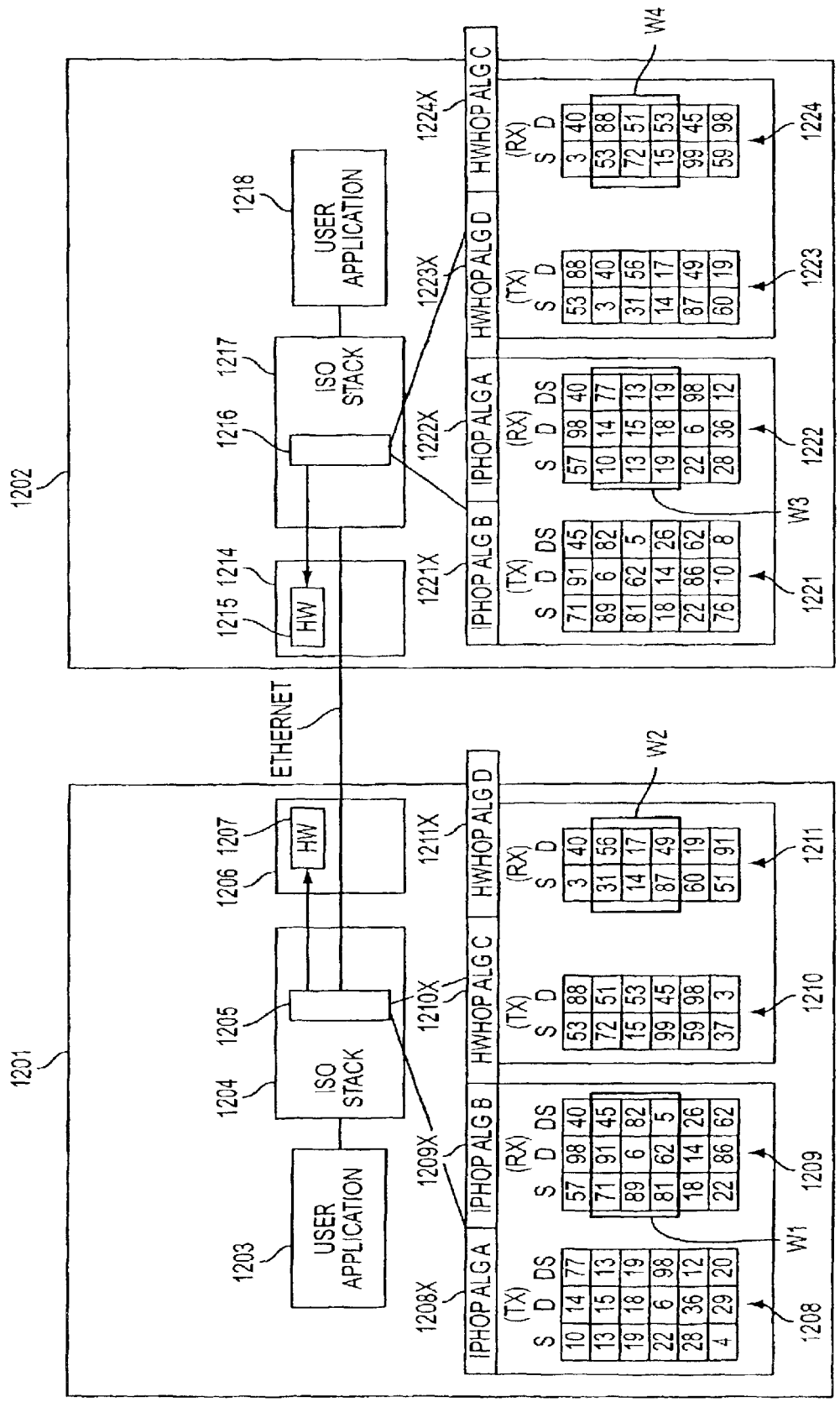
FIG. 12A shows a system that employs hopped hardware addresses, hopped IP addresses, and hopped discriminator fields.

FIG. 12A shows a system in which Media Access Control ("MAC") hardware addresses are "hopped" in order to increase security over a network such as an Ethernet. While the description refers to the exemplary case of an Ethernet environment, the inventive principles are equally applicable to other types of communications media. In the Ethernet case, the MAC address of the sender and receiver are inserted into the Ethernet frame and can be observed by anyone on the LAN who is within the broadcast range for that frame. For secure communications, it becomes desirable to generate frames with MAC addresses that are not attributable to any specific sender or receiver.

As shown in FIG. 12A, two computer nodes 1201 and 1202 communicate over a communication channel such as an Ethernet. Each node executes one or more application programs 1203 and 1218 that communicate by transmitting packets through communication software 1204 and 1217, respectively. Examples of application programs include video conferencing, e-mail, word processing programs, telephony, and the like. Communication software 1204 and 1217 can comprise, for example, an OSI layered architecture or "stack" that standardizes various services provided at different levels of functionality.

The lowest levels of communication software 1204 and 1217 communicate with hardware components 1206 and 1214 respectively, each of which can include one or more registers 1207 and 1215 that allow the hardware to be reconfigured or controlled in accordance with various communication protocols. The hardware components (an Ethernet network interface card, for example) communicate with each other over the communication medium. Each hardware component is typically pre-assigned a fixed hardware address or MAC number that identifies the hardware component to other nodes on the network. One or more interface drivers control the operation of each card and can, for example, be configured to accept or reject packets from certain hardware addresses. As will be described in more detail below, various embodiments of the inventive principles provide for "hopping" different addresses using one or more algorithms and one or more moving windows that track a range of valid addresses to validate received packets. Packets transmitted according to one or more of the inventive principles will be generally referred to as "secure" packets or "secure communications" to differentiate them from ordinary data packets that are transmitted in the clear using ordinary, machine-correlated addresses.

One straightforward method of generating non-attributable MAC addresses is an extension of the IP hopping scheme. In this scenario, two machines on the same LAN that desire to communicate in a secure fashion exchange random-number generators and seeds, and create sequences of quasi-random MAC addresses for synchronized hopping. The implementation and synchronization issues are then similar to that of IP hopping.

This approach, however, runs the risk of using MAC addresses that are currently active on the LAN—which, in turn, could interrupt communications for those machines. Since an Ethernet MAC address is at present 48 bits in length, the chance of randomly misusing an active MAC address is actually quite small. However, if that figure is multiplied by a large number of nodes (as would be found on an extensive LAN), by a large number of frames (as might be the case with packet voice or streaming video), and by a large number of concurrent Virtual Private Networks (VPNs), then the chance that a non-secure machine's MAC address could be used in an address-hopped frame can become non-trivial. In short, any scheme that runs even a small risk of interrupting communications for other machines on the LAN is bound to receive resistance from prospective system administrators. Nevertheless, it is technically feasible, and can be implemented without risk on a LAN on which there is a small number of machines, or if all of the machines on the LAN are engaging in MAC-hopped communications.

Synchronized MAC address hopping may incur some overhead in the course of session establishment, especially if there are multiple sessions or multiple nodes involved in the communications. A simpler method of randomizing MAC addresses is to allow each node to receive and process every incident frame on the network. Typically, each network interface driver will check the destination MAC address in the header of every incident frame to see if it matches that machine's MAC address; if there is no match, then the frame is discarded. In one embodiment, however, these checks can be disabled, and every incident packet is passed to the TARP stack for processing. This will be referred to as "promiscuous" mode, since every incident frame is processed. Promiscuous mode allows the sender to use completely random, unsynchronized MAC addresses, since the destination machine is guaranteed to process the frame. The decision as to whether the packet was truly intended for that machine is handled by the TARP stack, which checks the source and destination IP addresses for a match in its IP synchronization tables. If no match is found, the packet is discarded; if there is a match, the packet is unwrapped, the inner header is evaluated, and if the inner header indicates that the packet is destined for that machine then the packet is forwarded to the IP stack—otherwise it is discarded.

One disadvantage of purely-random MAC address hopping is its impact on processing overhead; that is, since every incident frame must be processed, the machine's CPU is engaged considerably more often than if the network interface driver is discriminating and rejecting packets unilaterally. A compromise approach is to select either a single fixed MAC address or a small number of MAC addresses (e.g., one for each virtual private network on an Ethernet) to use for MAC-hopped communications, regardless of the actual recipient for which the message is intended. In this mode, the network interface driver can check each incident frame against one (or a few) pre-established MAC addresses, thereby freeing the CPU from the task of physical-layer packet discrimination. This scheme does not betray any useful information to an interloper on the LAN; in particular, every secure packet can already be identified by a unique packet type in the outer header. However, since all machines engaged in secure communications would either be using the same MAC address, or be selecting from a small pool of predetermined MAC addresses, the association between a specific machine and a specific MAC address is effectively broken.

In this scheme, the CPU will be engaged more often than it would be in non-secure communications (or in synchronized MAC address hopping), since the network interface driver cannot always unilaterally discriminate between secure packets that are destined for that machine, and secure packets from other VPNs. However, the non-secure traffic is easily eliminated at the network interface, thereby reducing the amount of processing required of the CPU. There are boundary conditions where these statements would not hold, of course—e.g., if all of the traffic on the LAN is secure traffic, then the CPU would be engaged to the same degree as it is in the purely-random address hopping case; alternatively, if each VPN on the LAN uses a different MAC address, then the network interface can perfectly discriminate secure frames destined for the local machine from those constituting other VPNs. These are engineering tradeoffs that might be best handled by providing administrative options for the users when installing the software and/or establishing VPNs.

Even in this scenario, however, there still remains a slight risk of selecting MAC addresses that are being used by one or more nodes on the LAN. One solution to this problem is to formally assign one address or a range of addresses for use in MAC-hopped communications. This is typically done via an assigned numbers registration authority; e.g., in the case of Ethernet, MAC address ranges are assigned to vendors by the Institute of Electrical and Electronics Engineers (IEEE). A formally-assigned range of addresses would ensure that secure frames do not conflict with any properly-configured and properly-functioning machines on the LAN.

Reference will now be made to FIGS. 12A and 12B in order to describe the many combinations and features that follow the inventive principles. As explained above, two computer nodes 1201 and 1202 are assumed to be communicating over a network or communication medium such as an Ethernet. A communication protocol in each node (1204 and 1217, respectively) contains a modified element 1205 and 1216 that performs certain functions that deviate from the standard communication protocols. In particular, computer node 1201 implements a first "hop" algorithm 1208X that selects seemingly random source and destination IP addresses (and, in one embodiment, seemingly random IP header discriminator fields) in order to transmit each packet to the other computer node. For example, node 1201 maintains a transmit table 1208 containing triplets of source (S), destination (D), and discriminator fields (DS) that are inserted into outgoing IP packet headers. The table is generated through the use of an appropriate algorithm (e.g., a random number generator that is seeded with an appropriate seed) that is known to the recipient node 1202. As each new IP packet is formed, the next sequential entry out of the sender's transmit table 1208 is used to populate the IP source, IP destination, and IP header extension field (e.g., discriminator field). It will be appreciated that the transmit table need not be created in advance but could instead be created on-the-fly by executing the algorithm when each packet is formed.

At the receiving node 1202, the same IP hop algorithm 1222X is maintained and used to generate a receive table 1222 that lists valid triplets of source IP address, destination IP address, and discriminator field. This is shown by virtue of the first five entries of transmit table 1208 matching the second five entries of receive table 1222. (The tables may be slightly offset at any particular time due to lost packets, misordered packets, or transmission delays). Additionally, node 1202 maintains a receive window W3 that represents a list of valid IP source, IP destination, and discriminator fields that will be accepted when received as part of an incoming IP packet. As packets are received, window W3 slides down the list of valid entries, such that the possible valid entries change over time. Two packets that arrive out of order but are nevertheless matched to entries within window W3 will be accepted; those failing outside of window W3 will be rejected as invalid. The length of window W3 can be adjusted as necessary to reflect network delays or other factors.

Node 1202 maintains a similar transmit table 1221 for creating IP packets and frames destined for node 1201 using a potentially different hopping algorithm 1221X, and node 1201 maintains a matching receive table 1209 using the same algorithm 1209X. As node 1202 transmits packets to node 1201 using seemingly random IP source, IP destination, and/or discriminator fields, node 1201 matches the incoming packet values to those falling within window W1 maintained in its receive table. In effect, transmit table 1208 of node 1201 is synchronized (i.e., entries are selected in the same order) to receive table 1222 of receiving node 1202. Similarly, transmit table 1221 of node 1202 is synchronized to receive table 1209 of node 1201. It will be appreciated that although a common algorithm is shown for the source, destination and discriminator fields in FIG. 12A (using, e.g., a different seed for each of the three fields), an entirely different algorithm could in fact be used to establish values for each of these fields. It will also be appreciated that one or two of the fields can be "hopped" rather than all three as illustrated.

In accordance with another aspect of the invention, hardware or "MAC" addresses are hopped instead of or in addition to IP addresses and/or the discriminator field in order to improve security in a local area or broadcast-type network. To that end, node 1201 further maintains a transmit table 1210 using a transmit algorithm 1210X to generate source and destination hardware addresses that are inserted into frame headers (e.g., fields 1101A and 1101B in FIG. 11) that are synchronized to a corresponding receive table 1224 at node 1202. Similarly, node 1202 maintains a different transmit table 1223 containing source and destination hardware addresses that is synchronized with a corresponding receive table 1211 at node 1201. In this manner, outgoing hardware frames appear to be originating from and going to completely random nodes on the network, even though each recipient can determine whether a given packet is intended for it or not. It will be appreciated that the hardware hopping feature can be implemented at a different level in the communications protocol than the IP hopping feature (e.g., in a card driver or in a hardware card itself to improve performance)

FIG. 12B shows three different embodiments or modes that can be employed using the aforementioned principles. In a first mode referred to as "promiscuous" mode, a common hardware address (e.g., a fixed address for source and another for destination) or else a completely random hardware address is used by all nodes on the network, such that a particular packet cannot be attributed to any one node. Each node must initially accept all packets containing the common (or random) hardware address and inspect the IP addresses or discriminator field to determine whether the packet is intended for that node. In this regard, either the IP addresses or the discriminator field or both can be varied in accordance with an algorithm as described above. As explained previously, this may increase each node's overhead since additional processing is involved to determine whether a given packet has valid source and destination hardware addresses.

In a second mode referred to as "promiscuous per VPN" mode, a small set of fixed hardware addresses are used, with a fixed source/destination hardware address used for all nodes communicating over a virtual private network. For example, if there are six nodes on an Ethernet, and the network is to be split up into two private virtual networks such that nodes on one VPN can communicate with only the other two nodes on its own VPN, then two sets of hardware addresses could be used: one set for the first VPN and a second set for the second VPN. This would reduce the amount of overhead involved in checking for valid frames since only packets arriving from the designated VPN would need to be checked. IP addresses and one or more discriminator fields could still be hopped as before for secure communication within the VPN. Of course, this solution compromises the anonymity of the VPNs (i.e., an outsider can easily tell what traffic belongs in which VPN, though he cannot correlate it to a specific machine/person). It also requires the use of a discriminator field to mitigate the vulnerability to certain types of DoS attacks. (For example, without the discriminator field, an attacker on the LAN could stream frames containing the MAC addresses being used by the VPN; rejecting those frames could lead to excessive processing overhead. The discriminator field would provide a low-overhead means of rejecting the false packets.)

In a third mode referred to as "hardware hopping" mode, hardware addresses are varied as illustrated in FIG. 12A, such that hardware source and destination addresses are changed constantly in order to provide non-attributable addressing. Variations on these embodiments are of course possible, and the invention is not intended to be limited in any respect by these illustrative examples.

B. Extending the Address Space

Address hopping provides security and privacy. However, the level of protection is limited by the number of addresses in the blocks being hopped. A hopblock denotes a field or fields modulated on a packet-wise basis for the purpose of providing a VPN. For instance, if two nodes communicate with IP address hopping using hopblocks of 4 addresses (2 bits) each, there would be 16 possible address-pair combinations. A window of size 16 would result in most address pairs being accepted as valid most of the time. This limitation can be overcome by using a discriminator field in addition to or instead of the hopped address fields. The discriminator field would be hopped in exactly the same fashion as the address fields and it would be used to determine whether a packet should be processed by a receiver.

Suppose that two clients, each using four-bit hopblocks, would like the same level of protection afforded to clients communicating via IP hopping between two A blocks (24 address bits eligible for hopping). A discriminator field of 20 bits, used in conjunction with the 4 address bits eligible for hopping in the IP address field, provides this level of protection. A 24-bit discriminator field would provide a similar level of protection if the address fields were not hopped or ignored. Using a discriminator field offers the following advantages: (1) an arbitrarily high level of protection can be provided, and (2) address hopping is unnecessary to provide protection. This may be important in environments where address hopping would cause routing problems.

C. Synchronization Techniques

It is generally assumed that once a sending node and receiving node have exchanged algorithms and seeds (or similar information sufficient to generate quasi-random source and destination tables), subsequent communication between the two nodes will proceed smoothly. Realistically, however, two nodes may lose synchronization due to network delays or outages, or other problems. Consequently, it is desirable to provide means for re-establishing synchronization between nodes in a network that have lost synchronization.

One possible technique is to require that each node provide an acknowledgment upon successful receipt of each packet and, if no acknowledgment is received within a certain period of time, to re-send the unacknowledged packet. This approach, however, drives up overhead costs and may be prohibitive in high-throughput environments such as streaming video or audio, for example.

A different approach is to employ an automatic synchronizing technique that will be referred to herein as "self-synchronization." In this approach, synchronization information is embedded into each packet, thereby enabling the receiver to re-synchronize itself upon receipt of a single packet if it determines that is has lost synchronization with the sender. (If communications are already in progress, and the receiver determines that it is still in sync with the sender, then there is no need to re-synchronize.) A receiver could detect that it was out of synchronization by, for example, employing a "dead-man" timer that expires after a certain period of time, wherein the timer is reset with each valid packet. A time stamp could be hashed into the public sync field (see below) to preclude packet-retry attacks.

In one embodiment, a "sync field" is added to the header of each packet sent out by the sender. This sync field could appear in the clear or as part of an encrypted portion of the packet. Assuming that a sender and receiver have selected a random-number generator (RNG) and seed value, this combination of RNG and seed can be used to generate a random-number sequence (RNS). The RNS is then used to generate a sequence of source/destination IP pairs (and, if desired, discriminator fields and hardware source and destination addresses), as described above. It is not necessary, however, to generate the entire sequence (or the first N−1 values) in order to generate the Nth random number in the sequence; if the sequence index N is known, the random value corresponding to that index can be directly generated (see below). Different RNGs (and seeds) with different fundamental periods could be used to generate the source and destination IP sequences, but the basic concepts would still apply. For the sake of simplicity, the following discussion will assume that IP source and destination address pairs (only) are hopped using a single RNG sequencing mechanism.

In accordance with a "self-synchronization" feature, a sync field in each packet header provides an index (i.e., a sequence number) into the RNS that is being used to generate IP pairs. Plugging this index into the RNG that is being used to generate the RNS yields a specific random number value, which in turn yields a specific IP pair. That is, an IP pair can be generated directly from knowledge of the RNG, seed, and index number; it is not necessary, in this scheme, to generate the entire sequence of random numbers that precede the sequence value associated with the index number provided.

Since the communicants have presumably previously exchanged RNGs and seeds, the only new information that must be provided in order to generate an IP pair is the sequence number. If this number is provided by the sender in the packet header, then the receiver need only plug this number into the RNG in order to generate an IP pair—and thus verify that the IP pair appearing in the header of the packet is valid. In this scheme, if the sender and receiver lose synchronization, the receiver can immediately re-synchronize upon receipt of a single packet by simply comparing the IP pair in the packet header to the IP pair generated from the index number. Thus, synchronized communications can be resumed upon receipt of a single packet, making this scheme ideal for multicast communications. Taken to the extreme, it could obviate the need for synchronization tables entirely; that is, the sender and receiver could simply rely on the index number in the sync field to validate the IP pair on each packet, and thereby eliminate the tables entirely.

The aforementioned scheme may have some inherent security issues associated with it—namely, the placement of the sync field. If the field is placed in the outer header, then an interloper could observe the values of the field and their relationship to the IP stream. This could potentially compromise the algorithm that is being used to generate the IP-address sequence, which would compromise the security of the communications. If, however, the value is placed in the inner header, then the sender must decrypt the inner header before it can extract the sync value and validate the IP pair; this opens up the receiver to certain types of denial-of-service (DoS) attacks, such as packet replay. That is, if the receiver must decrypt a packet before it can validate the IP pair, then it could potentially be forced to expend a significant amount of processing on decryption if an attacker simply retransmits previously valid packets. Other attack methodologies are possible in this scenario.

A possible compromise between algorithm security and processing speed is to split up the sync value between an inner (encrypted) and outer (unencrypted) header. That is, if the sync value is sufficiently long, it could potentially be split into a rapidly-changing part that can be viewed in the clear, and a fixed (or very slowly changing) part that must be protected. The part that can be viewed in the clear will be called the "public sync" portion and the part that must be protected will be called the "private sync" portion.

Both the public sync and private sync portions are needed to generate the complete sync value. The private portion, however, can be selected such that it is fixed or will change only occasionally. Thus, the private sync value can be stored by the recipient, thereby obviating the need to decrypt the header in order to retrieve it. If the sender and receiver have previously agreed upon the frequency with which the private part of the sync will change, then the receiver can selectively decrypt a single header in order to extract the new private sync if the communications gap that has led to lost synchronization has exceeded the lifetime of the previous private sync. This should not represent a burdensome amount of decryption, and thus should not open up the receiver to denial-of-service attack simply based on the need to occasionally decrypt a single header.

Figure 13:
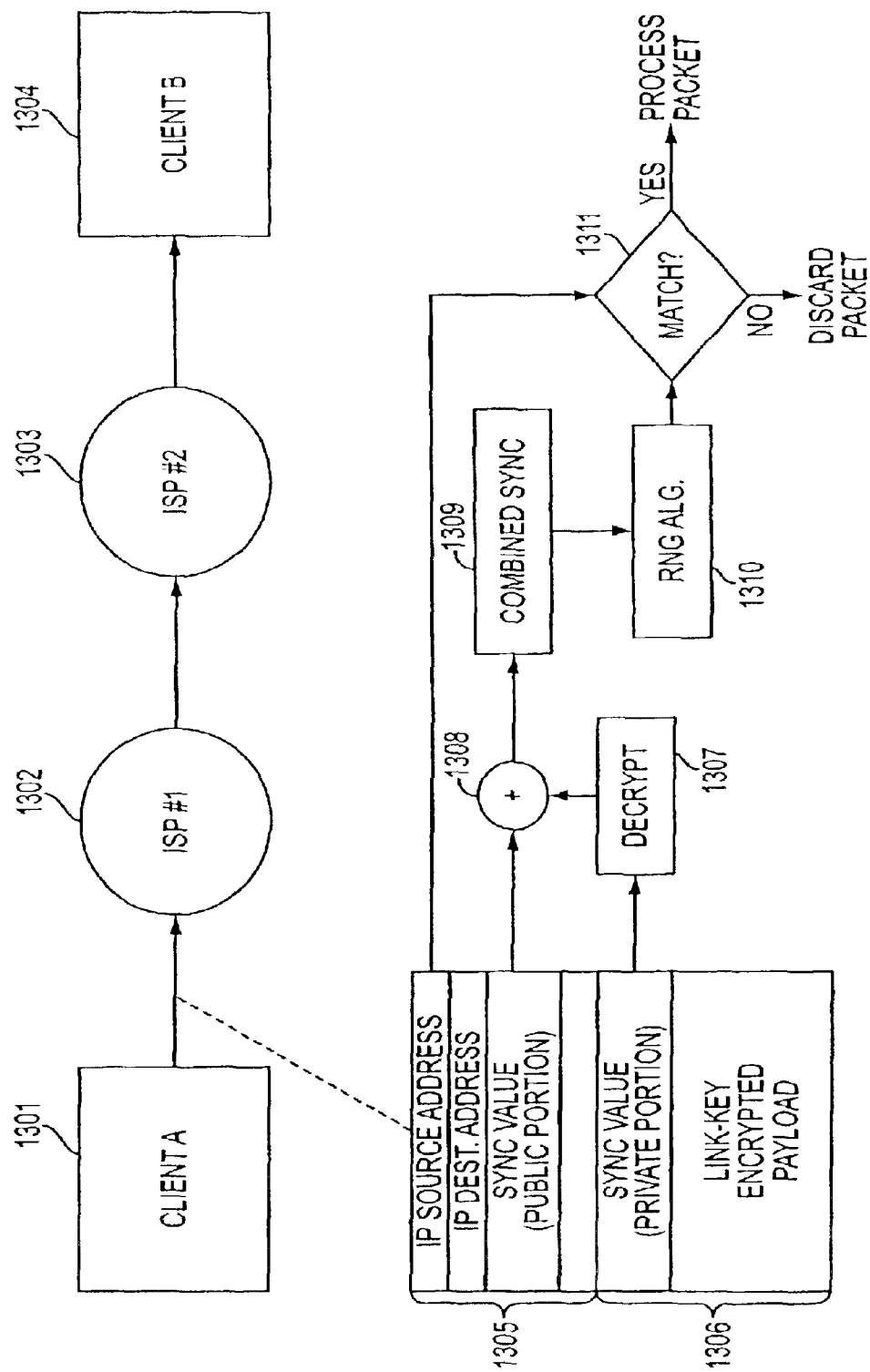
FIG. 13 shows a technique for automatically re-establishing synchronization between sender and receiver through the use of a partially public sync value.

One implementation of this is to use a hashing function with a one-to-one mapping to generate the private and public sync portions from the sync value. This implementation is shown in FIG. 13, where (for example) a first ISP 1302 is the sender and a second ISP 1303 is the receiver. (Other alternatives are possible from FIG. 13.) A transmitted packet comprises a public or "outer" header 1305 that is not encrypted, and a private or "inner" header 1306 that is encrypted using for example a link key. Outer header 1305 includes a public sync portion while inner header 1306 contains the private sync portion. A receiving node decrypts the inner header using a decryption function 1307 in order to extract the private sync portion. This step is necessary only if the lifetime of the currently buffered private sync has expired (If the currently-buffered private sync is still valid, then it is simply extracted from memory and "added" (which could be an inverse hash) to the public sync, as shown in step 1308.) The public and decrypted private sync portions are combined in function 1308 in order to generate the combined sync 1309. The combined sync (1309) is then fed into the RNG (1310) and compared to the IP address pair (1311) to validate or reject the packet.

An important consideration in this architecture is the concept of "future" and "past" where the public sync values are concerned. Though the sync values, themselves, should be random to prevent spoofing attacks, it may be important that the receiver be able to quickly identify a sync value that has already been sent—even if the packet containing that sync value was never actually received by the receiver. One solution is to hash a time stamp or sequence number into the public sync portion, which could be quickly extracted, checked, and discarded, thereby validating the public sync portion itself.

In one embodiment, packets can be checked by comparing the source/destination IP pair generated by the sync field with the pair appearing in the packet header. If (1) they match, (2) the time stamp is valid, and (3) the dead-man timer has expired, then re-synchronization occurs; otherwise, the packet is rejected. If enough processing power is available, the dead-man timer and synchronization tables can be avoided altogether, and the receiver would simply resynchronize (e.g., validate) on every packet.

The foregoing scheme may require large-integer (e.g., 160-bit) math, which may affect its implementation. Without such large-integer registers, processing throughput would be affected, thus potentially affecting security from a denial-of-service standpoint. Nevertheless, as large-integer math processing features become more prevalent, the costs of implementing such a feature will be reduced.

D. Other Synchronization Schemes

As explained above, if W or more consecutive packets are lost between a transmitter and receiver in a VPN (where W is the window size), the receiver's window will not have been updated and the transmitter will be transmitting packets not in the receiver's window. The sender and receiver will not recover synchronization until perhaps the random pairs in the window are repeated by chance. Therefore, there is a need to keep a transmitter and receiver in synchronization whenever possible and to re-establish synchronization whenever it is lost.

A "checkpoint" scheme can be used to regain synchronization between a sender and a receiver that have fallen out of synchronization. In this scheme, a checkpoint message comprising a random IP address pair is used for communicating synchronization information. In one embodiment, two messages are used to communicate synchronization information between a sender and a recipient:

1. SYNC_REQ is a message used by the sender to indicate that it wants to synchronize; and
2. SYNC_ACK is a message used by the receiver to inform the transmitter that it has been synchronized.

Figure 14:
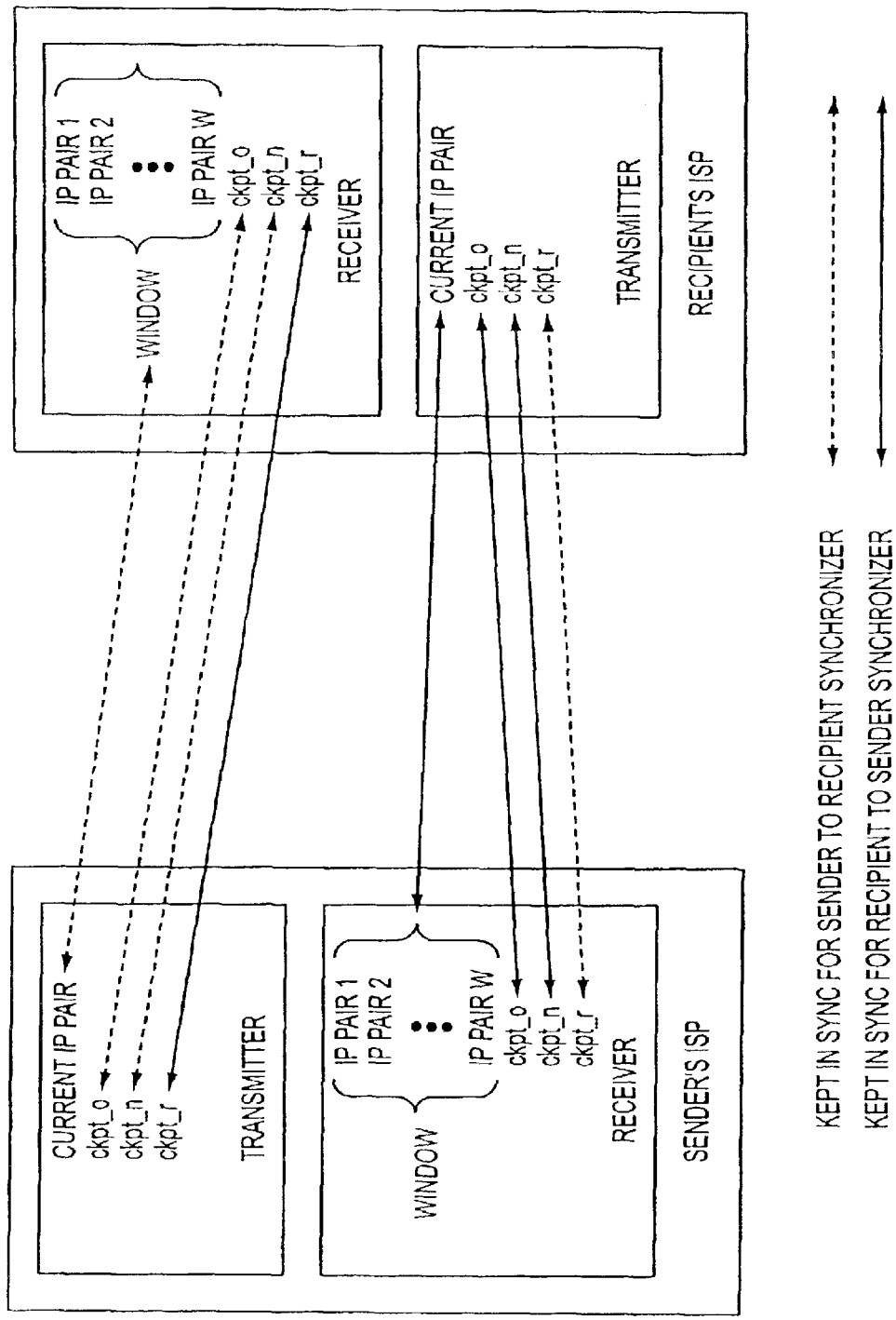
FIG. 14 shows a "checkpoint" scheme for regaining synchronization between a sender and recipient.

According to one variation of this approach, both the transmitter and receiver maintain three checkpoints (see FIG. 14):

1. In the transmitter, ckpt_o ("checkpoint old") is the IP pair that was used to re-send the last SYNC_REQ packet to the receiver. In the receiver, ckpt_o ("checkpoint old") is the IP pair that receives repeated SYNC_REQ packets from the transmitter.

2. In the transmitter, ckpt_n ("checkpoint new") is the IP pair that will be used to send the next SYNC_REQ packet to the receiver. In the receiver, ckpt_n ("checkpoint new") is the IP pair that receives a new SYNC_REQ packet from the transmitter and which causes the receiver's window to be re-aligned, ckpt_o set to ckpt_n, a new ckpt_n to be generated and a new ckpt_r to be generated.

3. In the transmitter, ckpt_r is the IP pair that will be used to send the next SYNC_ACK packet to the receiver. In the receiver, ckpt_r is the IP pair that receives a new SYNC_ACK packet from the transmitter and which causes a new ckpt_n to be generated. Since SYNC_ACK is transmitted from the receiver ISP to the sender ISP, the transmitter ckpt_r refers to the ckpt_r of the receiver and the receiver ckpt_r refers to the ckpt_r of the transmitter (see FIG. 14).

When a transmitter initiates synchronization, the IP pair it will use to transmit the next data packet is set to a predetermined value and when a receiver first receives a SYNC_REQ, the receiver window is updated to be centered on the transmitter's next IP pair. This is the primary mechanism for checkpoint synchronization.

Figure 15:
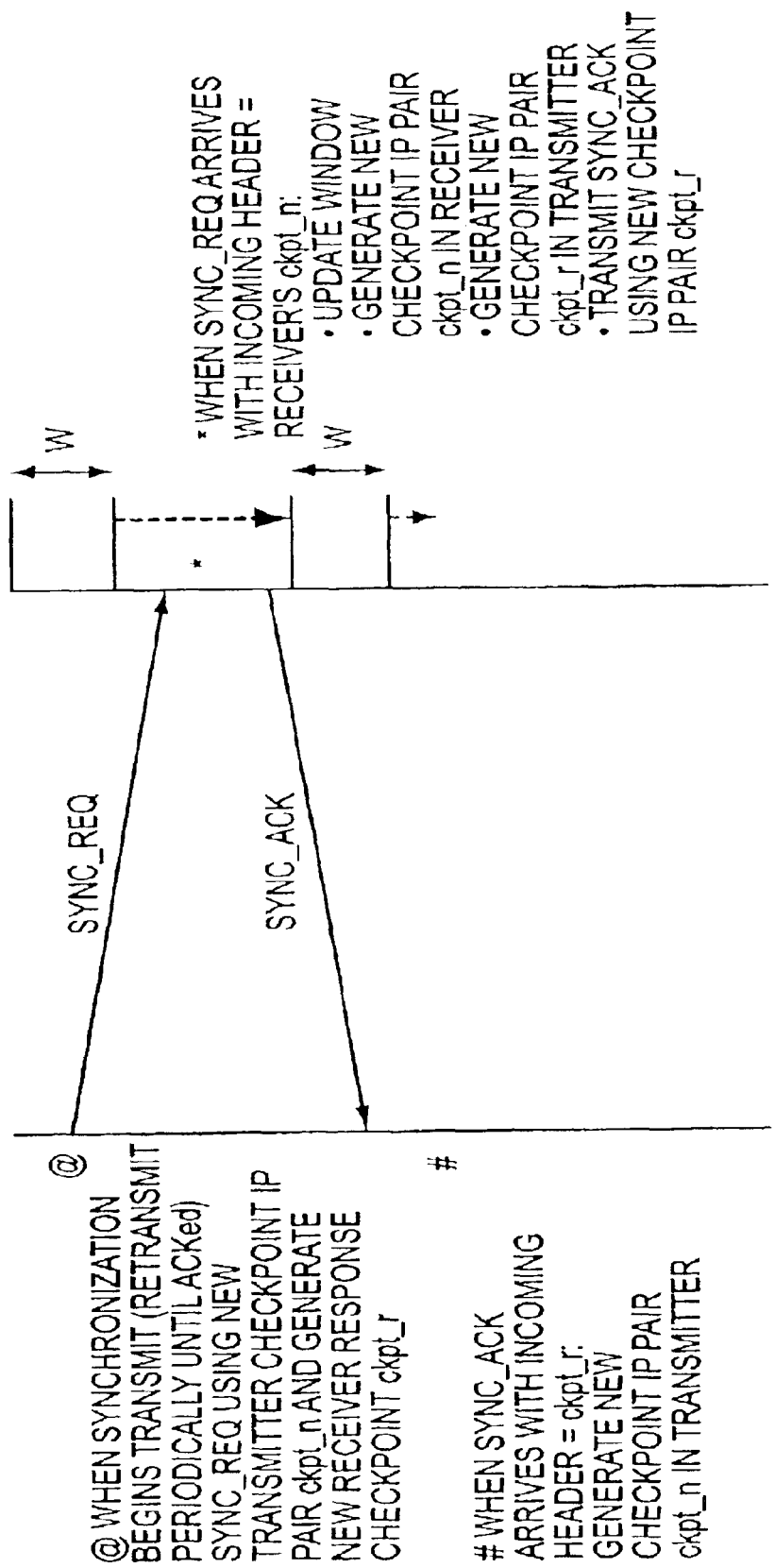
FIG. 15 shows further details of the checkpoint scheme of FIG. 14.

Synchronization can be initiated by a packet counter (e.g., after every N packets transmitted, initiate a synchronization) or by a timer (every S seconds, initiate a synchronization) or a combination of both. See FIG. 15. From the transmitter's perspective, this technique operates as follows: (1) Each transmitter periodically transmits a "sync request" message to the receiver to make sure that it is in sync. (2) If the receiver is still in sync, it sends back a "sync ack" message. (If this works, no further action is necessary). (3) If no "sync ack" has been received within a period of time, the transmitter retransmits the sync request again. If the transmitter reaches the next checkpoint without receiving a "sync ack" response, then synchronization is broken, and the transmitter should stop transmitting. The transmitter will continue to send sync_reqs until it receives a sync_ack, at which point transmission is reestablished.

From the receiver's perspective, the scheme operates as follows: (1) when it receives a "sync request" request from the transmitter, it advances its window to the next checkpoint position (even skipping pairs if necessary), and sends a "sync ack" message to the transmitter. If sync was never lost, then the "jump ahead" really just advances to the next available pair of addresses in the table (i.e., normal advancement).

If an interloper intercepts the "sync request" messages and tries to interfere with communication by sending new ones, it will be ignored if the synchronization has been established or it it will actually help to re-establish synchronization.

A window is realigned whenever a re-synchronization occurs. This realignment entails updating the receiver's window to straddle the address pairs used by the packet transmitted immediately after the transmission of the SYNC_REQ packet. Normally, the transmitter and receiver are in synchronization with one another. However, when network events occur, the receiver's window may have to be advanced by many steps during resynchroniuzation. In this case, It is desirable to move the window ahead without having to step through the intervening random numbers sequentially. (This feature is also desirable for the auto-sync approach discussed above).

E. Random Number Generator with a Jump-Ahead Capability

An attractive method for generating randomly hopped addresses is to use identical random number generators in the transmitter and receiver and advance them as packets are transmitted and received. There are many random number generation algorithms that could be used. Each one has strengths and weaknesses for address hopping applications.

Linear congruential random number generators (LCRs) are fast, simple and well characterized random number generators that can be made to jump ahead n steps efficiently. An LCR generates random numbers $X_1, X_2, X_3 \ldots X_k$ starting with seed $X_0$ using a recurrence $$X_i = (aX_{i-1}+b) \bmod c, \qquad (1)$$

where a, b and c define a particular LCR. Another expression for $X_i$, $$X_i = ((a^i(X_0+b)-b)/(a-1)) \bmod c \qquad (2)$$

enables the jump-ahead capability. The factor $a^i$ can grow very large even for modest i if left unfettered. Therefore some special properties of the modulo operation can be used to control the size and processing time required to compute (2). (2) can be rewritten as:

$$X_i = (a^i(X_0(a-1)+b)-b)/(a-1) \bmod c. \qquad (3)$$

It can be shown that:

$$(a^i(X_0(a-1)+b)-b)/(a-1) \bmod c = ((a^i \bmod ((a-1)c)(X_0(a-1)+b)-b)/(a-1)) \bmod c \qquad (4).$$

$(X_0(a-1)+b)$ can be stored as $(X_0(a-1)+b) \bmod c$, b as b mod c and compute $a^1 \bmod((a-1)c)$(this requires O(log(i)) steps).

A practical implementation of this algorithm would jump a fixed distance, n, between synchronizations; this is tantamount to synchronizing every n packets. The window would commence n IP pairs from the start of the previous window. Using $X_j^w$, the random number at the $j^{th}$ checkpoint, as $X_0$ and n as i, a node can store $a^n \bmod((a-1)c)$ once per LCR and set $$X_{j+1}^w = X_{n(j+1)} = ((a^n \bmod((a-1)c)(X_j^w(a-1)+b)-b)/(a-1)) \bmod c, \qquad (5)$$

to generate the random number for the $j+1^{th}$ synchronization. Using this construction, a node could jump ahead an arbitrary (but fixed) distance between synchronizations in a constant amount of time (independent of n).

Pseudo-random number generators, in general, and LCRs, in particular, will eventually repeat their cycles. This repetition may present vulnerability in the IP hopping scheme. An adversary would simply have to wait for a repeat to predict future sequences. One way of coping with this vulnerability is to create a random number generator with a known long cycle. A random sequence can be replaced by a new random number generator before it repeats. LCRs can be constructed with known long cycles. This is not currently true of many random number generators.

Random number generators can be cryptographically insecure. An adversary can derive the RNG parameters by examining the output or part of the output. This is true of LCGs. This vulnerability can be mitigated by incorporating an encryptor, designed to scramble the output as part of the random number generator. The random number generator prevents an adversary from mounting an attack—e.g., a known plaintext attack—against the encryptor.

F. Random Number Generator Example

Consider a RNG where a=31, b=4 and c=15. For this case equation (1) becomes:

$$X_i = (31X_{i-1} + 4) \mod 15. \quad (6)$$

If one sets $X_0=1$, equation (6) will produce the sequence 1, 5, 9, 13, 2, 6, 10, 14, 3, 7, 11, 0, 4, 8, 12. This sequence will repeat indefinitely. For a jump ahead of 3 numbers in this sequence $a^n=31^3=29791$, $c*(a-1)=15*30=450$ and $a^n \mod ((a-1)c)=31^3 \mod(15*30)=29791 \mod(450)=91$. Equation (5) becomes:

$$((91(X_i 30+4)-4)/30) \mod 15 \quad (7).$$

Table 1 shows the jump ahead calculations from (7). The calculations start at 5 and jump ahead 3.

TABLE 1

| I | $X_i$ | $(X_i 30 + 4)$ | $91 (X_i 30 + 4)$ | $(91 (X_i 30 + 4) - 4)$ | $((91 (X_i 30 + 4) - 4)/30$ | $X_{i+3}$ |
|---|---|---|---|---|---|---|
| 1 | 5 | 154 | 14010 | | 467 | 2 |
| 4 | 2 | 64 | 5820 | | 194 | 14 |
| 7 | 14 | 424 | 38580 | | 1286 | 11 |
| 10 | 11 | 334 | 30390 | | 1013 | 8 |
| 13 | 8 | 244 | 22200 | | 740 | 5 |

G. Fast Packet Filter

Address hopping VPNs must rapidly determine whether a packet has a valid header and thus requires further processing, or has an invalid header (a hostile packet) and should be immediately rejected. Such rapid determinations will be referred to as "fast packet filtering." This capability protects the VPN from attacks by an adversary who streams hostile packets at the receiver at a high rate of speed in the hope of saturating the receiver's processor (a so-called "denial of service" attack). Fast packet filtering is an important feature for implementing VPNs on shared media such as Ethernet.

Assuming that all participants in a VPN share an unassigned "A" block of addresses, one possibility is to use an experimental "A" block that will never be assigned to any machine that is not address hopping on the shared medium. "A" blocks have a 24 bits of address that can be hopped as opposed to the 8 bits in "C" blocks. In this case a hopblock will be the "A" block. The use of the experimental "A" block is a likely option on an Ethernet because:
1. The addresses have no validity outside of the Ethernet and will not be routed out to a valid outside destination by a gateway.
2. There are $2^{24}$ (~16 million) addresses that can be hopped within each "A" block. This yields >280 trillion possible address pairs making it very unlikely that an adversary would guess a valid address. It also provides acceptably low probability of collision between separate VPNs (all VPNs on a shared medium independently generate random address pairs from the same "A" block).
3. The packets will not be received by someone on the Ethernet who is not on a VPN (unless the machine is in promiscuous mode) minimizing impact on non-VPN computers.

The Ethernet example will be used to describe one implementation of fast packet filtering. The ideal algorithm would quickly examine a packet header, determine whether the packet is hostile, and reject any hostile packets or determine which active IP pair the packet header matches.

The problem is a classical associative memory problem. A variety of techniques have been developed to solve this problem (hashing, B—trees etc). Each of these approaches has its strengths and weaknesses. For instance, hash tables can be made to operate quite fast in a statistical sense, but can occasionally degenerate into a much slower algorithm. This slowness can persist for a period of time. Since there is a need to discard hostile packets quickly at all times, hashing would be unacceptable.

H. Presence Vector Algorithm

A presence vector is a bit vector of length $2^n$ that can be indexed by n-bit numbers (each ranging from 0 to $2^n-1$). One can indicate the presence of k n-bit numbers (not necessarily unique), by setting the bits in the presence vector indexed by each number to 1. Otherwise, the bits in the presence vector are 0. An n-bit number, x, is one of the k numbers if and only if the $x^{th}$ bit of the presence vector is 1. A fast packet filter can be implemented by indexing the presence vector and looking for a 1, which will be referred to as the "test."

For example, suppose one wanted to represent the number 135 using a presence vector. The $135^{th}$ bit of the vector would be set. Consequently, one could very quickly determine whether an address of 135 was valid by checking only one bit: the $135^{th}$ bit. The presence vectors could be created in advance corresponding to the table entries for the IP addresses. In effect, the incoming addresses can be used as indices into a long vector, making comparisons very fast. As each RNG generates a new address, the presence vector is updated to reflect the information. As the window moves, the presence vector is updated to zero out addresses that are no longer valid.

Figure 16:
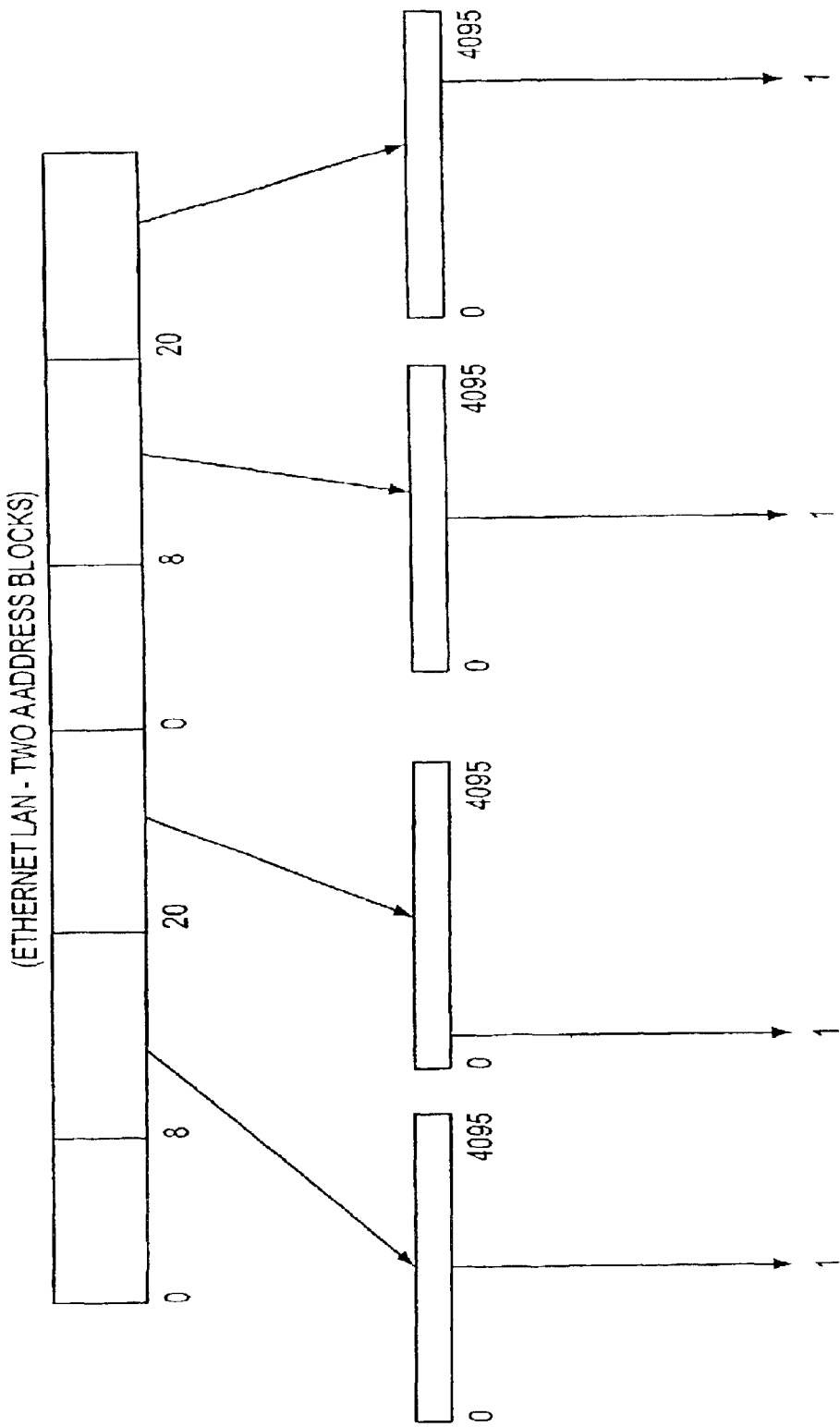
FIG. 16 shows how two addresses can be decomposed into a plurality of segments for comparison with presence vectors.

There is a trade-off between efficiency of the test and the amount of memory required for storing the presence vector (s). For instance, if one were to use the 48 bits of hopping addresses as an index, the presence vector would have to be 35 terabytes. Clearly, this is too large for practical purposes. Instead, the 48 bits can be divided into several smaller fields. For instance, one could subdivide the 48 bits into four 12-bit fields (see FIG. 16). This reduces the storage requirement to 2048 bytes at the expense of occasionally having to process a hostile packet. In effect, instead of one long presence vector, the decomposed address portions must match all four shorter presence vectors before further processing is allowed. (If the first part of the address portion doesn't match the first presence vector, there is no need to check the remaining three presence vectors).

A presence vector will have a 1 in the $y^{th}$ bit if and only if one or more addresses with a corresponding field of y are active. An address is active only if each presence vector indexed by the appropriate sub-field of the address is 1.

Consider a window of 32 active addresses and 3 checkpoints. A hostile packet will be rejected by the indexing of one presence vector more than 99% of the time. A hostile packet will be rejected by the indexing of all 4 presence vectors more than 99.9999995% of the time. On average, hostile packets will be rejected in less than 1.02 presence vector index operations.

The small percentage of hostile packets that pass the fast packet filter will be rejected when matching pairs are not found in the active window or are active checkpoints. Hostile packets that serendipitously match a header will be rejected when the VPN software attempts to decrypt the header. However, these cases will be extremely rare. There are many other ways this method can be configured to arbitrate the space/speed tradeoffs.

I. Further Synchronization Enhancements

Figure 17:
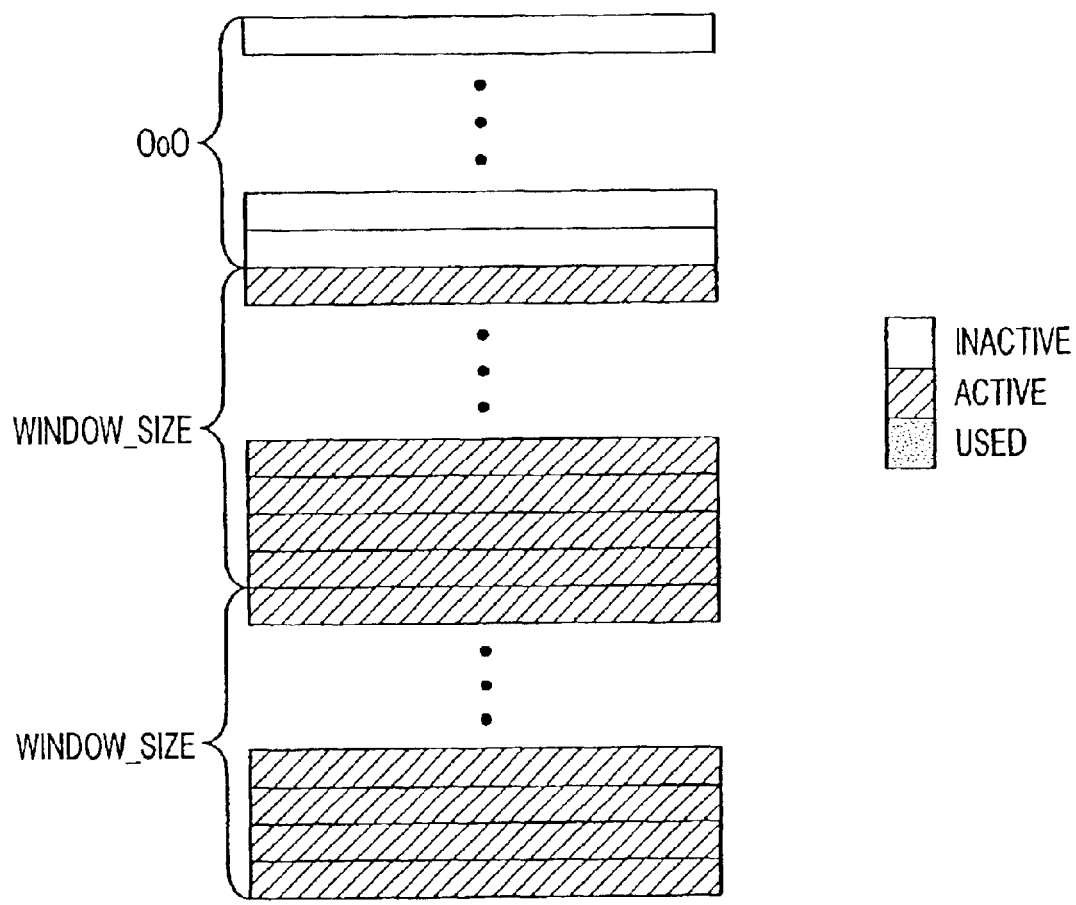
FIG. 17 shows a storage array for a receiver's active addresses.

A slightly modified form of the synchronization techniques described above can be employed. The basic principles of the previously described checkpoint synchronization scheme remain unchanged. The actions resulting from the reception of the checkpoints are, however, slightly different. In this variation, the receiver will maintain between OoO ("Out of Order") and 2×WINDOW_SIZE+ OoO active addresses ($1 \leq OoO \leq WINDOW\_SIZE$ and $WINDOW\_SIZE \geq 1$). OoO and WINDOW_SIZE are engineerable parameters, where OoO is the minimum number of addresses needed to accommodate lost packets due to events in the network or out of order arrivals and WINDOW_SIZE is the number of packets transmitted before a SYNC_REQ is issued. FIG. 17 depicts a storage array for a receiver's active addresses.

Figure 18:
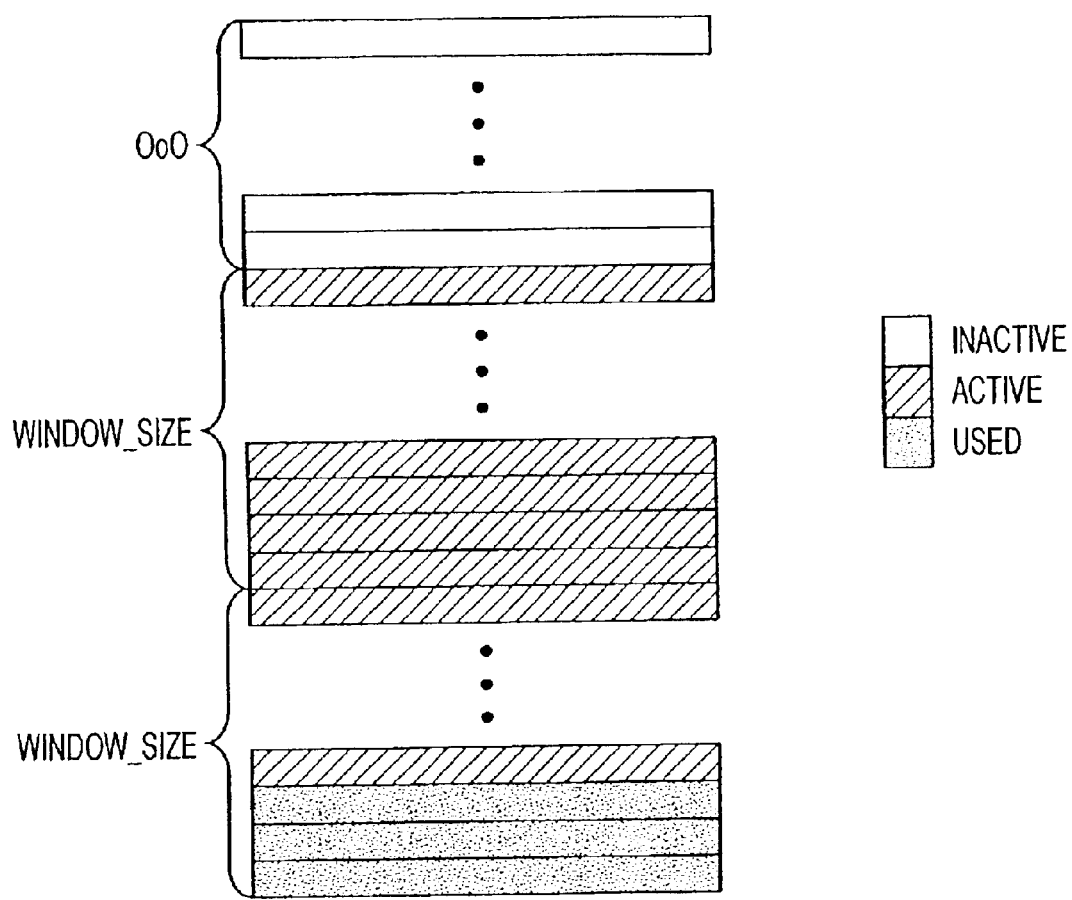
FIG. 18 shows the receiver's storage array after receiving a sync request.

The receiver starts with the first 2×WINDOW_SIZE addresses loaded and active (ready to receive data). As packets are received, the corresponding entries are marked as "used" and are no longer eligible to receive packets. The transmitter maintains a packet counter, initially set to 0, containing the number of data packets transmitted since the last initial transmission of a SYNC_REQ for which SYNC_ACK has been received. When the transmitter packet counter equals WINDOW_SIZE, the transmitter generates a SYNC_REQ and does its initial transmission. When the receiver receives a SYNC_REQ corresponding to its current CKPT_N, it generates the next WINDOW_SIZE addresses and starts loading them in order starting at the first location after the last active address wrapping around to the beginning of the array after the end of the array has been reached. The receiver's array might look like FIG. 18 when a SYNC_REQ has been received. In this case a couple of packets have been either lost or will be received out of order when the SYNC_REQ is received.

Figure 19:
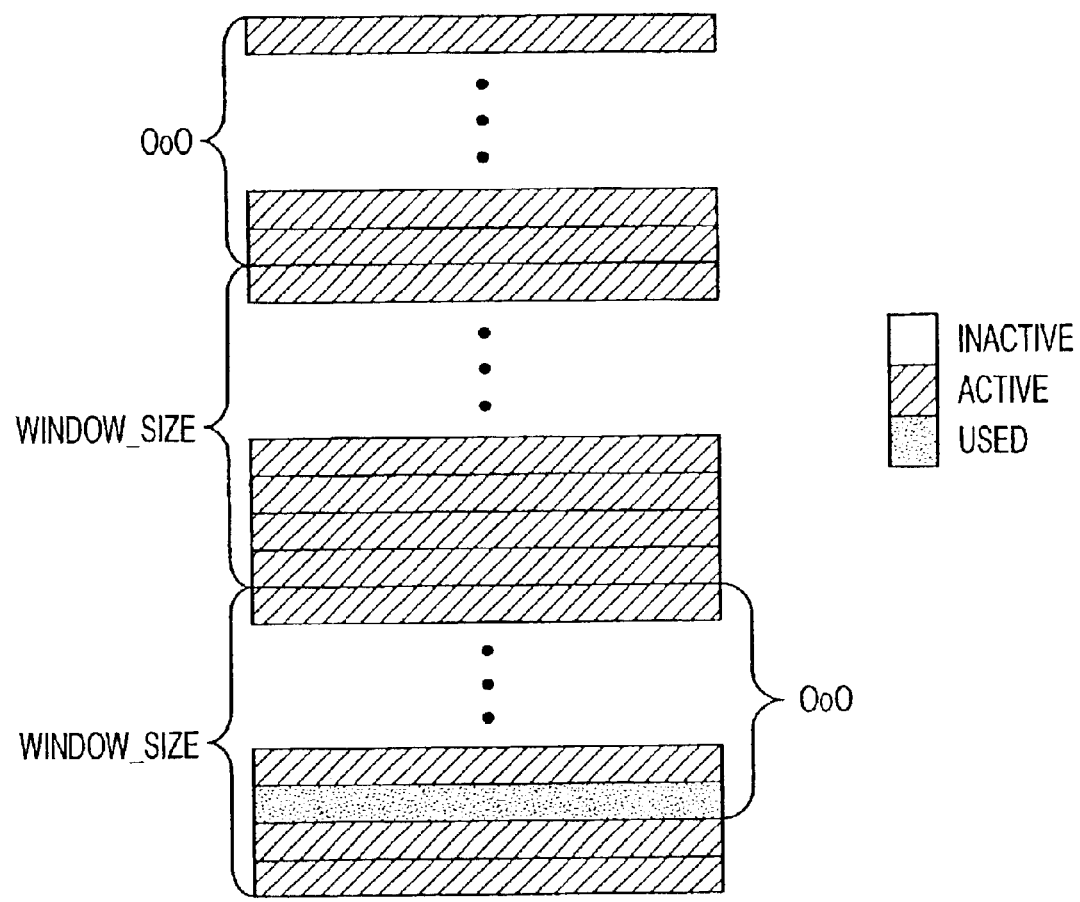
FIG. 19 shows the receiver's storage array after new addresses have been generated.

FIG. 19 shows the receiver's array after the new addresses have been generated. If the transmitter does not receive a SYNC_ACK, it will re-issue the SYNC_REQ at regular intervals. When the transmitter receives a SYNC_ACK, the packet counter is decremented by WINDOW_SIZE. If the packet counter reaches 2×WINDOW_SIZE—OoO then the transmitter ceases sending data packets until the appropriate SYNC_ACK is finally received. The transmitter then resumes sending data packets. Future behavior is essentially a repetition of this initial cycle. The advantages of this approach are:
1. There is no need for an efficient jump ahead in the random number generator,
2. No packet is ever transmitted that does not have a corresponding entry in the receiver side
3. No timer based re-synchronization is necessary. This is a consequence of 2.
4. The receiver will always have the ability to accept data messages transmitted within OoO messages of the most recently transmitted message.

J. Distributed Transmission Path Variant

Figure 20:
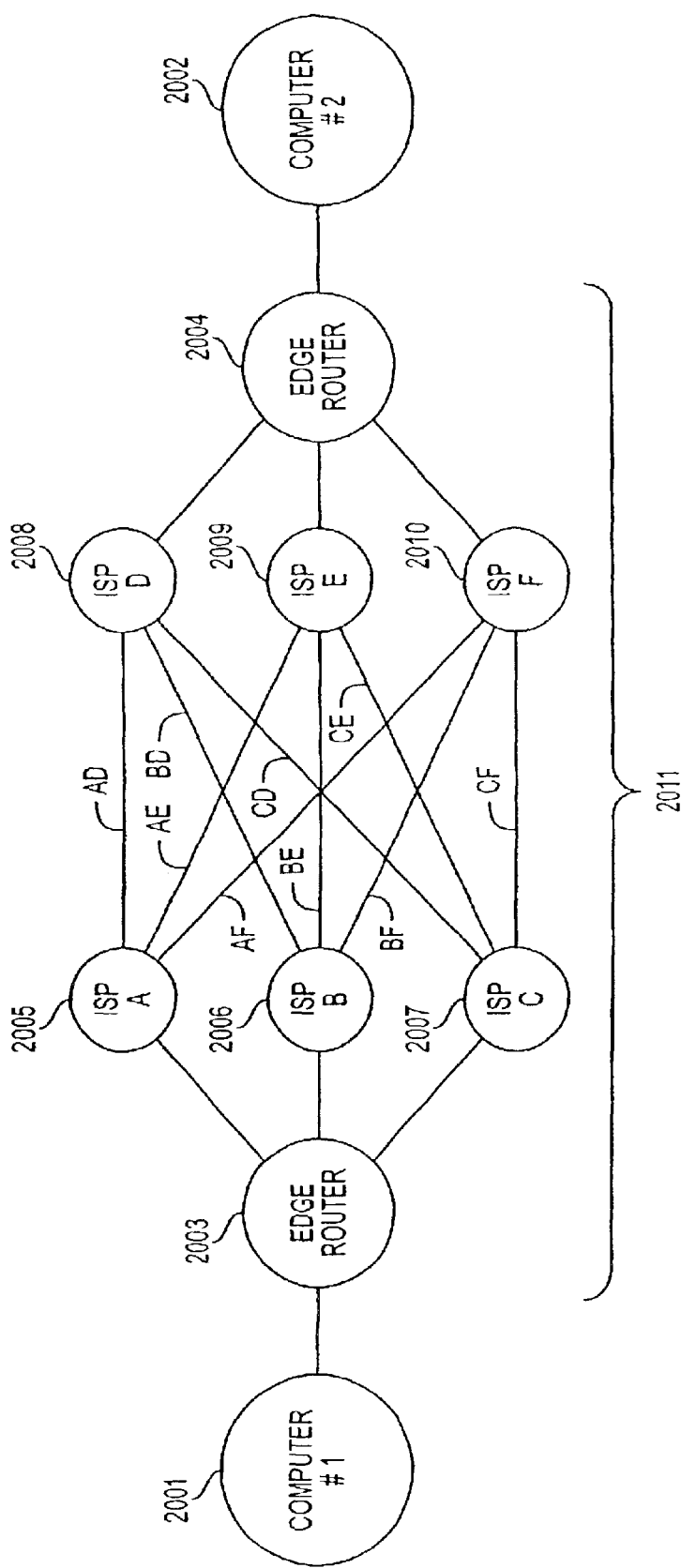
FIG. 20 shows a system employing distributed transmission paths.

Another embodiment incorporating various inventive principles is shown in FIG. 20. In this embodiment, a message transmission system includes a first computer 2001 in communication with a second computer 2002 through a network 2011 of intermediary computers. In one variant of this embodiment, the network includes two edge routers 2003 and 2004 each of which is linked to a plurality of Internet Service Providers (ISPs) 2005 through 2010. Each ISP is coupled to a plurality of other ISPs in an arrangement as shown in FIG. 20, which is a representative configuration only and is not intended to be limiting. Each connection between ISPs is labeled in FIG. 20 to indicate a specific physical transmission path (e.g., AD is a physical path that links ISP A (element 2005) to ISP D (element 2008)). Packets arriving at each edge router are selectively transmitted to one of the ISPs to which the router is attached on the basis of a randomly or quasi-randomly selected basis.

Figure 21:
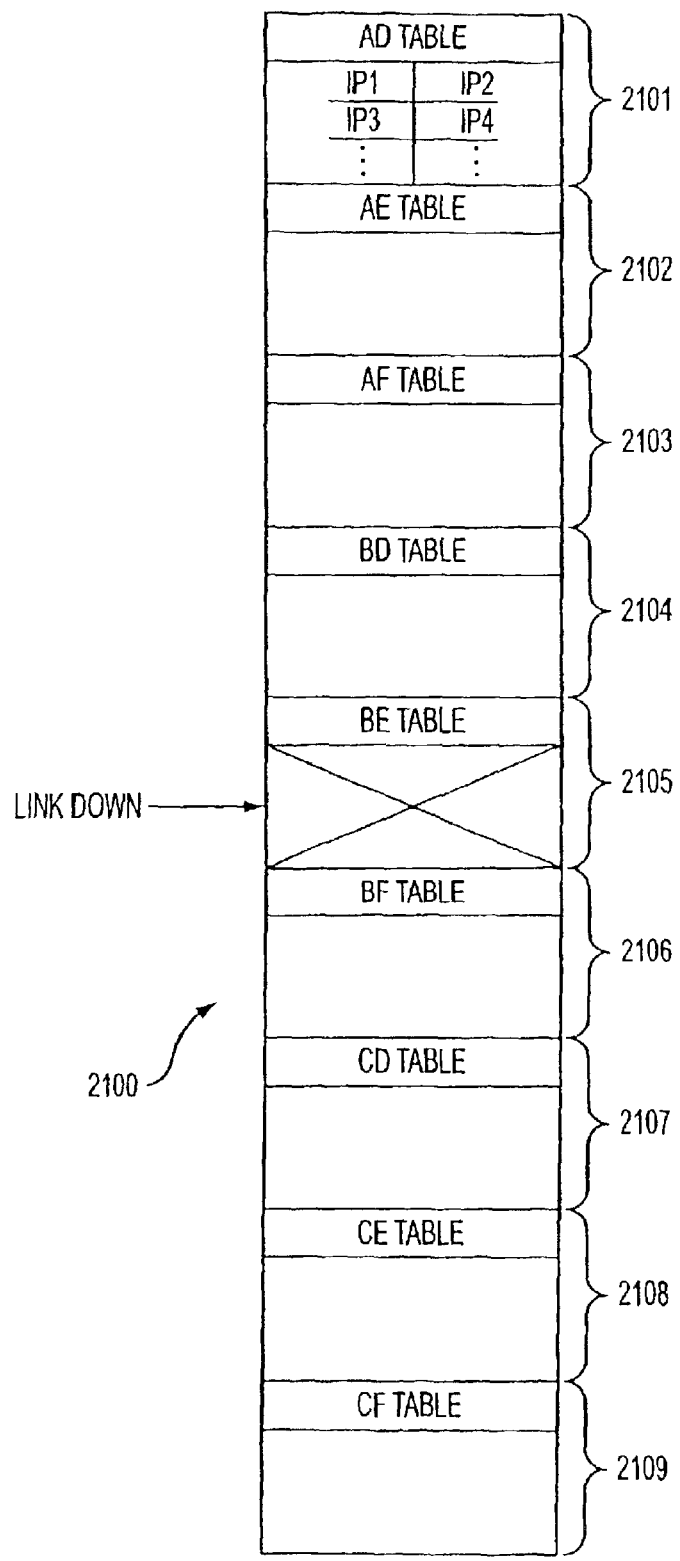
FIG. 21 shows a plurality of link transmission tables that can be used to route packets in the system of FIG. 20.

As shown in FIG. 21, computer 2001 or edge router 2003 incorporates a plurality of link transmission tables 2100 that identify, for each potential transmission path through the network, valid sets of IP addresses that can be used to transmit the packet. For example, AD table 2101 contains a plurality of IP source/destination pairs that are randomly or quasi-randomly generated. When a packet is to be transmitted from first computer 2001 to second computer 2002, one of the link tables is randomly (or quasi-randomly) selected, and the next valid source/destination address pair from that table is used to transmit the packet through the network. If path AD is randomly selected, for example, the next source/destination IP address pair (which is pre-determined to transmit between ISP A (element 2005) and ISP B (element 2008)) is used to transmit the packet. If one of the transmission paths becomes degraded or inoperative, that link table can be set to a "down" condition as shown in table 2105, thus preventing addresses from being selected from that table. Other transmission paths would be unaffected by this broken link.

3. Continuation-In-Part Improvements

The following describes various improvements and features that can be applied to the embodiments described above. The improvements include: (1) a load balancer that distributes packets across different transmission paths according to transmission path quality; (2) a DNS proxy server that transparently creates a virtual private network in response to a domain name inquiry; (3) a large-to-small link bandwidth management feature that prevents denial-of-service attacks at system chokepoints; (4) a traffic limiter that regulates incoming packets by limiting the rate at which a transmitter can be synchronized with a receiver; and (5) a signaling synchronizer that allows a large number of nodes to communicate with a central node by partitioning the communication function between two separate entities. Each is discussed separately below.

A. Load Balancer

Various embodiments described above include a system in which a transmitting node and a receiving node are coupled through a plurality of transmission paths, and wherein successive packets are distributed quasi-randomly over the plurality of paths. See, for example, FIGS. 20 and 21 and accompanying description. The improvement extends this basic concept to encompass distributing packets across different paths in such a manner that the loads on the paths are generally balanced according to transmission link quality.

In one embodiment, a system includes a transmitting node and a receiving node that are linked via a plurality of transmission paths having potentially varying transmission quality. Successive packets are transmitted over the paths based on a weight value distribution function for each path. The rate that packets will be transmitted over a given path can be different for each path. The relative "health" of each transmission path is monitored in order to identify paths that have become degraded. In one embodiment, the health of each path is monitored in the transmitter by comparing the number of packets transmitted to the number of packet acknowledgements received. Each transmission path may comprise a physically separate path (e.g., via dial-up phone line, computer network, router, bridge, or the like), or may comprise logically separate paths contained within a broadband communication medium (e.g., separate channels in an FDM, TDM, CDMA, or other type of modulated or unmodulated transmission link).

When the transmission quality of a path falls below a predetermined threshold and there are other paths that can transmit packets, the transmitter changes the weight value used for that path, making it less likely that a given packet will be transmitted over that path. The weight will preferably be set no lower than a minimum value that keeps nominal traffic on the path. The weights of the other available paths are altered to compensate for the change in the affected path. When the quality of a path degrades to where the transmitter is turned off by the synchronization function (i.e., no packets are arriving at the destination), the weight is set to zero. If all transmitters are turned off, no packets are sent.

Conventional TCP/IP protocols include a "throttling" feature that reduces the transmission rate of packets when it is determined that delays or errors are occurring in transmission. In this respect, timers are sometimes used to determine whether packets have been received. These conventional techniques for limiting transmission of packets, however, do not involve multiple transmission paths between two nodes wherein transmission across a particular path relative to the others is changed based on link quality.

According to certain embodiments, in order to damp oscillations that might otherwise occur if weight distributions are changed drastically (e.g., according to a step function), a linear or an exponential decay formula can be applied to gradually decrease the weight value over time that a degrading path will be used. Similarly, if the health of a degraded path improves, the weight value for that path is gradually increased.

Transmission link health can be evaluated by comparing the number of packets that are acknowledged within the transmission window (see embodiments discussed above) to the number of packets transmitted within that window and by the state of the transmitter (i.e., on or off). In other words, rather than accumulating general transmission statistics over time for a path, one specific implementation uses the "windowing" concepts described above to evaluate transmission path health.

The same scheme can be used to shift virtual circuit paths from an "unhealthy" path to a "healthy" one, and to select a path for a new virtual circuit.

Figure 22A:
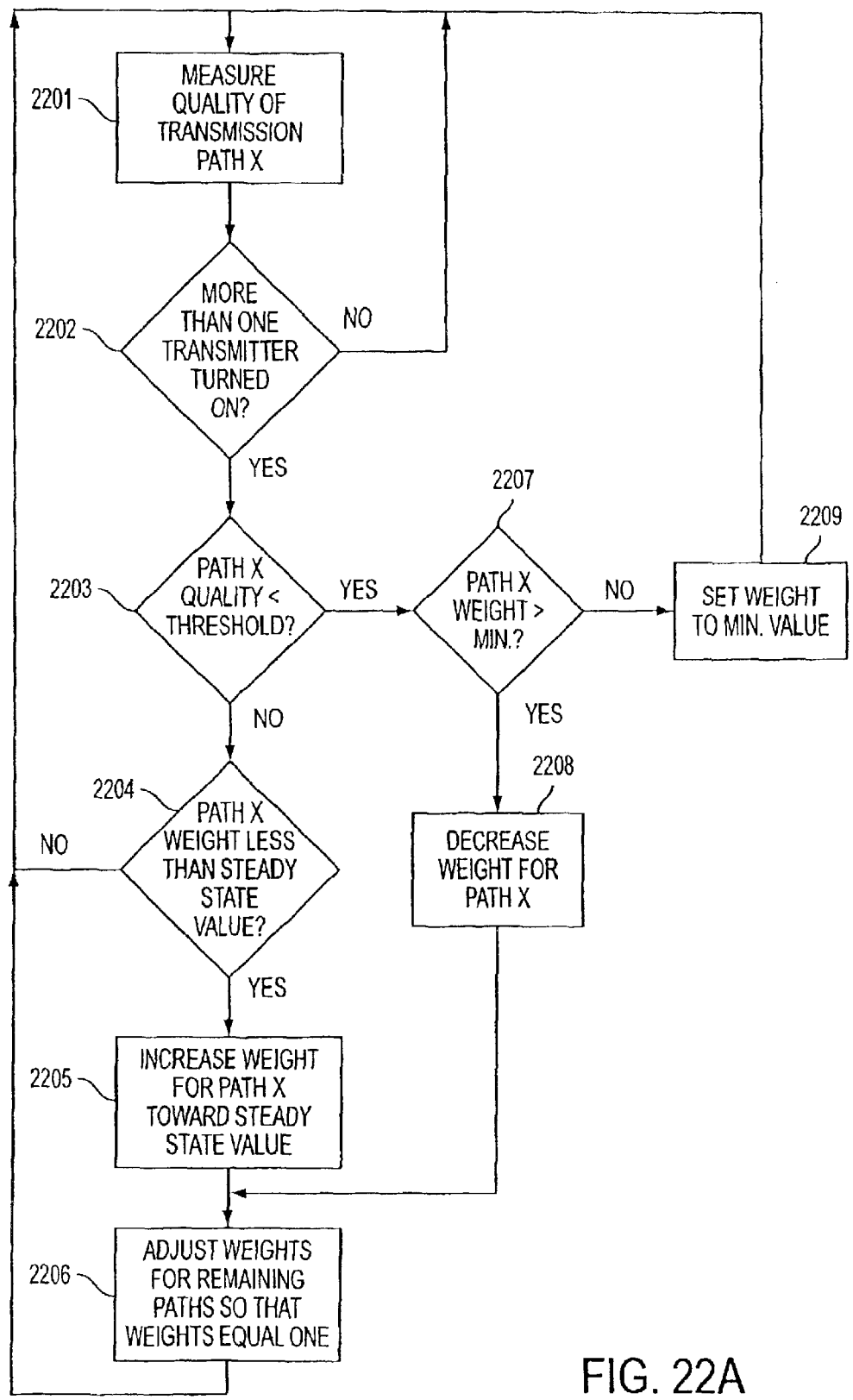
FIG. 22A shows a flowchart for adjusting weight value distributions associated with a plurality of transmission links.

FIG. 22A shows a flowchart for adjusting weight values associated with a plurality of transmission links. It is assumed that software executing in one or more computer nodes executes the steps shown in FIG. 22A. It is also assumed that the software can be stored on a computer-readable medium such as a magnetic or optical disk for execution by a computer.

Beginning in step 2201, the transmission quality of a given transmission path is measured. As described above, this measurement can be based on a comparison between the number of packets transmitted over a particular link to the number of packet acknowledgements received over the link (e.g., per unit time, or in absolute terms). Alternatively, the quality can be evaluated by comparing the number of packets that are acknowledged within the transmission window to the number of packets that were transmitted within that window. In yet another variation, the number of missed synchronization messages can be used to indicate link quality. Many other variations are of course possible.

In step 2202, a check is made to determine whether more than one transmitter (e.g., transmission path) is turned on. If not, the process is terminated and resumes at step 2201.

In step 2203, the link quality is compared to a given threshold (e.g., 50%, or any arbitrary number). If the quality falls below the threshold, then in step 2207 a check is made to determine whether the weight is above a minimum level (e.g., 1%). If not, then in step 2209 the weight is set to the minimum level and processing resumes at step 2201. If the weight is above the minimum level, then in step 2208 the weight is gradually decreased for the path, then in step 2206 the weights for the remaining paths are adjusted accordingly to compensate (e.g., they are increased).

If in step 2203 the quality of the path was greater than or equal to the threshold, then in step 2204 a check is made to determine whether the weight is less than a steady-state value for that path. If so, then in step 2205 the weight is increased toward the steady-state value, and in step 2206 the weights for the remaining paths are adjusted accordingly to compensate (e.g., they are decreased). If in step 2204 the weight is not less than the steady-state value, then processing resumes at step 2201 without adjusting the weights.

The weights can be adjusted incrementally according to various functions, preferably by changing the value gradually. In one embodiment, a linearly decreasing function is used to adjust the weights; according to another embodiment, an exponential decay function is used. Gradually changing the weights helps to damp oscillators that might otherwise occur if the probabilities were abruptly.

Although not explicitly shown in FIG. 22A the process can be performed only periodically (e.g., according to a time schedule), or it can be continuously run, such as in a background mode of operation. In one embodiment, the combined weights of all potential paths should add up to unity (e.g., when the weighting for one path is decreased, the corresponding weights that the other paths will be selected will increase).

Adjustments to weight values for other paths can be prorated. For example, a decrease of 10% in weight value for one path could result in an evenly distributed increase in the weights for the remaining paths. Alternatively, weightings could be adjusted according to a weighted formula as desired (e.g., favoring healthy paths over less healthy paths). In yet another variation, the difference in weight value can be amortized over the remaining links in a manner that is proportional to their traffic weighting.

Figure 22B:
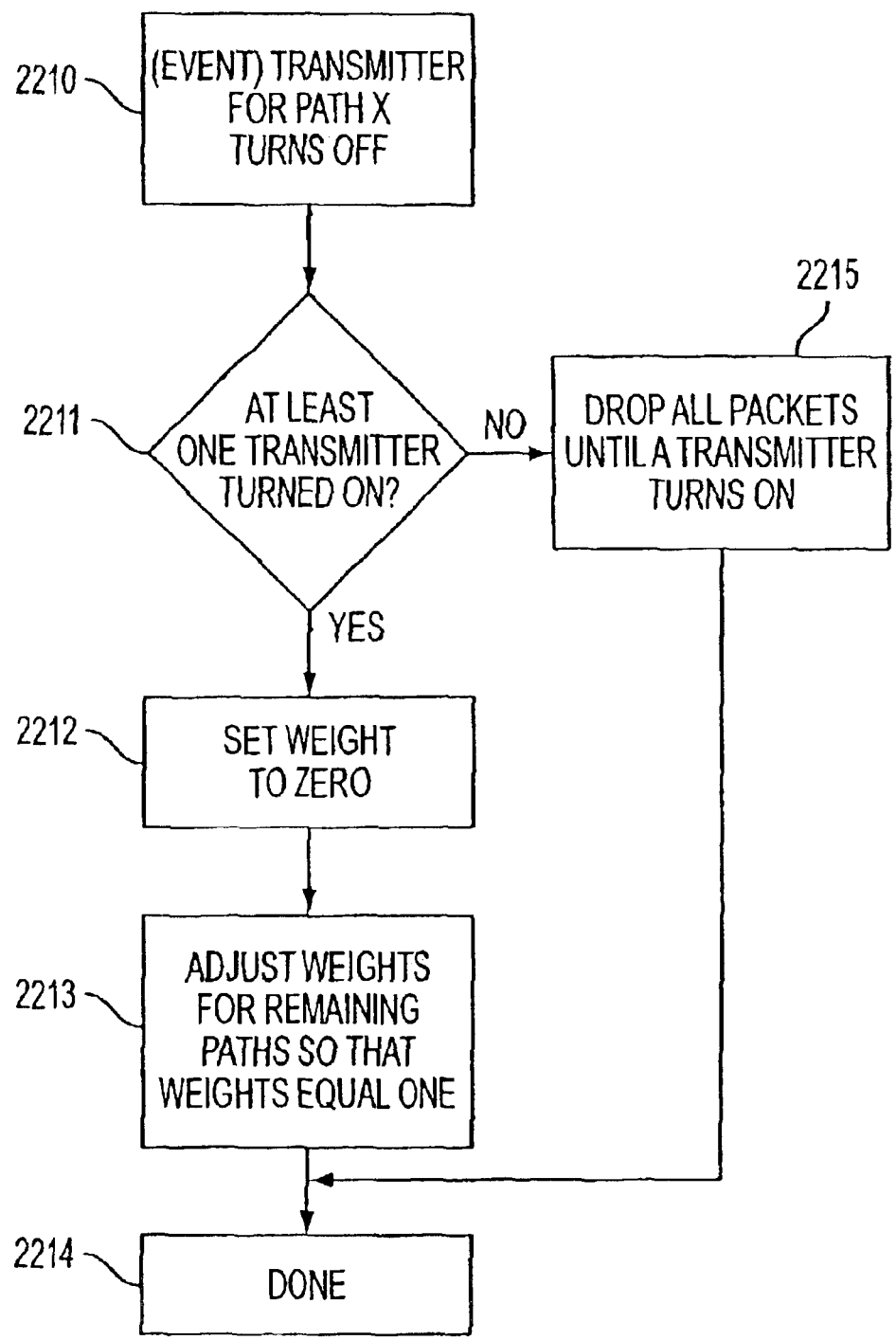
FIG. 22B shows a flowchart for setting a weight value to zero if a transmitter turns off.

FIG. 22B shows steps that can be executed to shut down transmission links where a transmitter turns off. In step 2210, a transmitter shut-down event occurs. In step 2211, a test is made to determine whether at least one transmitter is still turned on. If not, then in step 2215 all packets are dropped until a transmitter turns on. If in step 2211 at least one transmitter is turned on, then in step 2212 the weight for the path is set to zero, and the weights for the remaining paths are adjusted accordingly.

Figure 23:
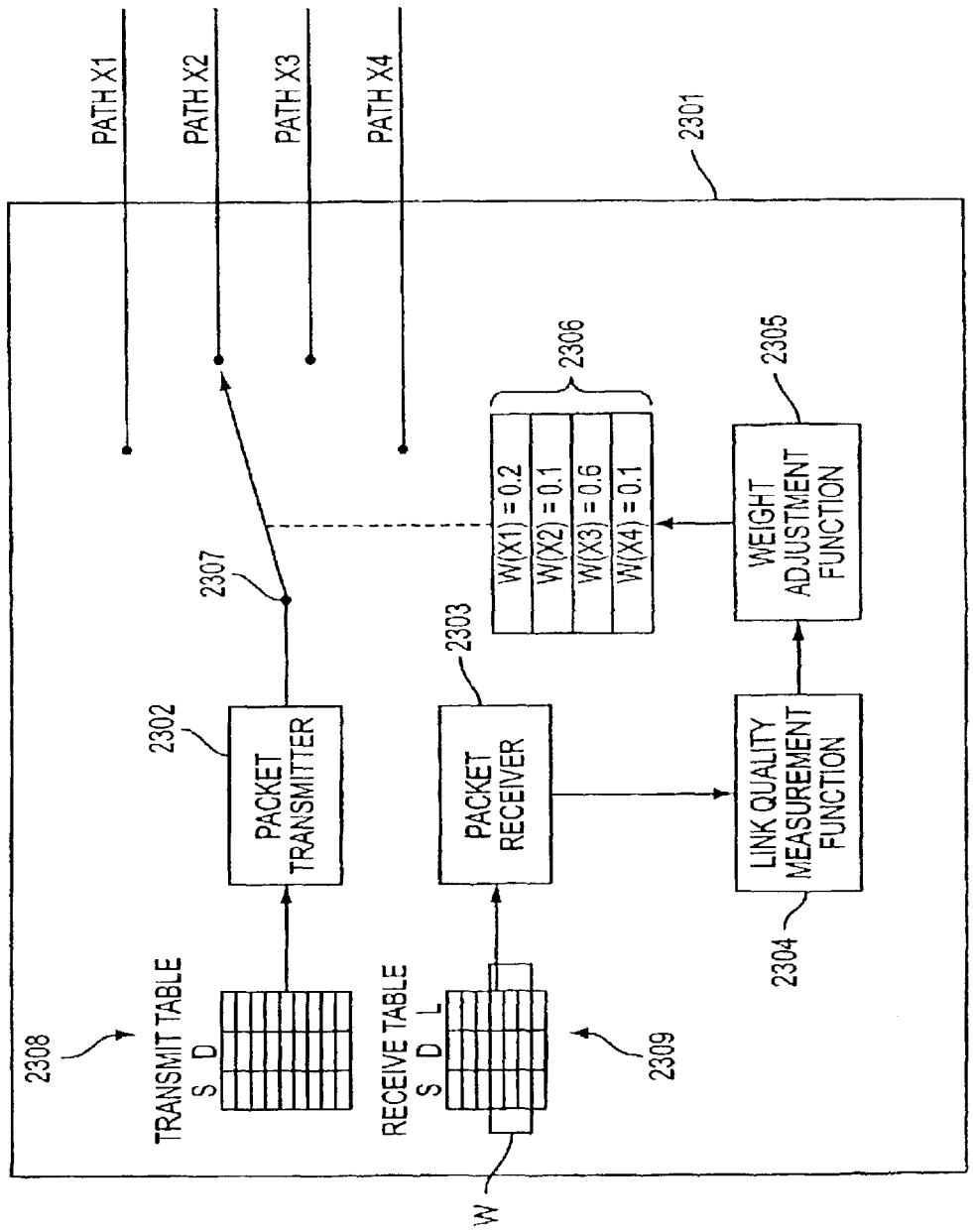
FIG. 23 shows a system employing distributed transmission paths with adjusted weight value distributions for each path.

FIG. 23 shows a computer node 2301 employing various principles of the above-described embodiments. It is assumed that two computer nodes of the type shown in FIG. 23 communicate over a plurality of separate physical transmission paths. As shown in FIG. 23, four transmission paths X1 through X4 are defined for communicating between the two nodes. Each node includes a packet transmitter 2302 that operates in accordance with a transmit table 2308 as described above. (The packet transmitter could also operate without using the IP-hopping features described above, but the following description assumes that some form of hopping is employed in conjunction with the path selection mechanism.). The computer node also includes a packet receiver 2303 that operates in accordance with a receive table 2309, including a moving window W that moves as valid packets are received. Invalid packets having source and destination addresses that do not fall within window W are rejected.

As each packet is readied for transmission, source and destination IP addresses (or other discriminator values) are selected from transmit table 2308 according to any of the various algorithms described above, and packets containing these source/destination address pairs, which correspond to the node to which the four transmission paths are linked, are generated to a transmission path switch 2307. Switch 2307, which can comprise a software function, selects from one of the available transmission paths according to a weight distribution table 2306. For example, if the weight for path X1 is 0.2, then every fifth packet will be transmitted on path X1. A similar regime holds true for the other paths as shown. Initially, each link's weight value can be set such that it is proportional to its bandwidth, which will be referred to as its "steady-state" value.

Packet receiver 2303 generates an output to a link quality measurement function 2304 that operates as described above to determine the quality of each transmission path. (The input to packet receiver 2303 for receiving incoming packets is omitted for clarity). Link quality measurement function 2304 compares the link quality to a threshold for each transmission link and, if necessary, generates an output to weight adjustment function 2305. If a weight adjustment is required, then the weights in table 2306 are adjusted accordingly, preferably according to a gradual (e.g., linearly or exponentially declining) function. In one embodiment, the weight values for all available paths are initially set to the sane value, and only when paths degrade in quality are the weights changed to reflect differences.

Link quality measurement function 2304 can be made to operate as part of a synchronizer function as described above. That is, if resynchronization occurs and the receiver detects that synchronization has been lost (e.g., resulting in the synchronization window W being advanced out of sequence), that fact can be used to drive link quality measurement function 2304. According to one embodiment, load balancing is performed using information garnered during the normal synchronization, augmented slightly to communicate link health from the receiver to the transmitter. The receiver maintains a count, MESS_R(W), of the messages received in synchronization window W. When it receives a synchronization request (SYNC_REQ) corresponding to the end of window W, the receiver includes counter MESS_R in the resulting synchronization acknowledgement (SYNC_ACK) sent back to the transmitter. This allows the transmitter to compare messages sent to messages received in order to asses the health of the link.

If synchronization is completely lost, weight adjustment function 2305 decreases the weight value on the affected path to zero. When synchronization is regained, the weight value for the affected path is gradually increased to its original value. Alternatively, link quality can be measured by evaluating the length of time required for the receiver to acknowledge a synchronization request. In one embodiment, separate transmit and receive tables are used for each transmission path.

When the transmitter receives a SYNC_ACK, the MESS_R is compared with the number of messages transmitted in a window (MESS_T). When the transmitter receives a SYNC_ACK, the traffic probabilities will be examined and adjusted if necessary. MESS_R is compared with the number of messages transmitted in a window (MESS_T). There are two possibilities:

1. If MESS_R is less than a threshold value, THRESH, then the link will be deemed to be unhealthy. If the transmitter was turned off, the transmitter is turned on and the weight P for that link will be set to a minimum value MIN. This will keep a trickle of traffic on the link for monitoring purposes until it recovers. If the transmitter was turned on, the weight P for that link will be set to:

$$P' = \alpha \times MIN + (1-\alpha) \times P \quad (1)$$

Equation 1 will exponentially damp the traffic weight value to MIN during sustained periods of degraded service.

2. If MESS_R for a link is greater than or equal to THRESH, the link will be deemed healthy. If the weight P for that link is greater than or equal to the steady state value S for that link, then P is left unaltered. If the weight P for that link is less than THRESH then P will be set to:

$$P' = \beta \times S + (1-\beta) \times P \quad (2)$$

where $\beta$ is a parameter such that $0 <= \beta <= 1$ that determines the damping rate of P.

Equation. 2 will increase the traffic weight to S during sustained periods of acceptable service in a damped exponential fashion.

Figure 24:
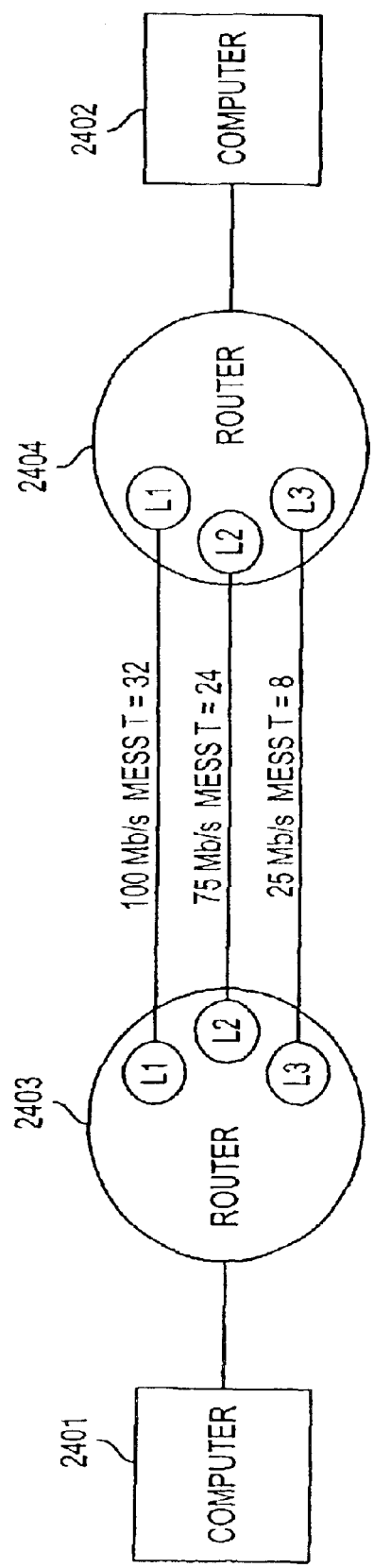
FIG. 24 shows an example using the system of FIG. 23.

A detailed example will now be provided with reference to FIG. 24. As shown in FIG. 24, a first computer 2401 communicates with a second computer 2402 through two routers 2403 and 2404. Each router is coupled to the other router through three transmission links. As described above, these may be physically diverse links or logical links (including virtual private networks).

Suppose that a first link L1 can sustain a transmission bandwidth of 100 Mb/s and has a window size of 32; link L2 can sustain 75 Mb/s and has a window size of 24; and link L3 can sustain 25 Mb/s and has a window size of 8. The combined links can thus sustain 200 Mb/s. The steady state traffic weights are 0.5 for link L1; 0.375 for link L2, and 0.125 for link L3. MIN=1 Mb/s, THRESH=0.8 MESS_T for each link, $\alpha=0.75$ and $\beta=0.5$. These traffic weights will remain stable until a link stops for synchronization or reports a number of packets received less than its THRESH. Consider the following sequence of events:

1. Link L1 receives a SYNC_ACK containing a MESS_R of 24, indicating that only 75% of the MESS_T (32) messages transmitted in the last window were successfully received. Link 1 would be below THRESH (0.8). Consequently, link L1's traffic weight value would be reduced to 0.12825, while link L2's traffic weight value would be increased to 0.65812 and link L3's traffic weight value would be increased to 0.217938.

2. Link L2 and L3 remained healthy and link L1 stopped to synchronize. Then link L1's traffic weight value would be set to 0, link L2's traffic weight value would be set to 0.75, and link L33's traffic weight value would be set to 0.25.

3. Link L1 finally received a SYNC_ACK containing a MESS_R of 0 indicating that none of the MESS_T (32) messages transmitted in the last window were successfully received. Link L1 would be below THRESH. Link L1's traffic weight value would be increased to 0.005, link L2's traffic weight value would be decreased to 0.74625, and link L3's traffic weight value would be decreased to 0.24875.

4. Link L1 received a SYNC_ACK containing a MESS_R of 32 indicating that 100% of the MESS_T (32) messages transmitted in the last window were successfully received. Link L1 would be above THRESH. Link L1's traffic weight value would be increased to 0.2525, while link L2's traffic weight value would be decreased to 0.560625 and link L3's traffic weight value would be decreased to 0.186875.

5. Link L1 received a SYNC_ACK containing a MESS_R of 32 indicating that 100% of the MESS_T (32) messages transmitted in the last window were successfully received. Link L1 would be above THRESH. Link L1's traffic weight value would be increased to 0.37625; link L2's traffic weight value would be decreased to 0.4678125, and link L3's traffic weight value would be decreased to 0.1559375.

6. Link L1 remains healthy and the traffic probabilities approach their steady state traffic probabilities.

B. Use of a DNS Proxy to Transparently Create Virtual Private Networks

A second improvement concerns the automatic creation of a virtual private network (VPN) in response to a domain-name server look-up function.

Conventional Domain Name Servers (DNSs) provide a look-up function that returns the IP address of a requested computer or host. For example, when a computer user types in the web name "Yahoo.com," the user's web browser transmits a request to a DNS, which converts the name into a four-part IP address that is returned to the user's browser and then used by the browser to contact the destination web site.

Figure 25:
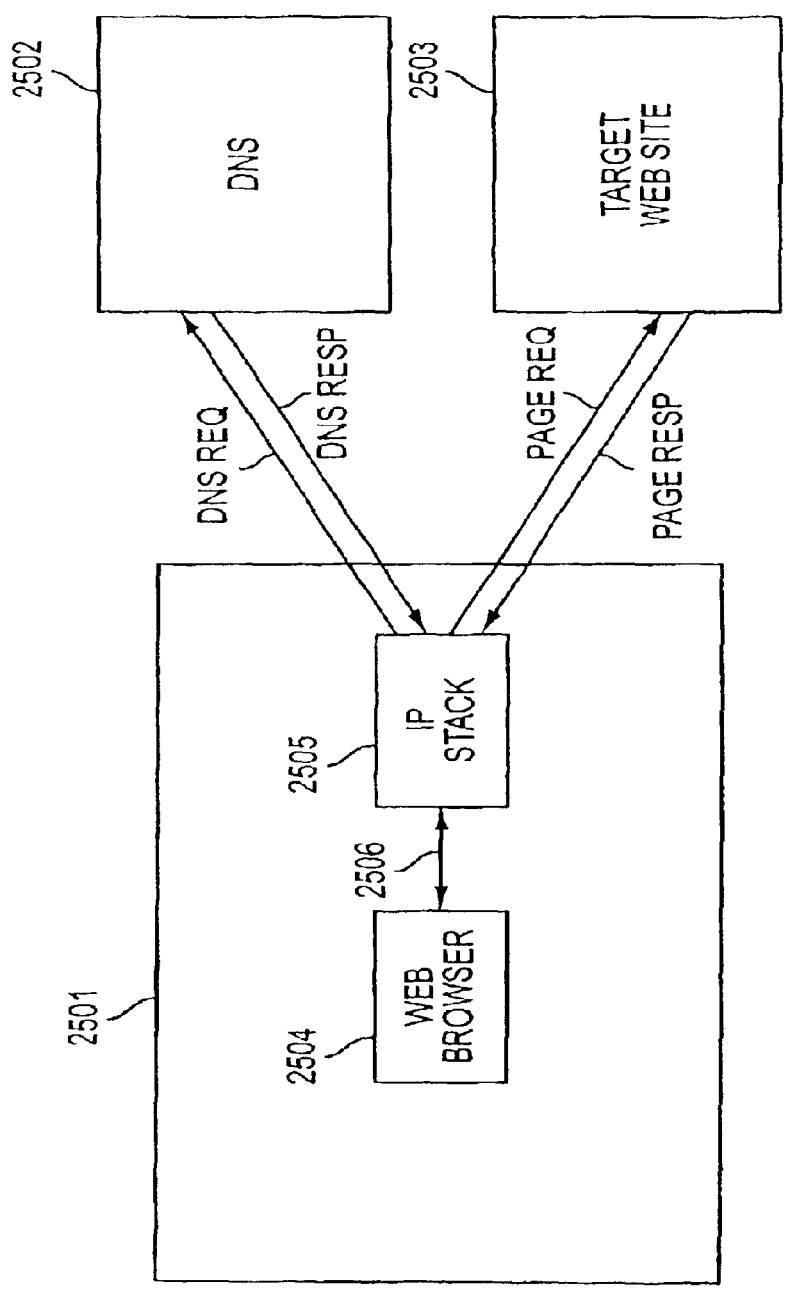
FIG. 25 shows a conventional domain-name look-up service.

This conventional scheme is shown in FIG. 25. A user's computer 2501 includes a client application 2504 (for example, a web browser) and an IP protocol stack 2505. When the user enters the name of a destination host, a request DNS REQ is made (through IP protocol stack 2505) to a DNS 2502 to look up the IP address associated with the name. The DNS returns the IP address DNS RESP to client application 2504, which is then able to use the IP address to communicate with the host 2503 through separate transactions such as PAGE REQ and PAGE RESP.

In the conventional architecture shown in FIG. 25, nefarious listeners on the Internet could intercept the DNS REQ and DNS RESP packets and thus learn what IP addresses the user was contacting. For example, if a user wanted to set up a secure communication path with a web site having the name "Target.com," when the user's browser contacted a DNS to find the IP address for that web site, the true IP address of that web site would be revealed over the Internet as part of the DNS inquiry. This would hamper anonymous communications on the Internet.

One conventional scheme that provides secure virtual private networks over the Internet provides the DNS server with the public keys of the machines that the DNS server has the addresses for. This allows hosts to retrieve automatically the public keys of a host that the host is to communicate with so that the host can set up a VPN without having the user enter the public key of the destination host. One implementation of this standard is presently being developed as part of the FreeS/WAN project(RFC 2535).

The conventional scheme suffers from certain drawbacks. For example, any user can perform a DNS request. Moreover, DNS requests resolve to the same value for all users.

According to certain aspects of the invention, a specialized DNS server traps DNS requests and, if the request is from a special type of user (e.g., one for which secure communication services are defined), the server does not return the true IP address of the target node, but instead automatically sets up a virtual private network between the target node and the user. The VPN is preferably implemented using the IP address "hopping" features of the basic invention described above, such that the true identity of the two nodes cannot be determined even if packets during the communication are intercepted. For DNS requests that are determined to not require secure services (e.g., an unregistered user), the DNS server transparently "passes through" the request to provide a normal look-up function and return the IP address of the target web server, provided that the requesting host has permissions to resolve unsecured sites. Different users who make an identical DNS request could be provided with different results.

Figure 26:
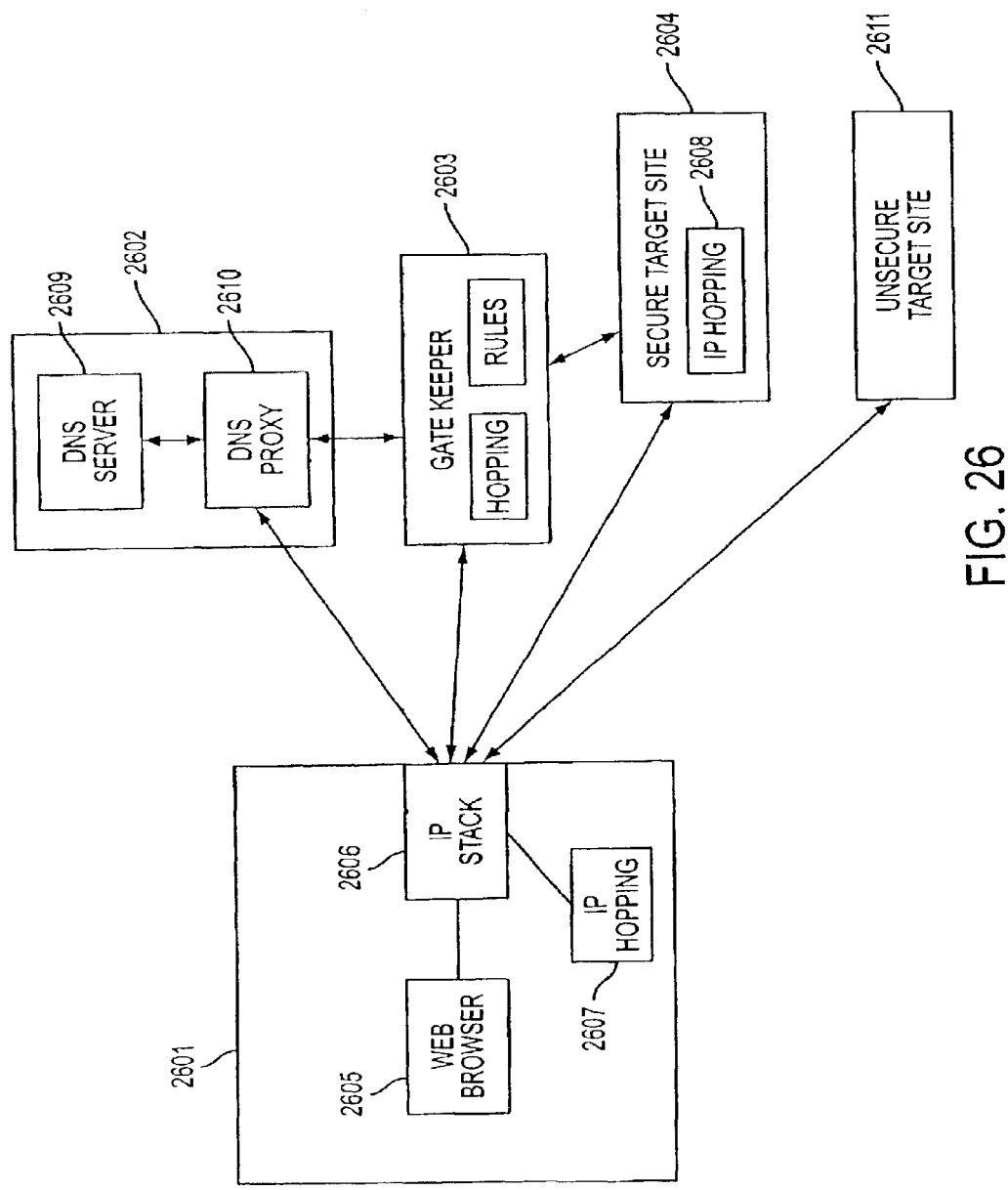
FIG. 26 shows a system employing a DNS proxy server with transparent VPN creation.

FIG. 26 shows a system employing various principles summarized above. A user's computer 2601 includes a conventional client (e.g., a web browser) 2605 and an IP protocol stack 2606 that preferably operates in accordance with an IP hopping function 2607 as outlined above. A modified DNS server 2602 includes a conventional DNS server function 2609 and a DNS proxy 2610. A gatekeeper server 2603 is interposed between the modified DNS server and a secure target site 2704. An "unsecure" target site 2611 is also accessible via conventional IP protocols.

According to one embodiment, DNS proxy 2610 intercepts all DNS lookup functions from client 2605 and determines whether access to a secure site has been requested. If access to a secure site has been requested (as determined, for example, by a domain name extension, or by reference to an internal table of such sites), DNS proxy 2610 determines whether the user has sufficient security privileges to access the site. If so, DNS proxy 2610 transmits a message to gatekeeper 2603 requesting that a virtual private network be created between user computer 2601 and secure target site 2604. In one embodiment, gatekeeper 2603 creates "hop-blocks" to be used by computer 2601 and secure target site 2604 for secure communication. Then, gatekeeper 2603 communicates these to user computer 2601. Thereafter, DNS proxy 2610 returns to user computer 2601 the resolved address passed to it by the gatekeeper (this address could be different from the actual target computer) 2604, preferably using a secure administrative VPN. The address that is returned need not be the actual address of the destination computer.

Had the user requested lookup of a non-secure web site such as site 2611, DNS proxy would merely pass through to conventional DNS server 2609 the look-up request, which would be handled in a conventional manner, returning the IP address of non-secure web site 2611. If the user had requested lookup of a secure web site but lacked credentials to create such a connection, DNS proxy 2610 would return a "host unknown" error to the user. In this manner, different users requesting access to the same DNS name could be provided with different look-up results.

Gatekeeper 2603 can be implemented on a separate computer (as shown in FIG. 26) or as a function within modified DNS server 2602. In general, it is anticipated that gatekeeper 2703 facilitates the allocation and exchange of information needed to communicate securely, such as using "hopped" IP addresses. Secure hosts such as site 2604 are assumed to be equipped with a secure communication function such as an IP hopping function 2608.

It will be appreciated that the functions of DNS proxy 2610 and DNS server 2609 can be combined into a single server for convenience. Moreover, although element 2602 is shown as combining the functions of two servers, the two servers can be made to operate independently.

Figure 27:
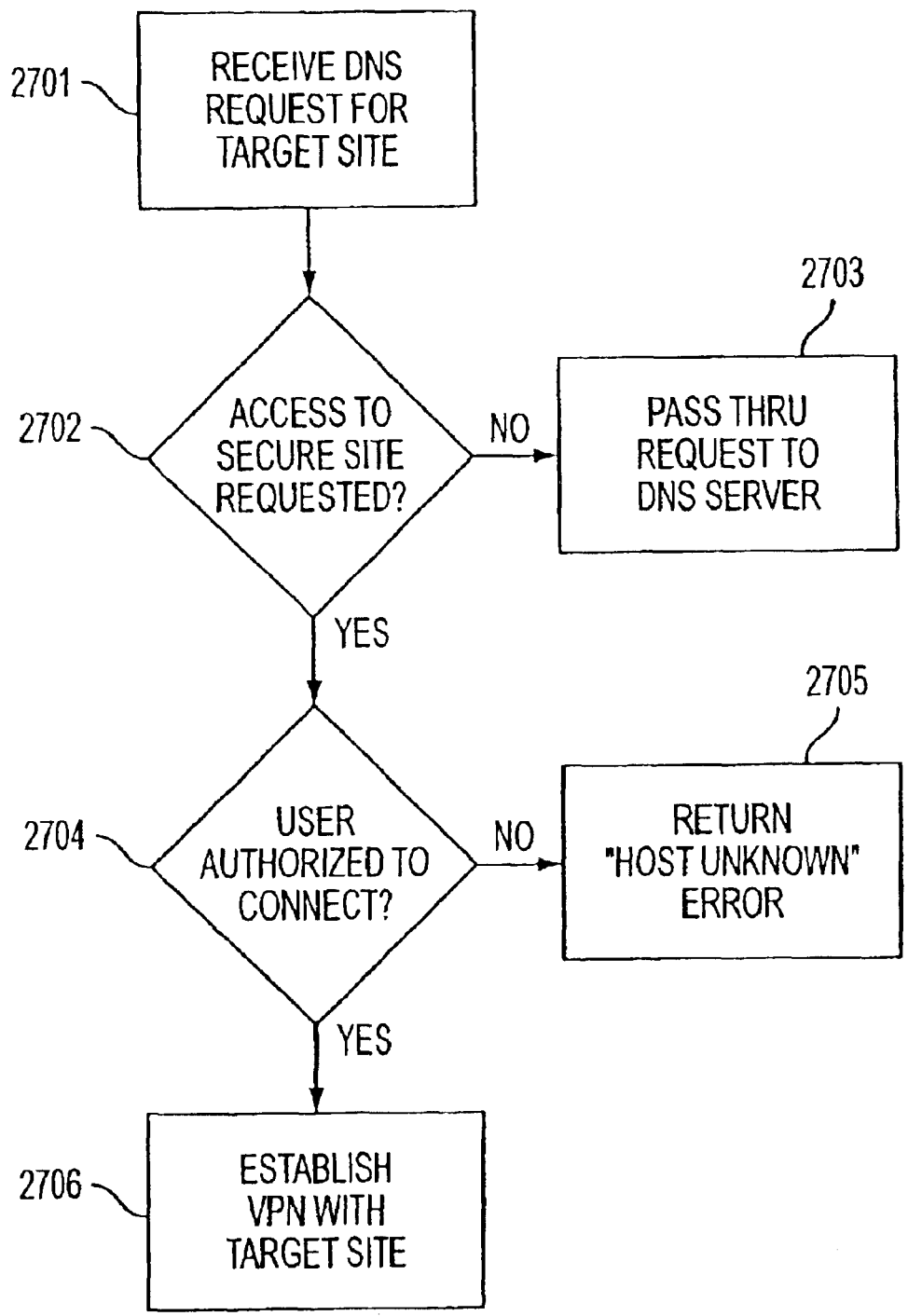
FIG. 27 shows steps that can be carried out to implement transparent VPN creation based on a DNS look-up function.

FIG. 27 shows steps that can be executed by DNS proxy server 2610 to handle requests for DNS look-up for secure hosts. In step 2701, a DNS look-up request is received for a target host. In step 2702, a check is made to determine whether access to a secure host was requested. If not, then in step 2703 the DNS request is passed to conventional DNS server 2609, which looks up the IP address of the target site and returns it to the user's application for further processing.

In step 2702, if access to a secure host was requested, then in step 2704 a further check is made to determine whether the user is authorized to connect to the secure host. Such a check can be made with reference to an internally stored list of authorized IP addresses, or can be made by communicating with gatekeeper 2603 (e.g., over an "administrative" VPN that is secure). It will be appreciated that different levels of security can also be provided for different categories of hosts. For example, some sites may be designated as having a certain security level, and the security level of the user requesting access must match that security level. The user's security level can also be determined by transmitting a request message back to the user's computer requiring that it prove that it has sufficient privileges.

If the user is not authorized to access the secure site, then a "host unknown" message is returned (step 2705). If the user has sufficient security privileges, then in step 2706 a secure VPN is established between the user's computer and the secure target site. As described above, this is preferably done by allocating a hopping regime that will be carried out between the user's computer and the secure target site, and is preferably performed transparently to the user (i.e., the user need not be involved in creating the secure link). As described in various embodiments of this application, any of various fields can be "hopped" (e.g., IP source/destination addresses; a field in the header; etc.) in order to communicate securely.

Some or all of the security functions can be embedded in gatekeeper 2603, such that it handles all requests to connect to secure sites. In this embodiment, DNS proxy 2610 communicates with gatekeeper 2603 to determine (preferably over a secure administrative VPN) whether the user has access to a particular web site. Various scenarios for implementing these features are described by way of example below:

Scenario #1: Client has permission to access target computer, and gatekeeper has a rule to make a VPN for the client. In this scenario, the client's DNS request would be received by the DNS proxy server 2610, which would forward the request to gatekeeper 2603. The gatekeeper would establish a VPN between the client and the requested target. The gatekeeper would provide the address of the destination to the DNS proxy, which would then return the resolved name as a result. The resolved address can be transmitted back to the client in a secure administrative VPN.

Scenario #2: Client does not have permission to access target computer. In this scenario, the client's DNS request would be received by the DNS proxy server 2610, which would forward the request to gatekeeper 2603. The gatekeeper would reject the request, informing DNS proxy server 2610 that it was unable to find the target computer. The DNS proxy 2610 would then return a "host unknown" error message to the client.

Scenario #3: Client has permission to connect using a normal non-VPN link, and the gatekeeper does not have a rule to set up a VPN for the client to the target site. In this scenario, the client's DNS request is received by DNS proxy server 2610, which would check its rules and determine that no VPN is needed. Gatekeeper 2603 would then inform the DNS proxy server to forward the request to conventional DNS server 2609, which would resolve the request and return the result to the DNS proxy server and then back to the client.

Scenario #4: Client does not have permission to establish a normal/non-VPN link, and the gatekeeper does not have a rule to make a VPN for the client to the target site. In this scenario, the DNS proxy server would receive the client's DNS request and forward it to gatekeeper 2603. Gatekeeper 2603 would determine that no special VPN was needed, but that the client is not authorized to communicate with non-VPN members. The gatekeeper would reject the request, causing DNS proxy server 2610 to return an error message to the client.

C. Large Link to Small Link Bandwidth Management

One feature of the basic architecture is the ability to prevent so-called "denial of service" attacks that can occur if a computer hacker floods a known Internet node with packets, thus preventing the node from communicating with other nodes. Because IP addresses or other fields are "hopped" and packets arriving with invalid addresses are quickly discarded, Internet nodes are protected against flooding targeted at a single IP address.

Figure 28:
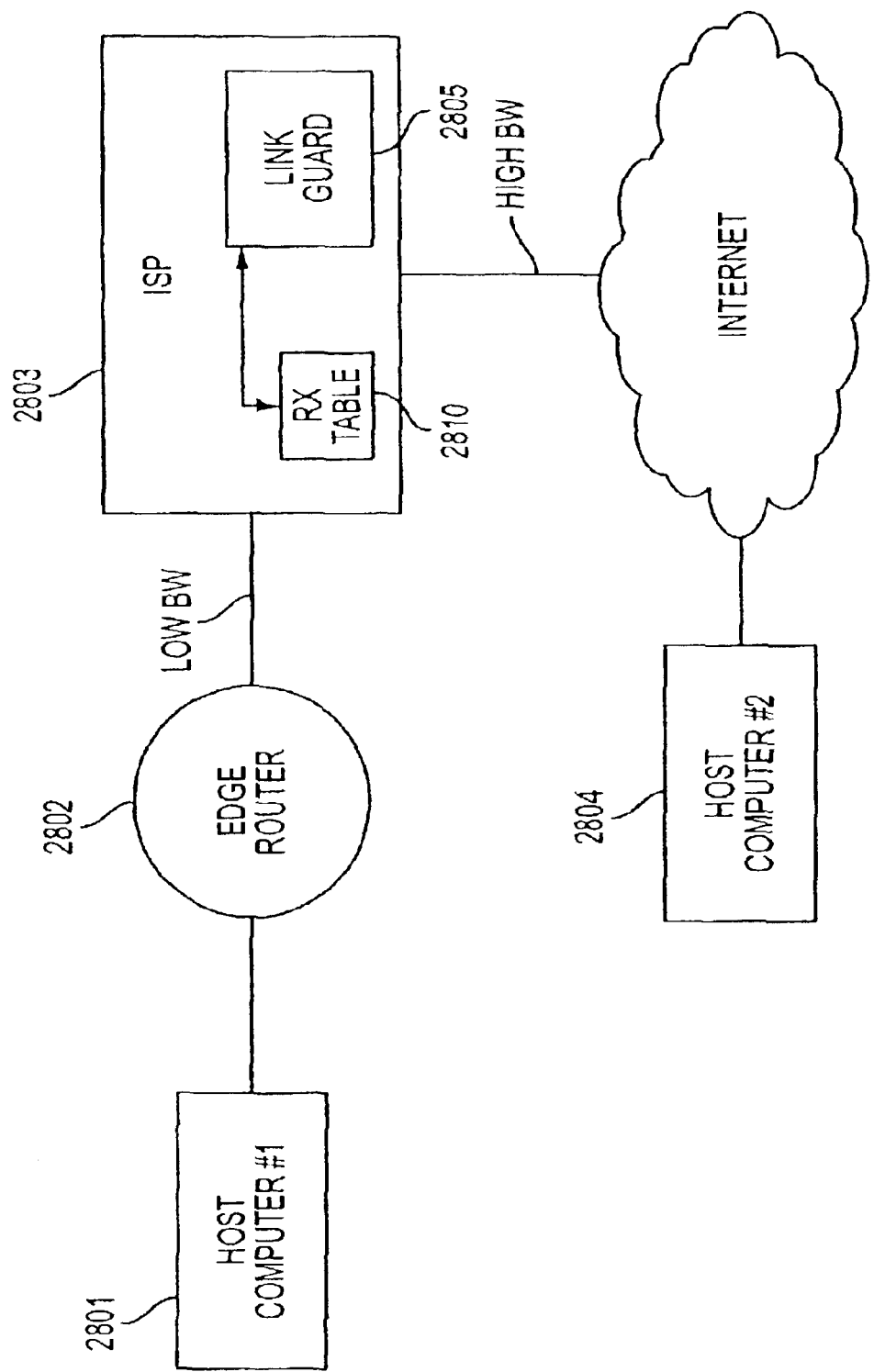
FIG. 28 shows a system including a link guard function that prevents packet overloading on a low-bandwidth link LOW BW.

In a system in which a computer is coupled through a link having a limited bandwidth (e.g., an edge router) to a node that can support a much higher-bandwidth link (e.g., an Internet Service Provider), a potential weakness could be exploited by a determined hacker. Referring to FIG. 28, suppose that a first host computer 2801 is communicating with a second host computer 2804 using the IP address hopping principles described above. The first host computer is coupled through an edge router 2802 to an Internet Service Provider (ISP) 2803 through a low bandwidth link (LOW BW), and is in turn coupled to second host computer 2804 through parts of the Internet through a high bandwidth link (HIGH BW). In this architecture, the ISP is able to support a high bandwidth to the internet, but a much lower bandwidth to the edge router 2802.

Suppose that a computer hacker is able to transmit a large quantity of dummy packets addressed to first host computer 2801 across high bandwidth link HIGH BW. Normally, host computer 2801 would be able to quickly reject the packets since they would not fall within the acceptance window permitted by the IP address hopping scheme. However, because the packets must travel across low bandwidth link LOW BW, the packets overwhelm the lower bandwidth link before they are received by host computer 2801. Consequently, the link to host computer 2801 is effectively flooded before the packets can be discarded.

According to one inventive improvement, a "link guard" function 2805 is inserted into the high-bandwidth node (e.g., ISP 2803) that quickly discards packets destined for a low-bandwidth target node if they are not valid packets.

Each packet destined for a low-bandwidth node is cryptographically authenticated to determine whether it belongs to a VPN. If it is not a valid VPN packet, the packet is discarded at the high-bandwidth node. If the packet is authenticated as belonging to a VPN, the packet is passed with high preference. If the packet is a valid non-VPN packet, it is passed with a lower quality of service (e.g., lower priority).

In one embodiment, the ISP distinguishes between VPN and non-VPN packets using the protocol of the packet. In the case of IPSEC [rfc 2401], the packets have IP protocols 420 and 421. In the case of the TARP VPN, the packets will have an IP protocol that is not yet defined. The ISP's link guard, 2805, maintains a table of valid VPNs which it uses to validate whether VPN packets are cryptographically valid. According to one embodiment, packets that do not fall within any hop windows used by nodes on the low-bandwidth link are rejected, or are sent with a lower quality of service. One approach for doing this is to provide a copy of the IP hopping tables used by the low-bandwidth nodes to the high-bandwidth node, such that both the high-bandwidth and low-bandwidth nodes track hopped packets (e.g., the high-bandwidth node moves its hopping window as valid packets are received). In such a scenario, the high-bandwidth node discards packets that do not fall within the hopping window before they are transmitted over the low-bandwidth link. Thus, for example, ISP 2903 maintains a copy 2910 of the receive table used by host computer 2901. Incoming packets that do not fall within this receive table are discarded. According to a different embodiment, link guard 2805 validates each VPN packet using a keyed hashed message authentication code (HMAC) [rfc 2104].

According to another embodiment, separate VPNs (using, for example, hopblocks) can be established for communicating between the low-bandwidth node and the high-bandwidth node (i.e., packets arriving at the high-bandwidth node are converted into different packets before being transmitted to the low-bandwidth node).

Figure 29:
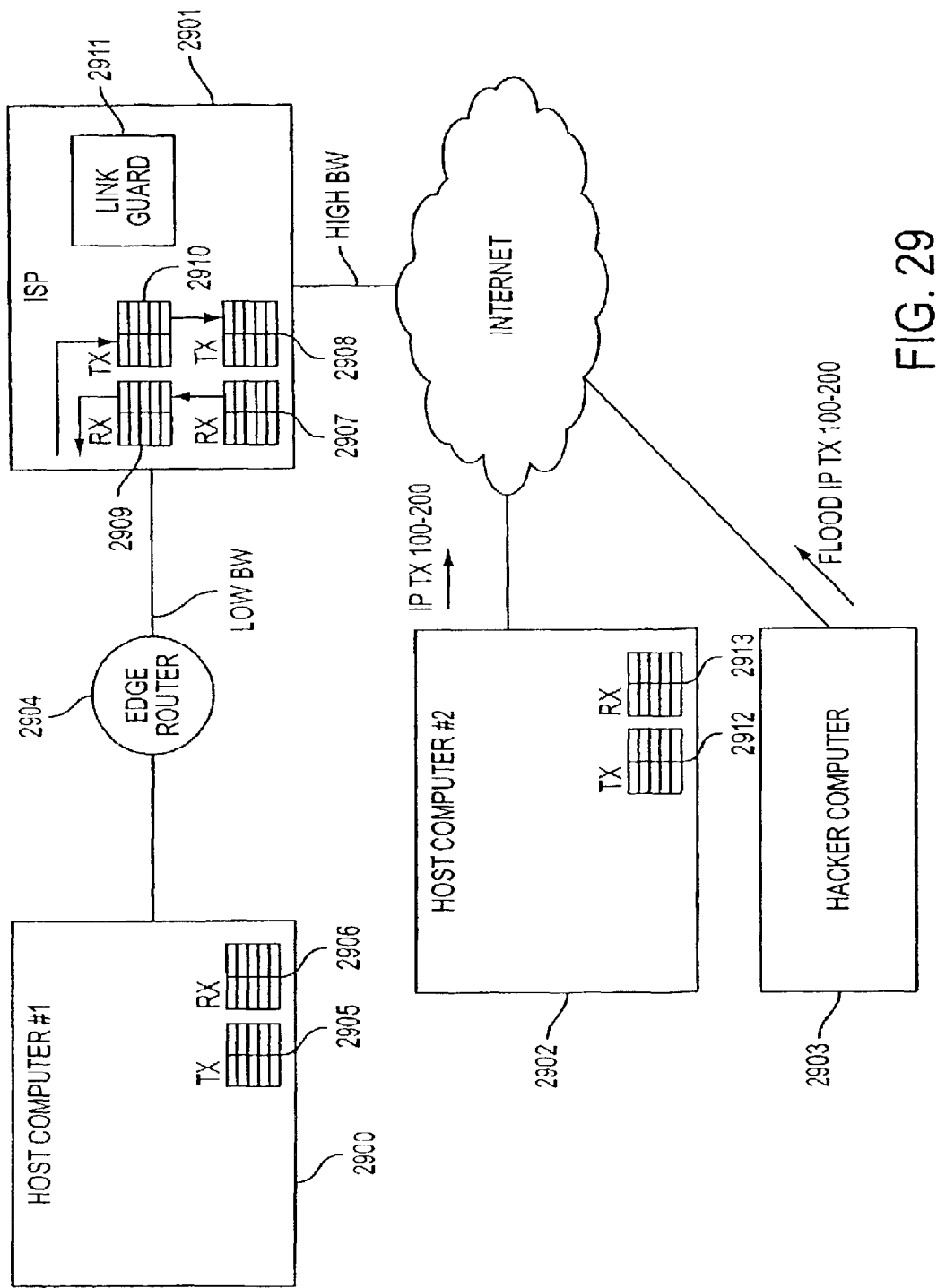
FIG. 29 shows one embodiment of a system employing the principles of FIG. 28.

As shown in FIG. 29, for example, suppose that a first host computer 2900 is communicating with a second host computer 2902 over the Internet, and the path includes a high bandwidth link HIGH BW to an ISP 2901 and a low bandwidth link LOW BW through an edge router 2904. In accordance with the basic architecture described above, first host computer 2900 and second host computer 2902 would exchange hopblocks (or a hopblock algorithlm) and would be able to create matching transmit and receive tables 2905, 2906, 2912 and 2913. Then in accordance with the basic architecture, the two computers would transmit packets having seemingly random IP source and destination addresses, and each would move a corresponding hopping window in its receive table as valid packets were received.

Suppose that a nefarious computer hacker 2903 was able to deduce that packets having a certain range of IP addresses (e.g., addresses 100 to 200 for the sake of simplicity) are being transmitted to ISP 2901, and that these packets are being forwarded over a low-bandwidth link. Hacker computer 2903 could thus "flood" packets having addresses falling into the range 100 to 200, expecting that they would be forwarded along low bandwidth link LOW BW, thus causing the low bandwidth link to become overwhelmed. The fast packet reject mechanism in first host computer 3000 would be of little use in rejecting these packets, since the low bandwidth link was effectively jammed before the packets could be rejected. In accordance with one aspect of the improvement, however, VPN link guard 2911 would prevent the attack from impacting the performance of VPN traffic because the packets would either be rejected as invalid VPN packets or given a lower quality of service than VPN traffic over the lower bandwidth link. A denial-of-service flood attack could, however, still disrupt non-VPN traffic.

According to one embodiment of the improvement, ISP 2901 maintains a separate VPN with first host computer 2900, and thus translates packets arriving at the ISP into packets having a different IP header before they are transmitted to host computer 2900. The cryptographic keys used to authenticate VPN packets at the link guard 2911 and the cryptographic keys used to encrypt and decrypt the VPN packets at host 2902 and host 2901 can be different, so that link guard 2911 does not have access to the private host data; it only has the capability to authenticate those packets.

According to yet a third embodiment, the low-bandwidth node can transmit a special message to the high-bandwidth node instructing it to shut down all transmissions on a particular IP address, such that only hopped packets will pass through to the low-bandwidth node. This embodiment would prevent a hacker from flooding packets using a single IP address. According to yet a fourth embodiment, the high-bandwidth node can be configured to discard packets transmitted to the low-bandwidth node if the transmission rate exceeds a certain predetermined threshold for any given IP address; this would allow hopped packets to go through. In this respect, link guard 2911 can be used to detect that the rate of packets on a given IP address are exceeding a threshold rate; further packets addressed to that same IP address would be dropped or transmitted at a lower priority (e.g., delayed).

D. Traffic Limiter

In a system in which multiple nodes are communicating using "hopping" technology, a treasonous insider could internally flood the system with packets. In order to prevent this possibility, one inventive improvement involves setting up "contracts" between nodes in the system, such that a receiver can impose a bandwidth limitation on each packet sender. One technique for doing this is to delay acceptance of a checkpoint synchronization request from a sender until a certain time period (e.g., one minute) has elapsed. Each receiver can effectively control the rate at which its hopping window moves by delaying "SYNC ACK" responses to "SYNC_REQ" messages.

A simple modification to the checkpoint synchronizer will serve to protect a receiver from accidental or deliberate overload from an internally treasonous client. This modification is based on the observation that a receiver will not update its tables until a SYNC_REQ is received on hopped address CKPT_N. It is a simple matter of deferring the generation of a new CKPT_N until an appropriate interval after previous checkpoints.

Suppose a receiver wished to restrict reception from a transmitter to 100 packets a second, and that checkpoint synchronization messages were triggered every 50 packets. A compliant transmitter would not issue new SYNC_REQ messages more often than every 0.5 seconds. The receiver could delay a non-compliant transmitter from synchronizing by delaying the issuance of CKPT_N for 0.5 second after the last SYNC_REQ was accepted.

In general, if M receivers need to restrict N transmitters issuing new SYNC_REQ messages after every W messages to sending R messages a second in aggregate, each receiver could defer issuing a new CKPT_N until M×N×W/R seconds have elapsed since the last SYNC_REQ has been received and accepted. If the transmitter exceeds this rate between a pair of checkpoints, it will issue the new checkpoint before the receiver is ready to receive it, and the SYNC_REQ will be discarded by the receiver. After this, the transmitter will re-issue the SYNC_REQ every T1 seconds until it receives a SYNC_ACK. The receiver will eventually update CKPT_N and the SYNC_REQ will be acknowledged. If the transmission rate greatly exceeds the allowed rate, the transmitter will stop until it is compliant. If the transmitter exceeds the allowed rate by a little, it will eventually stop after several rounds of delayed synchronization until it is in compliance. Hacking the transmitter's code to not shut off only permits the transmitter to lose the acceptance window. In this case it can recover the window and proceed only after it is compliant again.

Two practical issues should be considered when implementing the above scheme:

1. The receiver rate should be slightly higher than the permitted rate in order to allow for statistical fluctuations in traffic arrival times and non-uniform load balancing.
2. Since a transmitter will rightfully continue to transmit for a period after a SYNC_REQ is transmitted, the algorithm above can artificially reduce the transmitter's bandwidth. If events prevent a compliant transmitter from synchronizing for a period (e.g. the network dropping a SYNC_REQ or a SYNC_ACK) a SYNC_REQ will be accepted later than expected. After this, the transmitter will transmit fewer than expected messages before encountering the next checkpoint. The new checkpoint will not have been activated and the transmitter will have to retransmit the SYNC_REQ. This will appear to the receiver as if the transmitter is not compliant. Therefore, the next checkpoint will be accepted late from the transmitter's perspective. This has the effect of reducing the transmitter's allowed packet rate until the transmitter transmits at a packet rate below the agreed upon rate for a period of time.

To guard against this, the receiver should keep track of the times that the last C SYNC_REQs were received and accepted and use the minimum of M×N×W/R seconds after the last SYNC_REQ has been received and accepted, 2×M×N×W/R seconds after next to the last SYNC_REQ has been received and accepted, C×M×N×W/R seconds after $(C-1)^{th}$ to the last SYNC_REQ has been received, as the time to activate CKPT_N. This prevents the receiver from inappropriately limiting the transmitter's packet rate if at least one out of the last C SYNC_REQs was processed on the first attempt.

Figure 30:
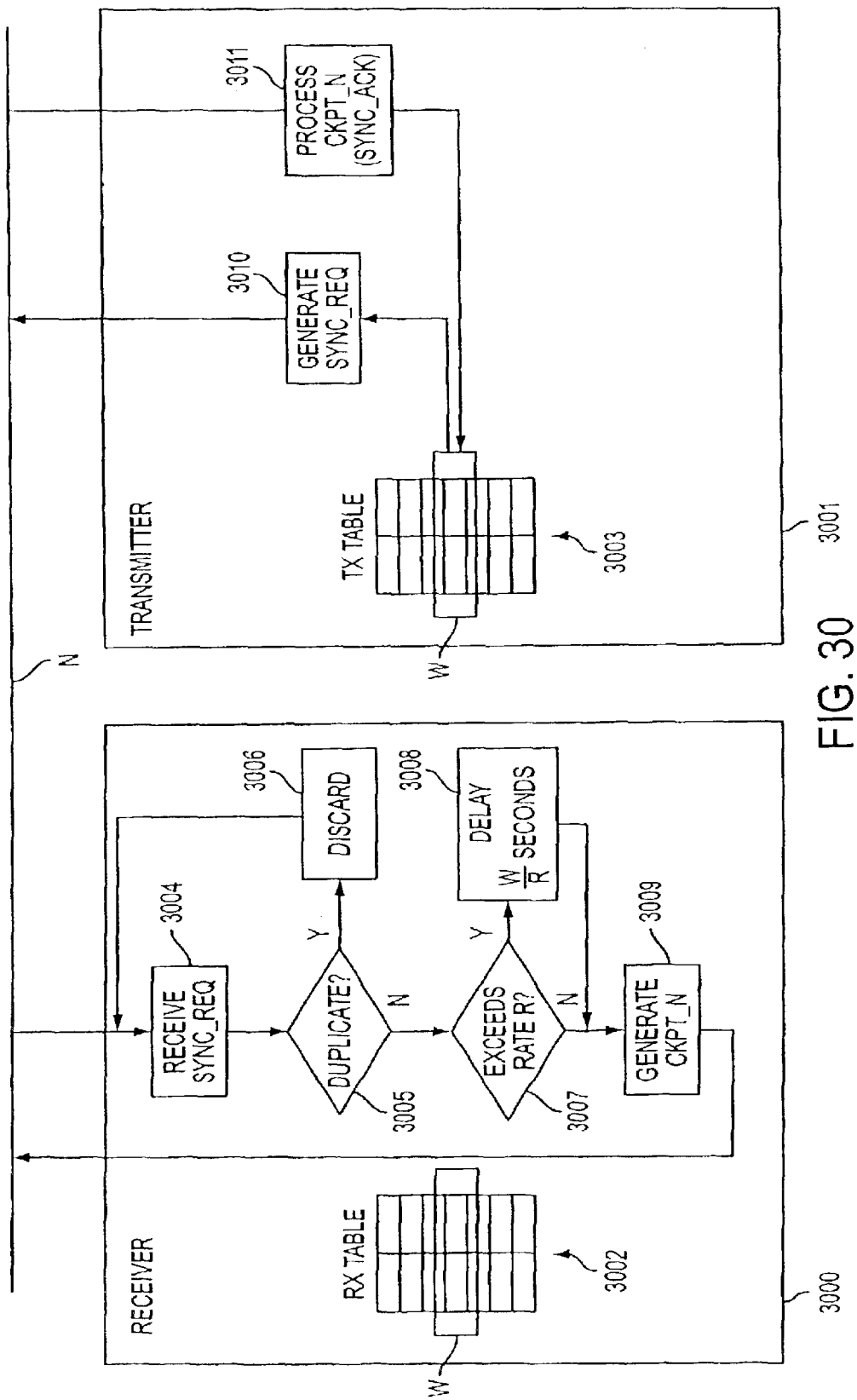
FIG. 30 shows a system that regulates packet transmission rates by throttling the rate at which synchronizations are performed.

FIG. 30 shows a system employing the above-described principles. In FIG. 30, two computers 3000 and 3001 are assumed to be communicating over a network N in accordance with the "hopping" principles described above (e.g., hopped IP addresses, discriminator values, etc.). For the sake of simplicity, computer 3000 will be referred to as the receiving computer and computer 3001 will be referred to as the transmitting computer, although full duplex operation is of course contemplated. Moreover, although only a single transmitter is shown, multiple transmitters can transmit to receiver 3000.

As described above, receiving computer 3000 maintains a receive table 3002 including a window W that defines valid IP address pairs that will be accepted when appearing in incoming data packets. Transmitting computer 3001 maintains a transmit table 3003 from which the next IP address pairs will be selected when transmitting a packet to receiving computer 3000. (For the sake of illustration, window W is also illustrated with reference to transmit table 3003). As transmitting computer moves through its table, it will eventually generate a SYNC_REQ message as illustrated in function 3010. This is a request to receiver 3000 to synchronize the receive table 3002, from which transmitter 3001 expects a response in the form of a CKPT_N (included as part of a SYNC_ACK message). If transmitting computer 3001 transmits more messages than its allotment, it will prematurely generate the SYNC_REQ message. (If it has been altered to remove the SYNC_REQ message generation altogether, it will fall out of synchronization since receiver 3000 will quickly reject packets that fall outside of window W, and the extra packets generated by transmitter 3001 will be discarded).

In accordance with the improvements described above, receiving computer 3000 performs certain steps when a SYNC_REQ message is received, as illustrated in FIG. 30. In step 3004, receiving computer 3000 receives the SYNC_REQ message. In step 3005, a check is made to determine whether the request is a duplicate. If so, it is discarded in step 3006. In step 3007, a check is made to determine whether the SYNC_REQ received from transmitter 3001 was received at a rate that exceeds the allowable rate R (i.e., the period between the time of the last SYNC_REQ message). The value R can be a constant, or it can be made to fluctuate as desired. If the rate exceeds R, then in step 3008 the next activation of the next CKPT_N hopping table entry is delayed by W/R seconds after the last SYNC_REQ has been accepted.

Otherwise, if the rate has not been exceeded, then in step 3109 the next CKPT_N value is calculated and inserted into the receiver's hopping table prior to the next SYNC_REQ from the transmitter 3101. Transmitter 3101 then processes the SYNC_REQ in the normal manner.

E. Signaling Synchronizer

In a system in which a large number of users communicate with a central node using secure hopping technology, a large amount of memory must be set aside for hopping tables and their supporting data structures. For example, if one million subscribers to a web site occasionally communicate with the web site, the site must maintain one million hopping tables, thus using up valuable computer resources, even though only a small percentage of the users may actually be using the system at any one time. A desirable solution would be a system that permits a certain maximum number of simultaneous links to be maintained, but which would "recognize" millions of registered users at any one time. In other words, out of a population of a million registered users, a few thousand at a time could simultaneously communicate with a central server, without requiring that the server maintain one million hopping tables of appreciable size.

One solution is to partition the central node into two nodes: a signaling server that performs session initiation for user log-on and log-off (and requires only minimally sized tables), and a transport server that contains larger hopping tables for the users. The signaling server listens for the millions of known users and performs a fast-packet reject of other (bogus) packets. When a packet is received from a known user, the signaling server activates a virtual private link (VPL) between the user and the transport server, where hopping tables are allocated and maintained. When the user logs onto the signaling server, the user's computer is provided with hop tables for communicating with the transport server, thus activating the VPL. The VPLs can be torn down when they become inactive for a time period, or they can be torn down upon user log-out. Communication with the signaling server to allow user log-on and log-off can be accomplished using a specialized version of the checkpoint scheme described above.

Figure 31:
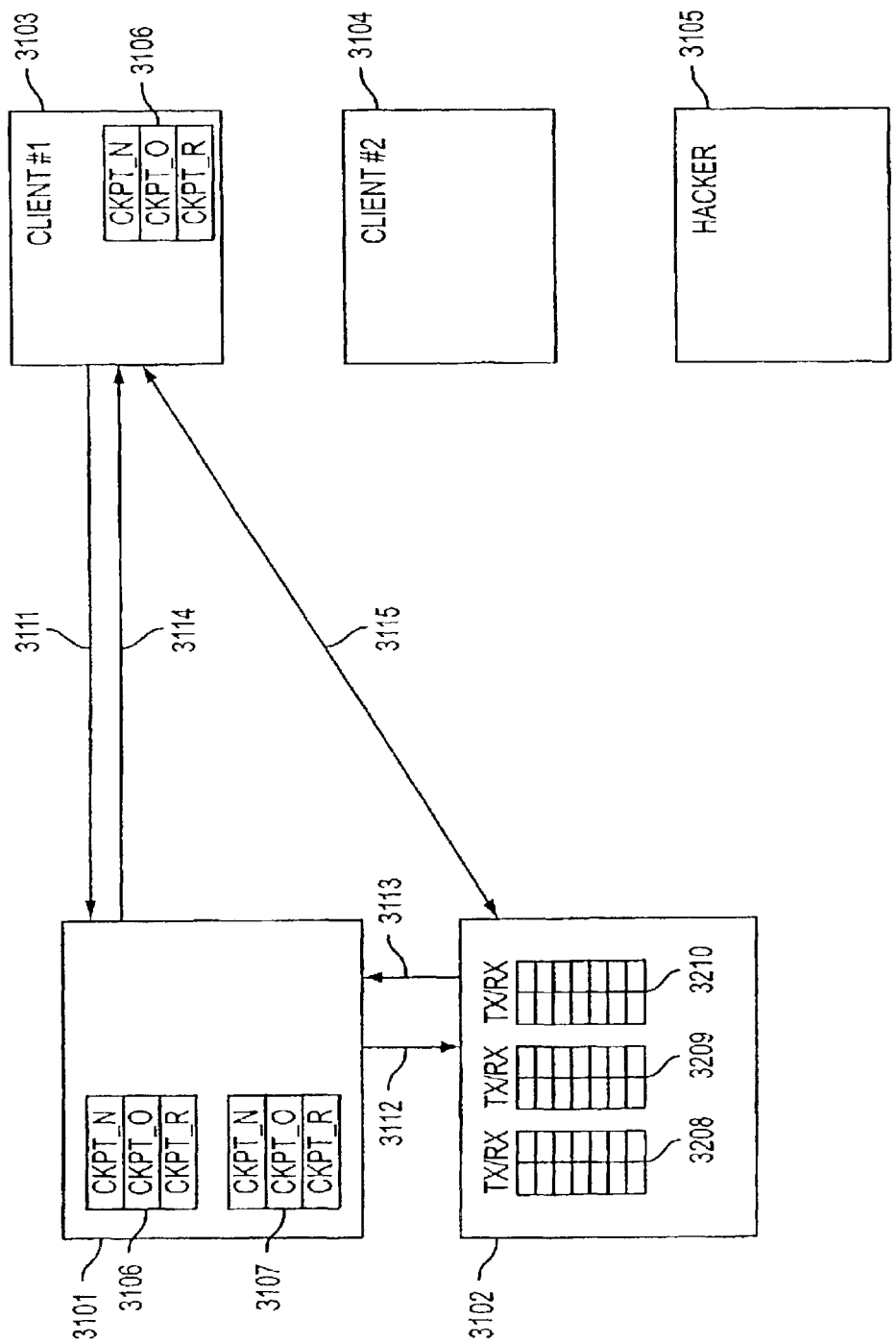
FIG. 31 shows a signaling server 3101 and a transport server 3102 used to establish a VPN with a client computer.

FIG. 31 shows a system employing certain of the above-described principles. In FIG. 31, a signaling server 3101 and a transport server 3102 communicate over a link. Signaling server 3101 contains a large number of small tables 3106 and 3107 that contain enough information to authenticate a communication request with one or more clients 3103 and 3104. As described in more detail below, these small tables may advantageously be constructed as a special case of the synchronizing checkpoint tables described previously. Transport server 3102, which is preferably a separate computer in communication with signaling server 3101, contains a smaller number of larger hopping tables 3108, 3109, and 3110 that can be allocated to create a VPN with one of the client computers.

According to one embodiment, a client that has previously registered with the system (e.g., via a system administration function, a user registration procedure, or some other method) transmits a request for information from a computer (e.g., a web site). In one variation, the request is made using a "hopped" packet, such that signaling server 3101 will quickly reject invalid packets from unauthorized computers such as hacker computer 3105. An "administrative" VPN can be established between all of the clients and the signaling server in order to ensure that a hacker cannot flood signaling server 3101 with bogus packets. Details of this scheme are provided below.

Signaling server 3101 receives the request 3111 and uses it to determine that client 3103 is a validly registered user. Next, signaling server 3101 issues a request to transport server 3102 to allocate a hopping table (or hopping algorithm or other regime) for the purpose of creating a VPN with client 3103. The allocated hopping parameters are returned to signaling server 3101 (path 3113), which then supplies the hopping parameters to client 3103 via path 3114, preferably in encrypted form.

Thereafter, client 3103 communicates with transport server 3102 using the normal hopping techniques described above. It will be appreciated that although signaling server 3101 and transport server 3102 are illustrated as being two separate computers, they could of course be combined into a single computer and their functions performed on the single computer. Alternatively, it is possible to partition the functions shown in FIG. 31 differently from as shown without departing from the inventive principles.

One advantage of the above-described architecture is that signaling server 3101 need only maintain a small amount of information on a large number of potential users, yet it retains the capability of quickly rejecting packets from unauthorized users such as hacker computer 3105. Larger data tables needed to perform the hopping and synchronization functions are instead maintained in a transport server 3102, and a smaller number of these tables are needed since they are only allocated for "active" links. After a VPN has become inactive for a certain time period (e.g., one hour), the VPN can be automatically torn down by transport server 3102 or signaling server 3101.

A more detailed description will now be provided regarding how a special case of the checkpoint synchronization feature can be used to implement the signaling scheme described above.

The signaling synchronizer may be required to support many (millions) of standing, low bandwidth connections. It therefore should minimize per-VPL memory usage while providing the security offered by hopping technology. In order to reduce memory usage in the signaling server, the data hopping tables can be completely eliminated and data can be carried as part of the SYNC_REQ message. The table used by the server side (receiver) and client side (transmitter) is shown schematically as element 3106 in FIG. 31.

The meaning and behaviors of CKPT_N, CKPT_O and CKPT_R remain the same from the previous description, except that CKPT_N can receive a combined data and SYNC_REQ message or a SYNC_REQ message without the data.

The protocol is a straightforward extension of the earlier synchronizer. Assume that a client transmitter is on and the tables are synchronized. The initial tables can be generated "out of band." For example, a client can log into a web server to establish an account over the Internet. The client will receive keys etc encrypted over the Internet. Meanwhile, the server will set up the signaling VPN on the signaling server.

Assuming that a client application wishes to send a packet to the server on the client's standing signaling VPL:

1. The client sends the message marked as a data message on the inner header using the transmitter's CKPT_N address. It turns the transmitter off and starts a timer T1 noting CKPT_O. Messages can be one of three types: DATA, SYNC_REQ and SYNC_ACK. In the normal algorithm, some potential problems can be prevented by identifying each message type as part of the encrypted inner header field. In this algorithm, it is important to distinguish a data packet and a SYNC_REQ in the signaling synchronizer since the data and the SYNC_REQ come in on the same address.

2. When the server receives a data message on its CKPT_N, it verifies the message and passes it up the stack. The message can be verified by checking message type and and other information (i.e user credentials) contained in the inner header It replaces its CKPT_O with CKPT_N and generates the next CKPT_N. It updates its transmitter side CKPT_R to correspond to the client's receiver side CKPT_R and transmits a SYNC_ACK containing CKPT_O in its payload.

3. When the client side receiver receives a SYNC_ACK on its CKPT_R with a payload matching its transmitter side CKPT_O and the transmitter is off, the transmitter is turned on and the receiver side CKPT_R is updated. If the SYNC_ACK's payload does not match the transmitter side CKPT_O or the transmitter is on, the SYNC_ACK is simply discarded.

4. T1 expires: If the transmitter is off and the client's transmitter side CKPT_O matches the CKPT_O associated with the timer, it starts timer T1 noting CKPT_O again, and a SYNC_REQ is sent using the transmitter's CKPT_O address. Otherwise, no action is taken.

5. When the server receives a SYNC_REQ on its CKPT_N, it replaces its CKPT_O with CKPT_N and generates the next CKPT_N. It updates its transmitter side CKPT_R to correspond to the client's receiver side CKPT_R and transmits a SYNC_ACK containing CKPT_O in its payload.

6. When the server receives a SYNC_REQ on its CKPT_O it updates its transmitter side CKPT_R to correspond to the client's receiver side CKPT_R and transmits a SYNC_ACK containing CKPT_O in its payload.

Figure 32:
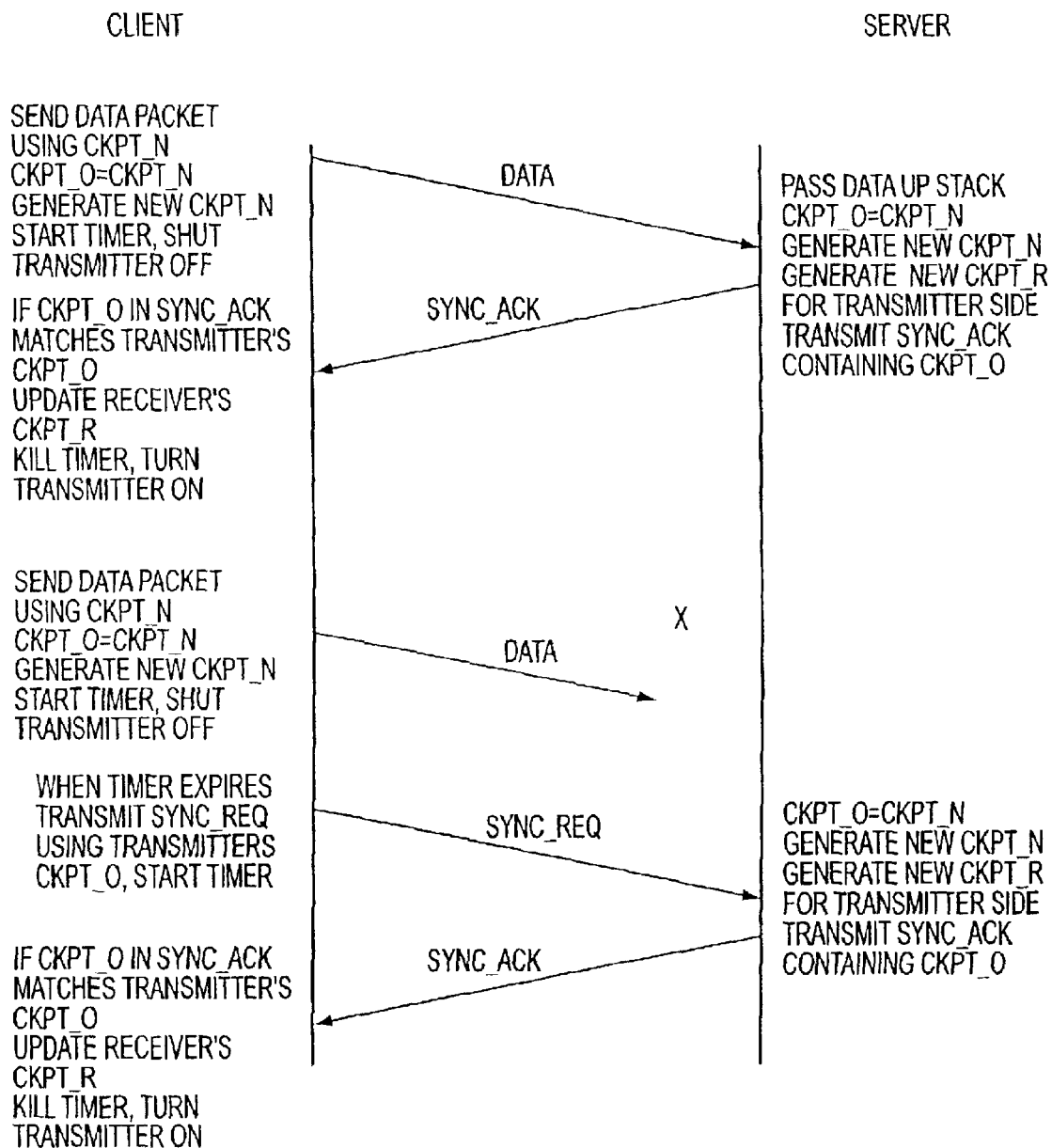
FIG. 32 shows message flows relating to synchronization protocols of FIG. 31.

FIG. 32 shows message flows to highlight the protocol. Reading from top to bottom, the client sends data to the server using its transmitter side CKPT_N. The client side transmitter is turned off and a retry timer is turned off. The transmitter will not transmit messages as long as the transmitter is turned off. The client side transmitter then loads CKPT_N into CKPT_O and updates CKPT_N. This message is successfully received and a passed up the stack. It also synchronizes the receiver i.e, the server loads CKPT_N into CKPT_O and generates a new CKPT_N, it generates a new CKPT_R in the server side transmitter and transmits a SYNC_ACK containing the server side receiver's CKPT_O the server. The SYNC_ACK is successfully received at the client. The client side receiver's CKPT_R is updated, the transmitter is turned on and the retry timer is killed. The client side transmitter is ready to transmit a new data message.

Next, the client sends data to the server using its transmitter side CKUT_N. The client side transmitter is turned off and a retry timer is turned off. The transmitter will not transmit messages as long as the transmitter is turned off. The client side transmitter then loads CKPT_N into CKPT_O and updates CKPT_N. This message is lost. The client side timer expires and as a result a SYNC_REQ is transmitted on the client side transmitter's CKPT_O (this will keep happening until the SYNC_ACK has been received at the client). The SYNC_REQ is successfully received at the server. It synchronizes the receiver i.e, the server loads CKPT_N into CKPT_O and generates a new CKPT_N, it generates an new CKPT_R in the server side transmitter and transmits a SYNC_ACK containing the server side receiver's CKPT_O the server. The SYNC_ACK is successfully received at the client. The client side receiver's CKPT_R is updated, the transmitter is turned off and the retry timer is killed. The client side transmitter is ready to transmit a new data message.

There are numerous other scenarios that follow this flow. For example, the SYNC_ACK could be lost. The transmitter would continue to re-send the SYNC_REQ until the receiver synchronizes and responds.

The above-described procedures allow a client to be authenticated at signaling server 3201 while maintaining the ability of signaling server 3201 to quickly reject invalid packets, such as might be generated by backer computer 3205. In various embodiments, the signaling synchronizer is really a derivative of the synchronizer. It provides the same protection as the hopping protocol, and it does so for a large number of low bandwidth connections.

What is claimed is:

1. In a system comprising a first computer that transmits data packets to a second computer over a network according to a scheme by which at least one field in a series of data packets is periodically changed according to a sequence known by the first and second computers, and wherein the second computer periodically receives a synchronization request from the first computer to maintain synchronization of the sequence between the first and second computers, a method comprising the steps of:
    (1) receiving at the first computer the synchronization request from the second computer;
    (2) determining whether the synchronization request was received in less than a predetermined interval;
    (3) in response to determining that the synchronization request was received in less than the predetermined interval, ignoring the synchronization request; and
    (4) in response to determining that the synchronization request was not received in less than the predetermined interval, providing a synchronization response to the first computer.

2. The method of claim 1, wherein step (3) comprises the step of delaying the acceptance of a SYNC_REQ for W/R seconds, where W is the number of data packets between synchronization requests according to an agreed schedule, and R is the agreed rate at which synchronization requests should be received according to the agreed schedule.

3. The method of claim 1, further comprising the step of determining whether the synchronization request is a duplicate of a previously received synchronization request and, if it is a duplicate, discarding it.

4. The method of claim 1, wherein step (4) comprises the step of providing a response that includes a new checkpoint for synchronizing a window in a hopping table.

5. The method of claim 1, further comprising the step of the second computer tracking a time period that a last C SYNC_REQs were received and accepted, where C is a predefined constant.

6. The method of claim 1, further comprising the step of the first computer re-issuing a SYNC_REQ every T1 seconds until it receives the response to the synchronization request from the second computer, where T1 is a predetermined time interval.

7. The method of claim 1, wherein the second computer maintains a receive table comprising a window W, where W comprises a list of valid IP address pairs.

8. A computer that receives data packets from a second computer over a network according to a scheme by which at least one field in a series of data packets is periodically changed according to a known sequence, wherein the second computer periodically transmits a synchronization request to maintain synchronization of the sequence, wherein the computer performs the steps of:
    (1) receiving the synchronization request from the second computer;
    (2) determining whether the synchronization request was received in less than a predetermined interval;
    (3) in response to determining that the synchronization request was received in less than a predetermined interval ignoring the synchronization request; and
    (4) in response to determining that the synchronization request was not received in less than a predetermined interval, providing response to the synchronization request to the first computer.

9. The computer of claim 8, wherein the computer delays the acceptance of a SYNC_REQ in step (3) for W/R seconds, where W is the number of data packets between synchronization requests according to an agreed schedule, and R is the agreed rate at which synchronization requests should be received according to the agreed schedule.

10. The computer of claim 8, wherein the computer further performs the step of determining whether the synchronization request is a duplicate of a previously received synchronization request and, if it is a duplicate, discarding it.

11. The computer of claim 8, wherein the response to the synchronization request is provided to the first computer in step (4) for use as a new checkpoint for synchronizing a window in a hopping table.

12. The computer of claim 8, wherein the computer further performs the step of tracking a time period that a last C SYNC_REQs were received and accepted, wherein C is a predefined constant.

13. The computer of claim 8, wherein the computer maintains a receive table comprising a window W, where W comprises a list of valid IP address pairs.

14. A computer that transmits data packets to a second computer over a network according to a scheme by which at least one field in a series of data packets is periodically changed according to a known sequence, wherein the computer periodically transmits a synchronization request to the second computer to maintain synchronization of the known sequence, wherein the computer stored computer executable instructions for performing steps comprising:

(1) transmitting a first synchronization request to the second computer;

(2) determining whether the synchronization request was sent at a rate greater than an allowed rate of the second computer; and (3) in response to determining that the synchronization request was transmitted at a rate greater than an allowed rate of the second computer, halting transmissions until transmitting a synchronization request will be compliant with the allowed rate of the second computer.

15. The computer of claim 14, wherein the computer executable instructions further comprise the first computer re-issues a synchronization request every T1 seconds until the computer receives a synchronization acknowledgment from the second computer, where T1 is a predetermined time interval.

16. The computer of claim 14, wherein the computer executable instructions further comprise the first computer determines whether the synchronization request was transmitted at rate greater than an allowed rate of the second computer in step (2) by determining an amount of time it takes to receive a synchronization acknowledgement from the second computer in response to a first synchronization request.

17. The computer of claims 14, wherein the computer further performs the step of sending duplicate synchronization requests until a response is received from the second computer.

18. The computer of claim 14, wherein the computer maintains a transmit table comprising IP address pairs.

19. The computer of claim 18, wherein the computer selects IP address pairs when transmitting a packet to the second computer.

20. The computer of claim 14, wherein the computer receives a synchronization response from the second computer for use as a new checkpoint for synchronizing a window in a hopping table.

* * * * *

UNITED STATES PATENT AND TRADEMARK OFFICE
CERTIFICATE OF CORRECTION

PATENT NO. : 6,907,473 B2
DATED : June 14, 2005
INVENTOR(S) : Douglas Charles Schmidt et al.

It is certified that error appears in the above-identified patent and that said Letters Patent is hereby corrected as shown below:

<u>Title page,</u>
Item [56], References Cited, OTHER PUBLICATIONS, insert
-- D.B. Chapman et al., "Building Internet Firewalls," November 1995, pages 278-297 and pages 351-375 --.

Signed and Sealed this

Twenty-first Day of March, 2006

JON W. DUDAS
*Director of the United States Patent and Trademark Office*